US006916114B2

(12) United States Patent
Verkerk

(10) Patent No.: US 6,916,114 B2
(45) Date of Patent: Jul. 12, 2005

(54) APPARATUS FOR THE ADDITION OF A COMPOUND OR COMPOUND MIXTURE TO ANOTHER

(76) Inventor: Udo Hendrick Verkerk, #407, 11012 - 82 Avenue, Edmonton, Alberta (CA), T6G 2P6

(*) Notice: Subject to any disclaimer, the term of this patent is extended or adjusted under 35 U.S.C. 154(b) by 105 days.

(21) Appl. No.: 10/300,186

(22) Filed: Nov. 20, 2002

(65) Prior Publication Data

US 2003/0128626 A1 Jul. 10, 2003

(30) Foreign Application Priority Data

Nov. 20, 2001 (CA) ............................................. 2363476

(51) Int. Cl.⁷ ............................................... B01F 15/02
(52) U.S. Cl. ........................ 366/140; 366/142; 366/143; 366/146; 366/147; 366/183.1; 366/250; 366/251; 366/274
(58) Field of Search .................................. 386/140, 142, 386/143, 146, 147, 149, 183.1, 183.2, 250, 251, 273, 274; 222/160, 162; 206/221; 220/23.83, 23.87; 422/130, 224

(56) References Cited

U.S. PATENT DOCUMENTS

| 2,495,942 A | * | 1/1950 | Nosik ........................... 604/416 |
| 2,615,448 A | * | 10/1952 | Fields .......................... 604/416 |
| 2,773,591 A | | 12/1956 | Jensen ......................... 206/220 |
| 2,781,141 A | * | 2/1957 | Lucien ......................... 206/221 |
| 2,974,785 A | * | 3/1961 | Griffon ......................... 206/221 |
| 2,996,363 A | | 8/1961 | Ruyak |
| 3,070,094 A | | 12/1962 | Sarnoff et al. |
| 3,255,926 A | * | 6/1966 | Modderno ................... 222/136 |
| 3,358,746 A | * | 12/1967 | Crowe .......................... 164/306 |
| 3,458,076 A | * | 7/1969 | Babcock ........................ 215/6 |
| 3,693,941 A | | 9/1972 | Suchy |
| 3,696,919 A | * | 10/1972 | Miles ........................... 206/221 |
| 4,106,825 A | | 8/1978 | Ruyak |
| 4,231,990 A | | 11/1980 | Jottier ......................... 422/100 |
| 4,325,914 A | | 4/1982 | Ruyak ......................... 422/102 |

(Continued)

FOREIGN PATENT DOCUMENTS

| DE | 132279 | 9/1978 |
| DE | 4216295 A1 | 11/1993 |
| DE | 19723469 A1 | 12/1998 |
| FR | 2737977 | 2/1997 |
| WO | WO 00/09255 | 2/2000 |

OTHER PUBLICATIONS

Büchi AG, "<<büchi pressflow gas controller bpc>>—for dependable and reproducible hydrogenation with precise gas consumption measurements", date unknown, 4 pages, Bohemia, New York.

*Primary Examiner*—David Sorkin
(74) *Attorney, Agent, or Firm*—Christensen O'Connor Johnson Kindness PLLC

(57) ABSTRACT

An apparatus for the addition of a compound or compound mixture to another which includes a primary vessel adapted having at least one receptacle adapted to contain at least one primary substance. At least one secondary vessel is provided. Each secondary vessel is adapted to contain at least one secondary substance. Each secondary vessel is movably mounted within the primary vessel for movement between a stored position and at least one mixing position. In the stored position, a peripheral edge of each secondary vessel is above a level of the at least one primary substance. In each mixing position the peripheral edge of the secondary vessel is moved below the level of the at least one receptacle containing the at least one primary substance, thereby permitting the at least one primary substance to overflow the peripheral edge into the secondary vessel with the at least one secondary substance.

21 Claims, 38 Drawing Sheets

U.S. PATENT DOCUMENTS

| | | |
|---|---|---|
| 4,843,131 A | 6/1989 | Becker et al. ............... 526/65 |
| 4,889,692 A | 12/1989 | Holtzman ................. 422/102 |
| 4,912,181 A | 3/1990 | Becker et al. ............... 526/65 |
| 5,217,695 A | 6/1993 | Augustine et al. .......... 422/111 |
| 5,272,092 A * | 12/1993 | Hamasaki et al. .......... 436/172 |
| 5,692,644 A | 12/1997 | Gueret ...................... 222/80 |
| 5,882,605 A | 3/1999 | Sortwell ..................... 422/135 |
| 5,989,499 A | 11/1999 | Catanzariti et al. ........... 422/63 |
| 6,284,195 B1 | 9/2001 | Lai et al. ..................... 422/58 |
| 6,306,658 B1 | 10/2001 | Turner et al. ................ 436/37 |
| 2002/0023864 A1 * | 2/2002 | Anderson ................. 210/787 |

* cited by examiner

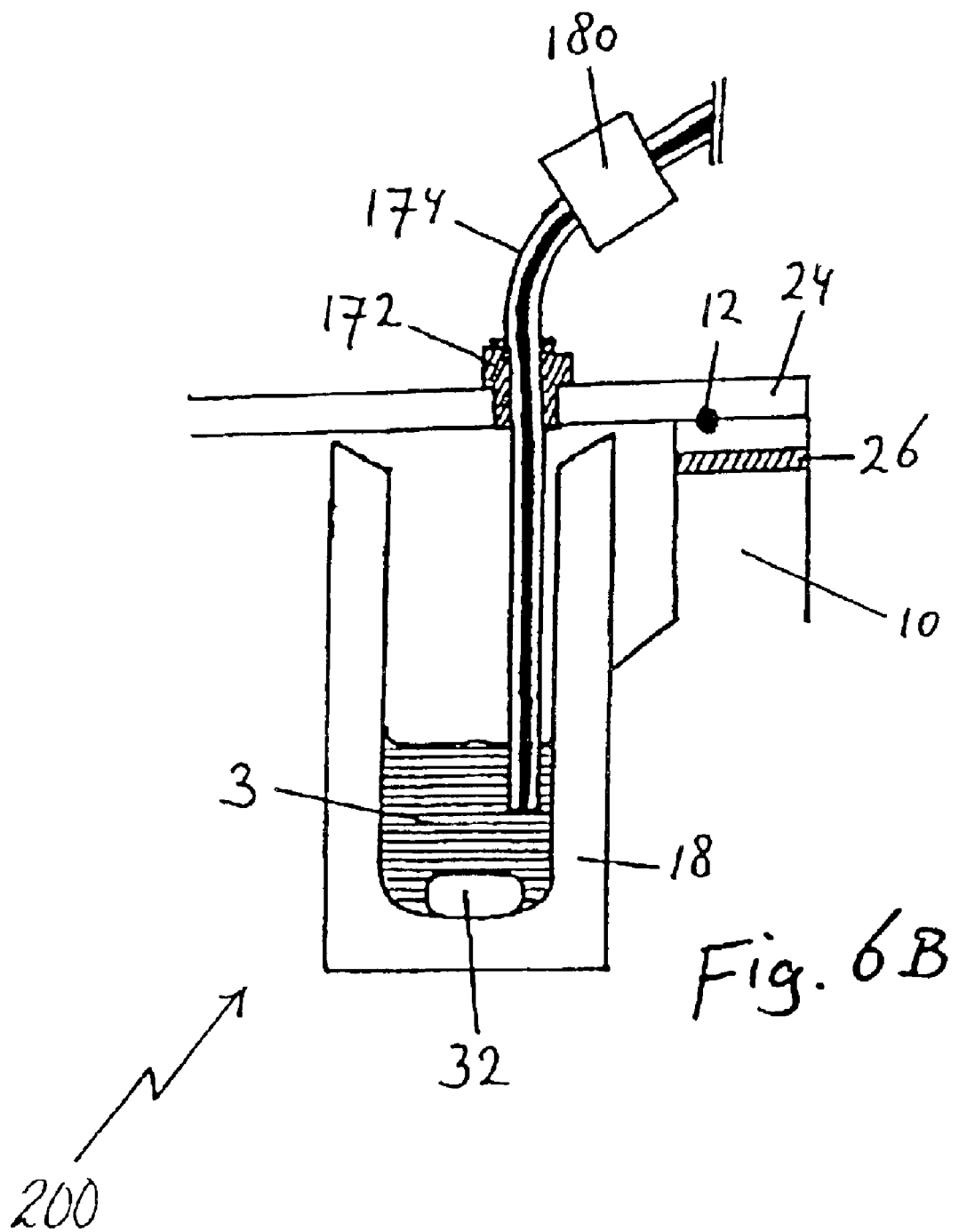

APPARATUS FOR THE ADDITION OF A COMPOUND OR COMPOUND MIXTURE TO ANOTHER

FIELD OF THE INVENTION

The present invention relates to single or multiple reactors, specifically to the addition of two compounds or compound mixtures to each other under various reaction conditions.

BACKGROUND OF THE INVENTION

In combinatorial chemistry, a large number of compounds, substances or chemicals are created from a relatively small set of precursors. Subsequently these compounds are evaluated for suitability for a particular application. Compared to traditional discovery methods, combinatorial methods sharply reduce the costs associated with preparing and screening each compound.

This new research technology allows rapid screening of large sets of compounds or mixtures of compounds. As a result the discovery of new drugs, catalysts and materials is accelerated. The associated decrease in development time and costs has revolutionized the discovery of new drugs, catalysts and materials.

The development of compounds suitable for a particular application can be subdivided into two main steps. The first step is compound synthesis. The second step is the screening of these compounds for a specific reaction or property. Either of these steps can be time consuming thereby limiting the speed of improvement.

Because of the large number of candidate materials, parallel screening and synthesis of compounds is used. Often suitable compounds have to be added to other substances under specific conditions. Common conditions are temperatures and pressures, using reactive gases, other than ambient. Two kinds of devices are commonly used for screening and synthesis of compounds under varying conditions.

One is the glass bomb, which consists of a thick walled glass container. Such a bomb contains one compound and a stir bar for magnetically stirring the contents of the bomb. The bomb is closed with an elastic rubber gasket and crown or crimp-cap. Pressures above ambient can be maintained in such a container. This is achieved by using a pressure supplying needle that penetrates the gasket. Additional compounds can be added in liquid form, while the bomb is pressurized, using a needle and syringe combination.

Several disadvantages are apparent using such an apparatus. Because of the use of breakable glass the apparatus is potentially unsafe. This is especially so when used with spontaneous combustible precursors and flammable gases or solvents. The pressure range over which this apparatus can be used is limited. This is due to the strength of the crimp-cap/gasket combination. The range of compounds that can be synthesized or tested is limited by the leaching of substances present in the gasket. These substances can poison the screened compounds or contaminate the synthesized compounds. This in turn limits the lowest testable concentration of the screened compounds. This can be a disadvantage when compounds are difficult or expensive to make. Furthermore solids cannot be added directly to the content of the bomb in a simple way. Compounds that are added using the syringe and needle combination cannot easily be saturated with gas. The use of compounds not saturated with gas can modify screening conditions in an unpredictable way. Furthermore the syringe has to be compatible with the compound added and the reaction conditions used. Lubricants and materials used in manufacturing syringes for instance can poison screened compounds. When glass bombs are used for parallel screening and synthesis, the number of reactions that simultaneous and reproducibly can be run can be limited by the injection time of additional compounds. Furthermore the accumulation of the previously mentioned disadvantages hinders parallel processing.

The other is the metal reactor. The reactor consists of a usually thick walled metal container closed with a metal lid. The lid often incorporates a mechanical stirrer. In addition often one or more tubes, including valves, as well as sensors are connected to the reactor. The tubes are used to introduce compounds into the reactor or remove compounds from the reactor. Both processes can take place at pressures and temperatures other than ambient. In parallel screening and synthesis of compounds, syringes are commonly used to introduce compounds into the reactor in combination with the mentioned valves and tubes.

However, the incorporation of several valves and tubes makes the manufacturing of such a apparatus expensive. Especially when metal reactors are used for parallel processing expensive modifications are necessary. Like the glass bomb, solids cannot be added directly to the content of the reactor. Compounds that are added using a syringe cannot easily be saturated with gas. The syringe used has to be compatible with the reaction conditions and the added compound. When metal reactors are used for parallel screening and synthesis, the number of reactions that simultaneous and reproducibly can be processed can be limited by the injection time of additional compounds. Furthermore the accumulation of the previously mentioned disadvantages hinders parallel processing.

SUMMARY OF THE INVENTION

What is required is a apparatus for the addition of a compound or compound mixture to another under various reaction conditions, parallel or otherwise.

According to the present invention there is provided an apparatus for the addition of a compound or compound mixture to another which includes a primary vessel adapted having at least one receptacle adapted to contain at least one primary substance. At least one secondary vessel is provided. Each secondary vessel is adapted to contain at least one secondary substance. Each secondary vessel is movably mounted within the primary vessel for movement between a stored position and at least one mixing position. In the stored position, a peripheral edge of each secondary vessel is above a level of the at least one primary substance. In each mixing position the peripheral edge of the secondary vessel is moved below the level of the at least one receptacle containing the at least one primary substance, thereby permitting the at least one primary substance to overflow the peripheral edge into the secondary vessel with the at least one secondary substance. Means is provided for moving the at least one secondary vessel from the stored position to the at least one mixing position.

With the apparatus, as described above, when the secondary vessel is moved from the stored position to the mixing position, two substances are combined in the secondary vessel. Although the primary vessel may have an open top, for most reactions it is preferred that a top closure be provided on the primary vessel. While there are different ways of moving the secondary vessel from the stored position to the mixing position, beneficial results have been obtained through the use of fluid pressure supplied by pressurized gas. In the embodiments which will hereinafter be described, the movement of the secondary vessel moves vertically up and down within the primary vessel. It will be appreciated that other movements could be used, such as a tipping movement. It is preferred that secondary vessel be removable from the primary vessel to facilitate cleaning and equipment maintenance.

Although beneficial results may be obtained through the use of the apparatus, as described above, additional features may be added to expand the utility of the apparatus. It is preferred that the top closure have at least one conduit in fluid communication with the primary vessel. This is useful for such purposes as taking a sample from or add substances to the secondary vessel. Means can be provided for stirring the contents of the at least one secondary vessel. For example, a rotatably mounted spindle can be provided with radially extending paddles and means provided for rotating the spindle. Means can be provided for heating the contents of the primary vessel, the at least one secondary vessel or both. Beneficial results have been obtained through the use of a resistive heating element. Means can be provided for cooling the contents of the primary vessel, the secondary vessel or both. Beneficial results have been obtained through provision of a conduit for circulating coolant. Means can be provided for measuring the temperature of the contents of the primary vessel, the secondary vessel or both. This can be accomplished by a temperature sensor positioned in the primary vessel, the secondary vessel or both. Alternatively, the primary vessel can be equipped with a top closure which permits temperature readings to be taken by an external infrared camera. Means can be provided for spectroscopically investigating the contents of the at least one secondary vessel. This may include a light source, a light path through the at least one secondary vessel and a spectrometer. Means can be provided to determine the relative position of the secondary vessel within the primary vessel, to determine whether movement has taken place to the mixing position. Means can be provided for monitoring pressure within the primary vessel. There are other enhancements which can be added, as will hereinafter be further described.

Although beneficial results may be obtained through the use of the apparatus, as described above, it is possible to add to the sophistication and complexity of the apparatus. This can be done through the use of multiple secondary vessels. The apparatus is not restricted to a single secondary vessel. It is also possible to provide for multiple mixing positions by providing two receptacles in the primary vessel at different heights. At a first mixing position, a first primary substance overflows from a first of the at least two receptacles over the peripheral edge into the secondary vessel with the at least one secondary substance. At a second mixing position, a second primary substance overflows from a second of the at least two receptacles over the peripheral edge into the secondary vessel with the first primary substance and the at least one secondary substance.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein:

FIG. 6B is a side elevation view, in section, of the apparatus illustrated in FIG. 5A.

DETAILED DESCRIPTION OF THE PREFERRED FIRST EMBODIMENT

Figure 1A:
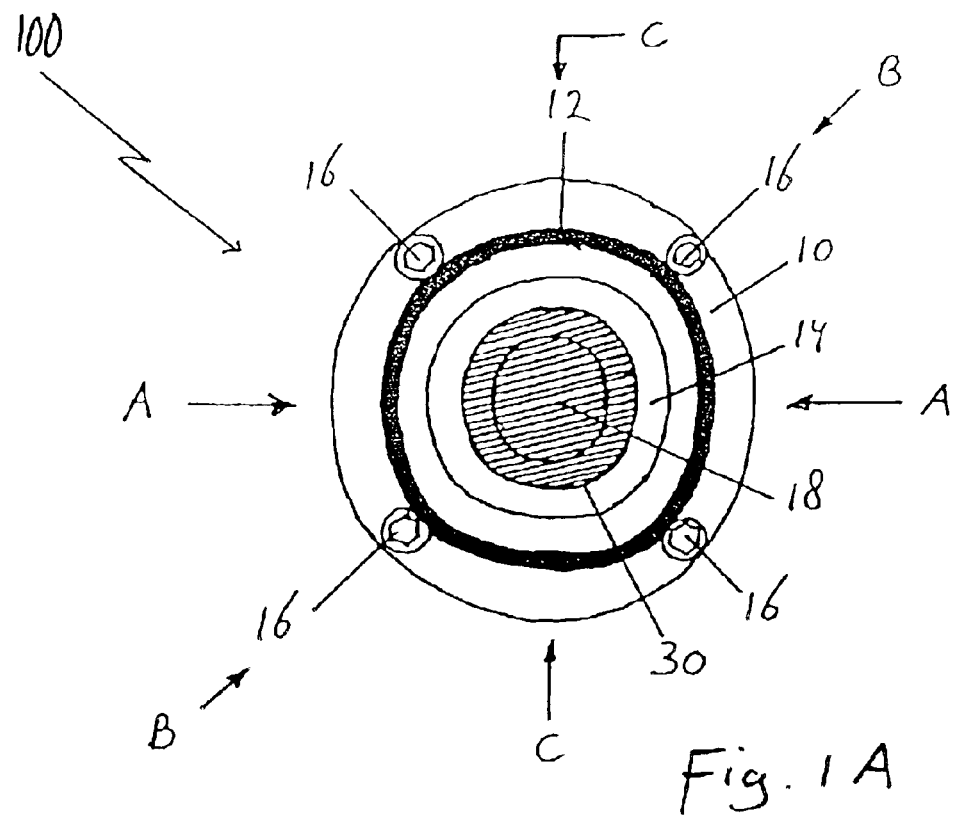
FIG. 1A is a top plan view of a first preferred embodiment of the apparatus constructed in accordance with the teachings of the present invention.

The preferred embodiment, an apparatus for the addition of a compound or compounds, generally identified by reference numeral 10, will now be described with reference to FIGS. 1A through 4H.

Structure and Relationship of Parts

Figure 1B:
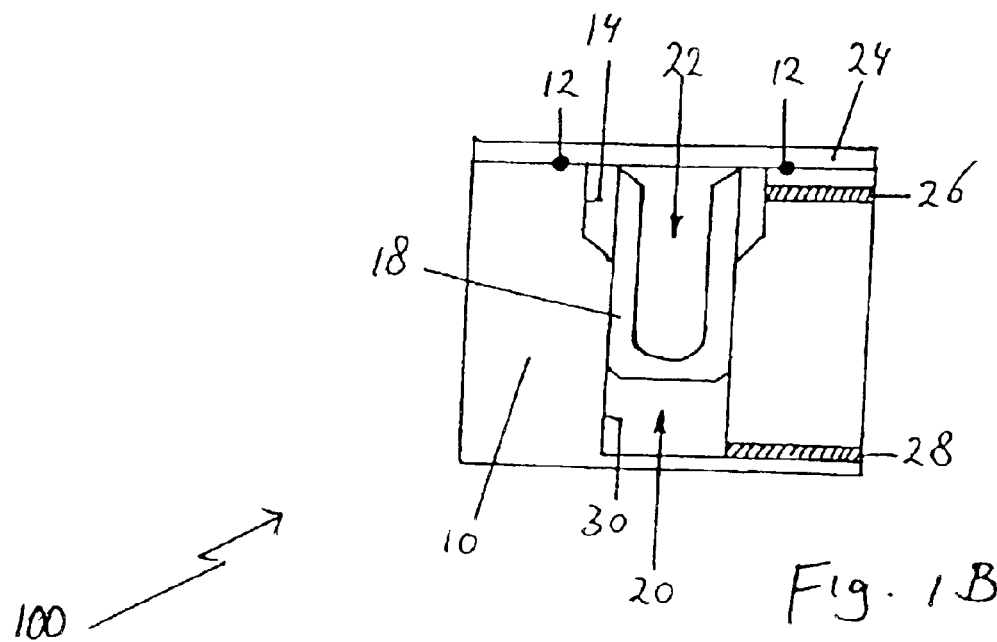
FIG. 1B is a side elevation view in section taken along the line A—A of the apparatus illustrated in FIG. 1A, before filling with compounds.
Figure 1C:
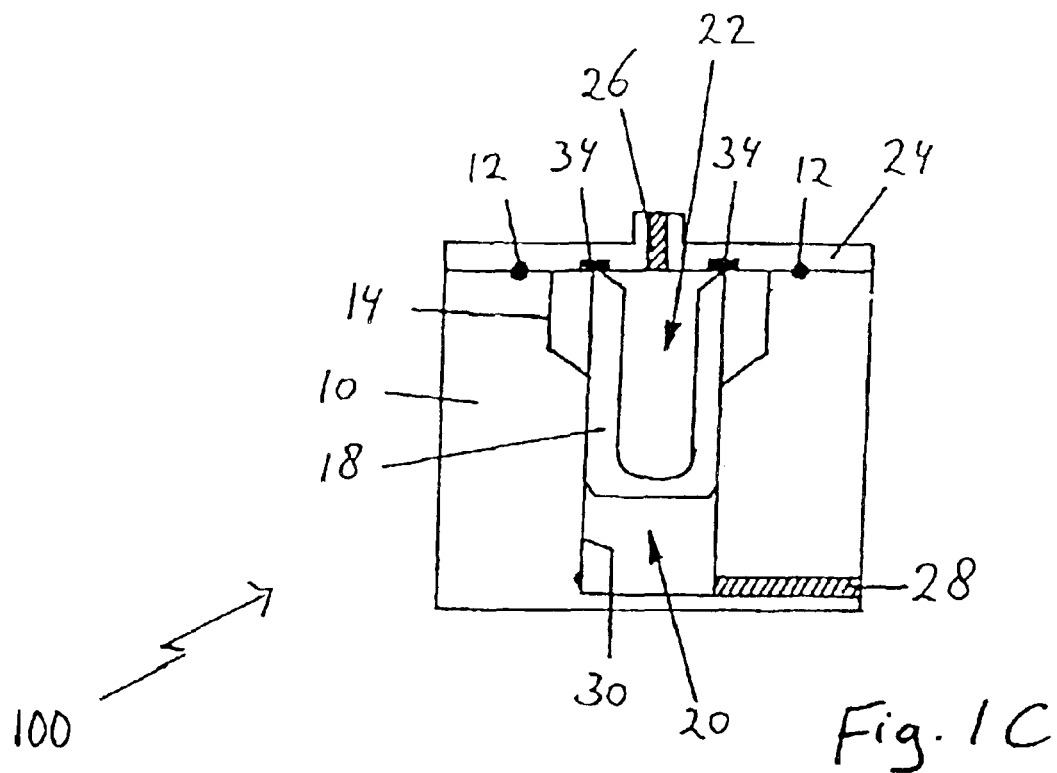
FIG. 1C is a side elevation view, in section, taken along the line A—A of the apparatus of FIG. 1A with the channel being mounted in the top plate.
Figure 1D:
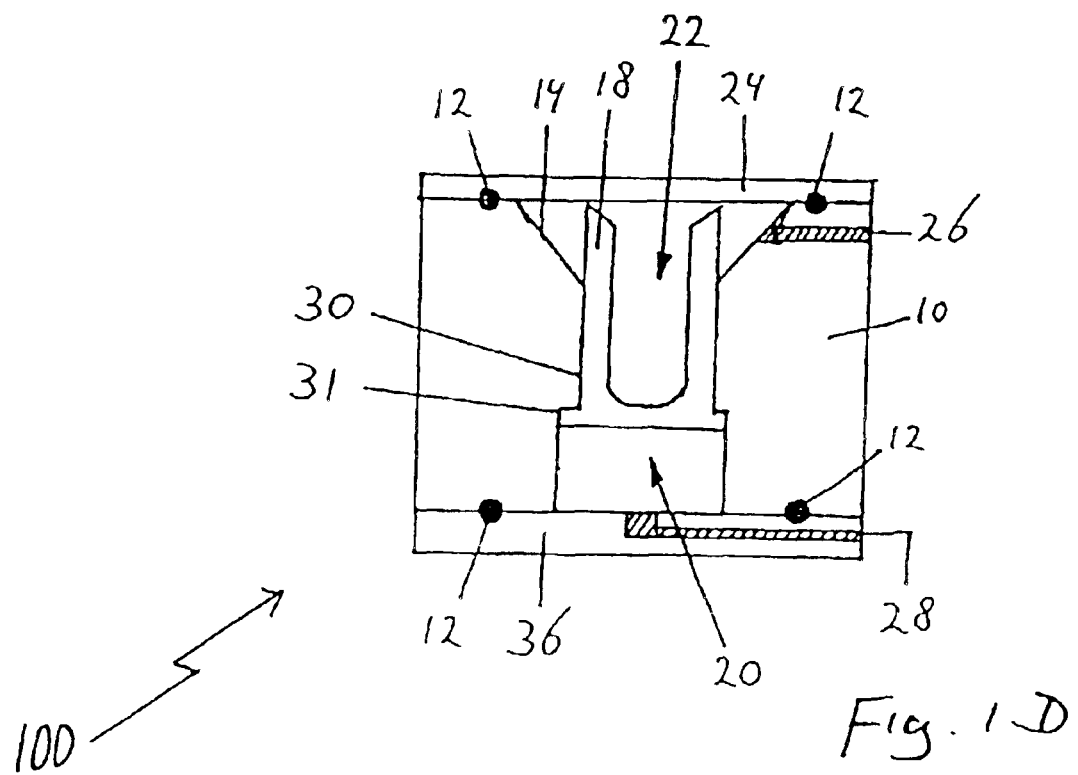
FIG. 1D is a side elevation view, in section, of the apparatus taken along line A—A of the apparatus illustrated in FIG. 1A with the channel being mounted in a bottom plate.
Figure 1E:
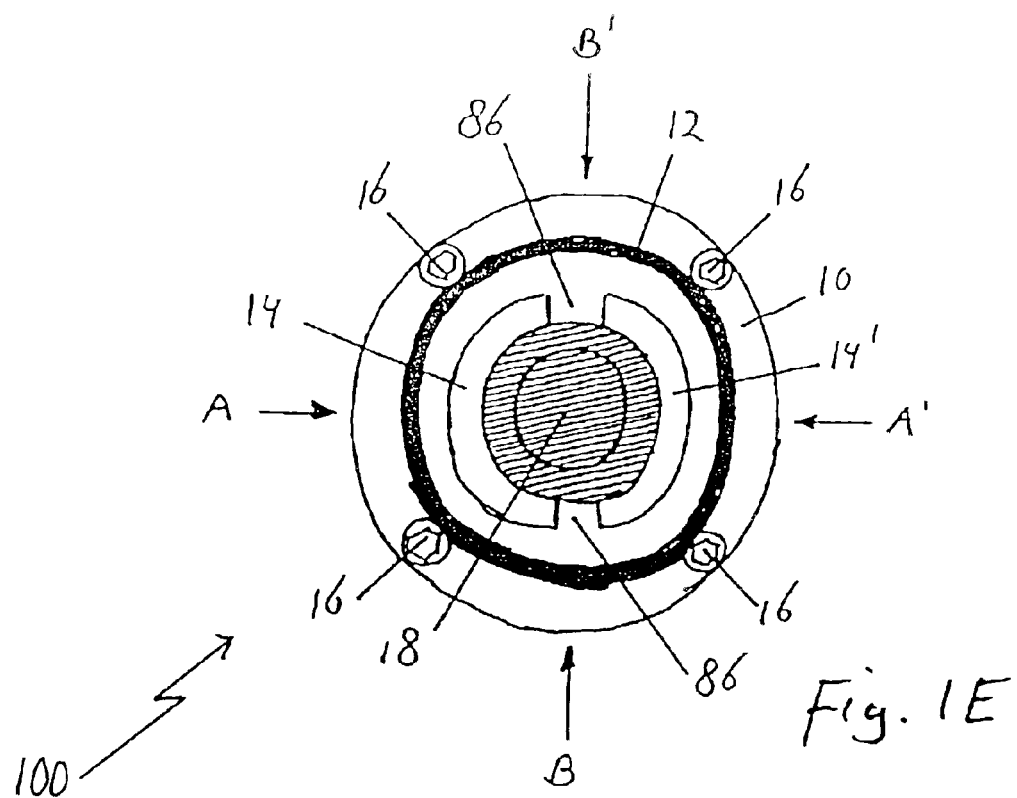
FIG. 1E is a top plan view, in section, of the apparatus illustrated in FIG. 1A.
Figure 1F:
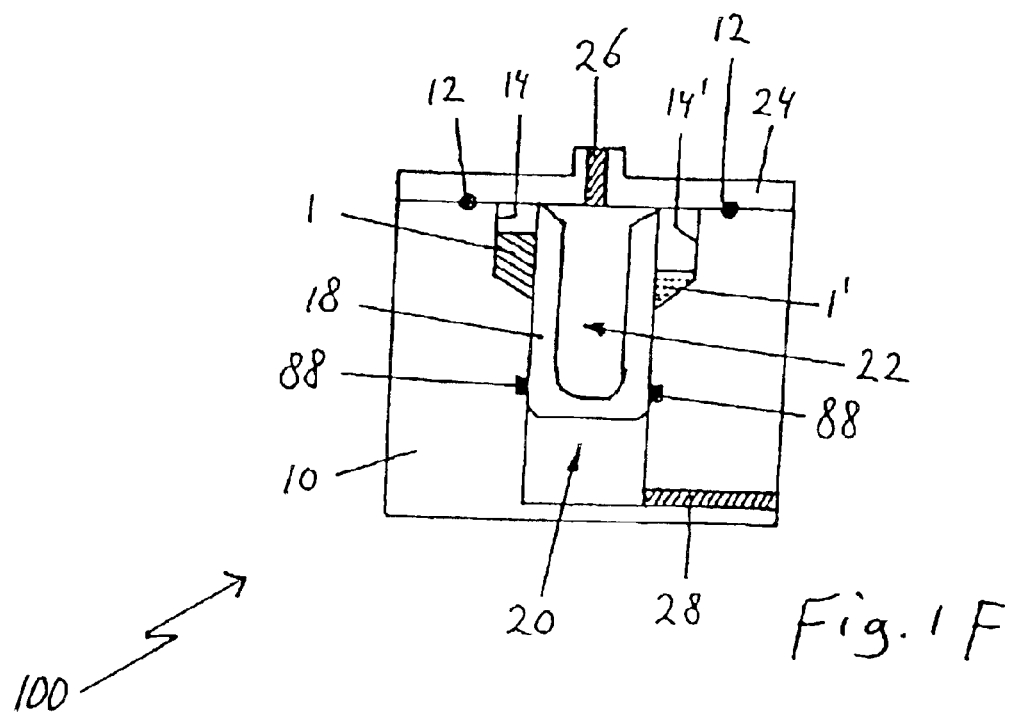
FIG. 1F is a side elevation view, in section, taken along line A—A, of the apparatus illustrated in FIG. 1A.
Figure 1G:
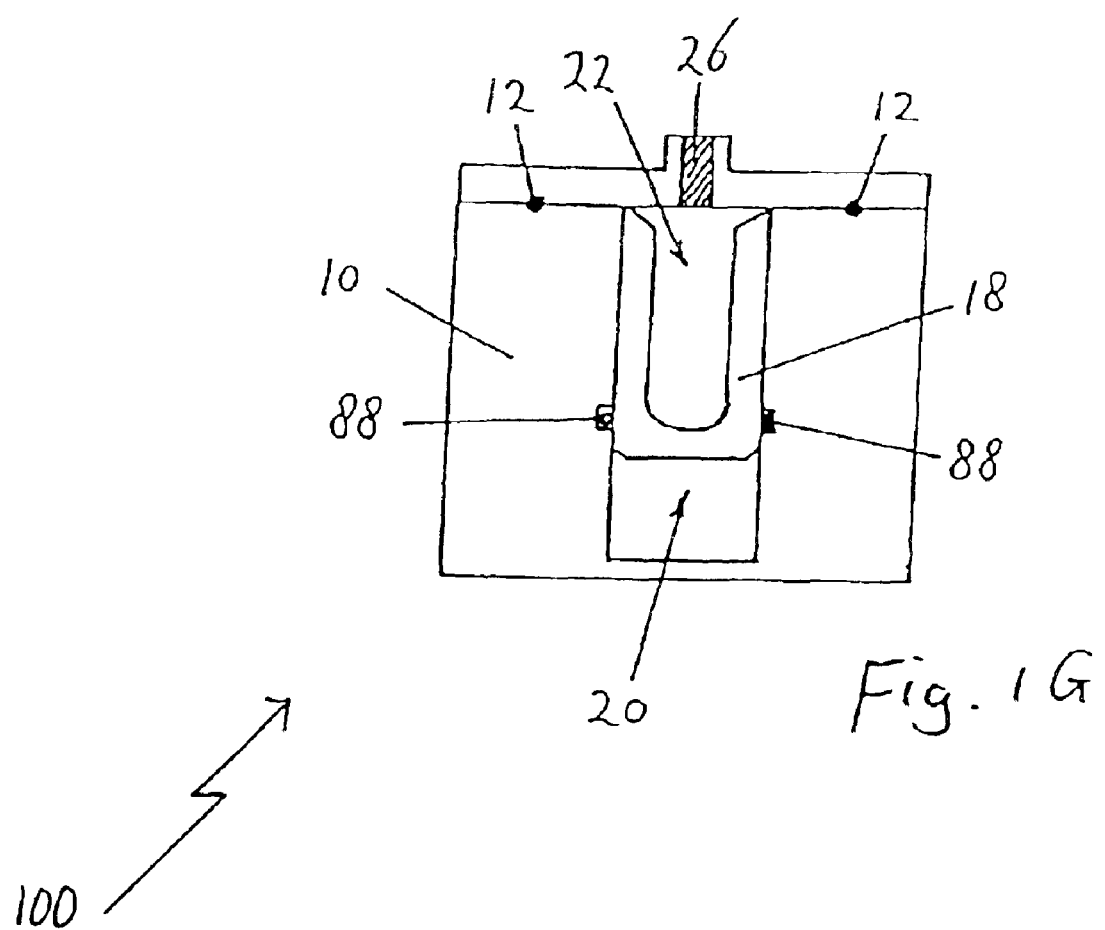
FIG. 1G is a side elevation view, in section, taken along line B—B, of the apparatus illustrated in FIG. 1A.
Figure 1H:
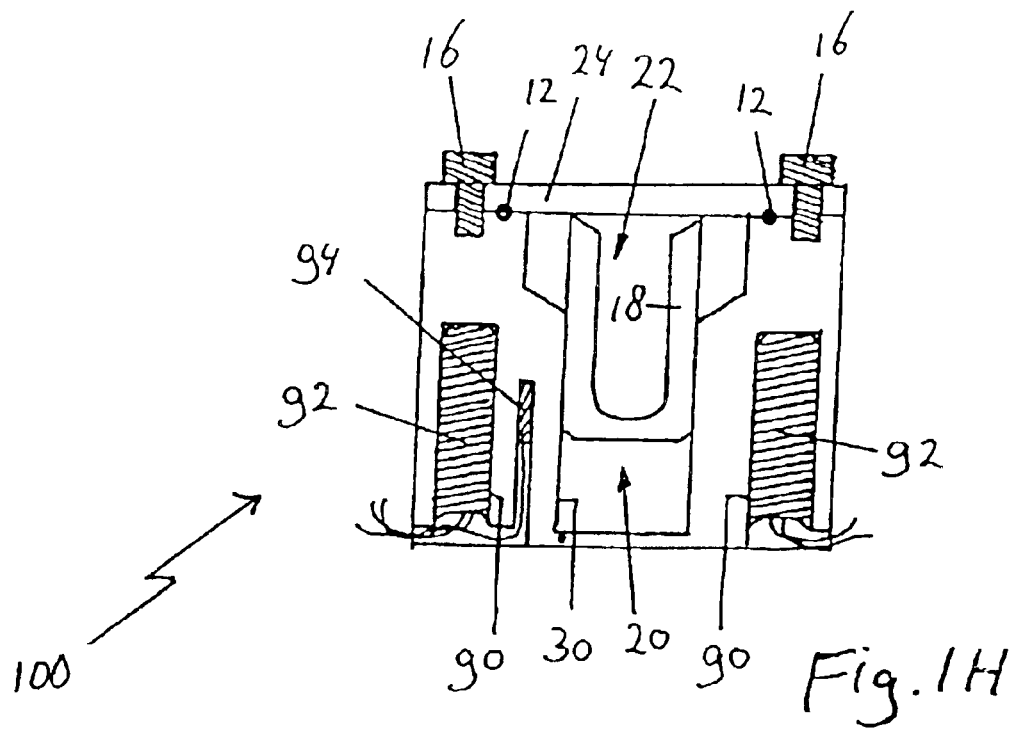
FIG. 1H is a side elevation view, in section, taken along line A—A, of the apparatus illustrated in FIG. 1A.
Figure 1I:
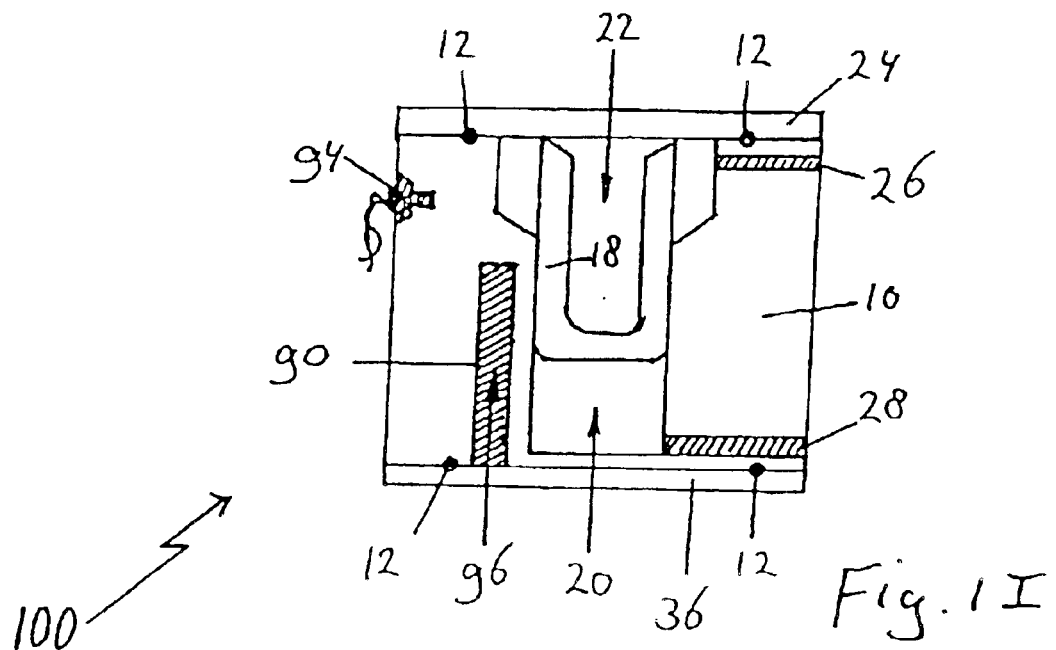
FIG. 1I is a side elevation view, in section, taken along line A—A, of the apparatus illustrated in FIG. 1A.
Figure 1J:
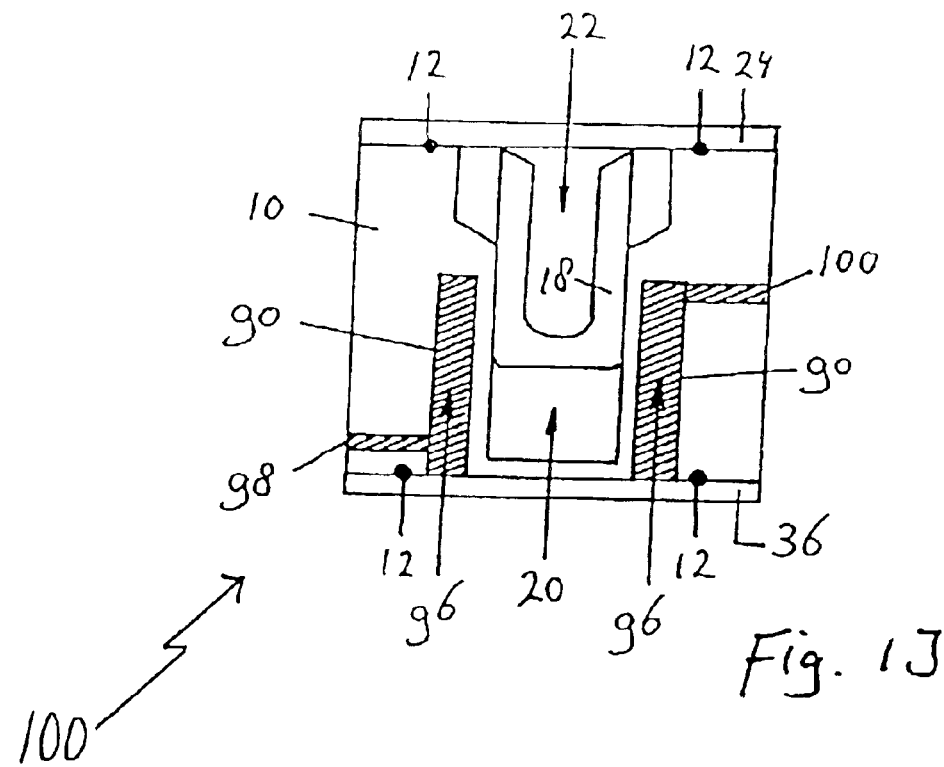
FIG. 1J is a side elevation view, in section, of the apparatus illustrated in FIG. 1A, along the line C—C.
Figure 1K:
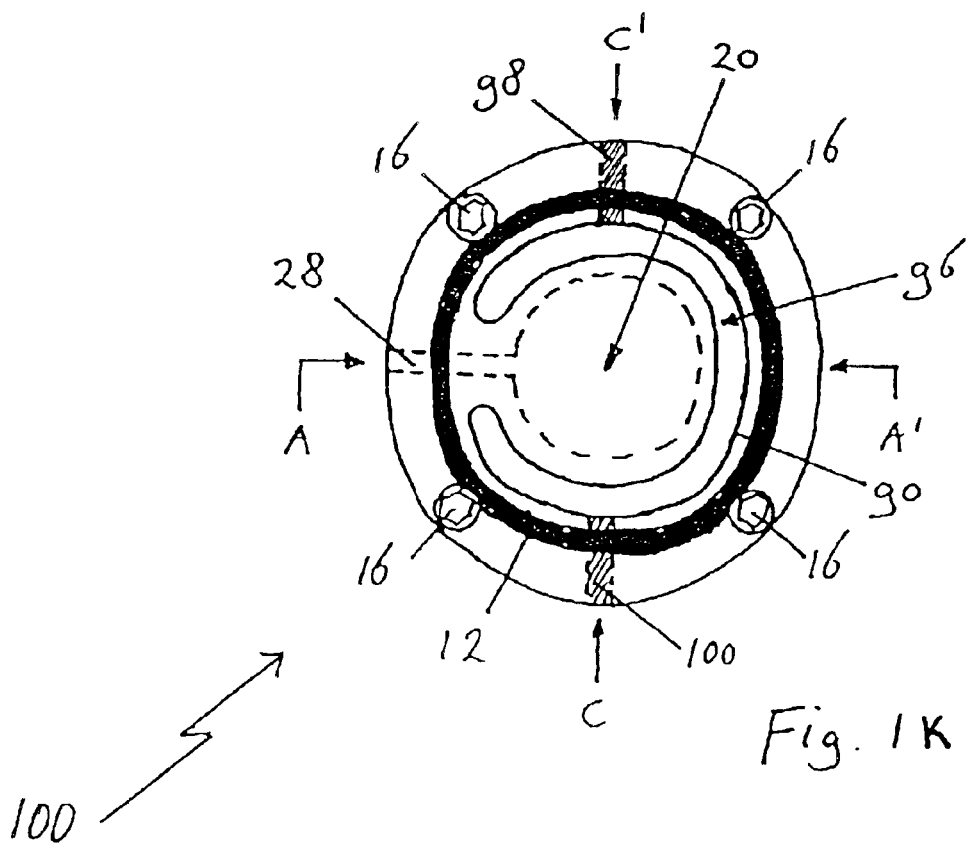
FIG. 1K is a bottom plan view, in section, of the apparatus illustrated in FIG. 1A.
Figure 1L:
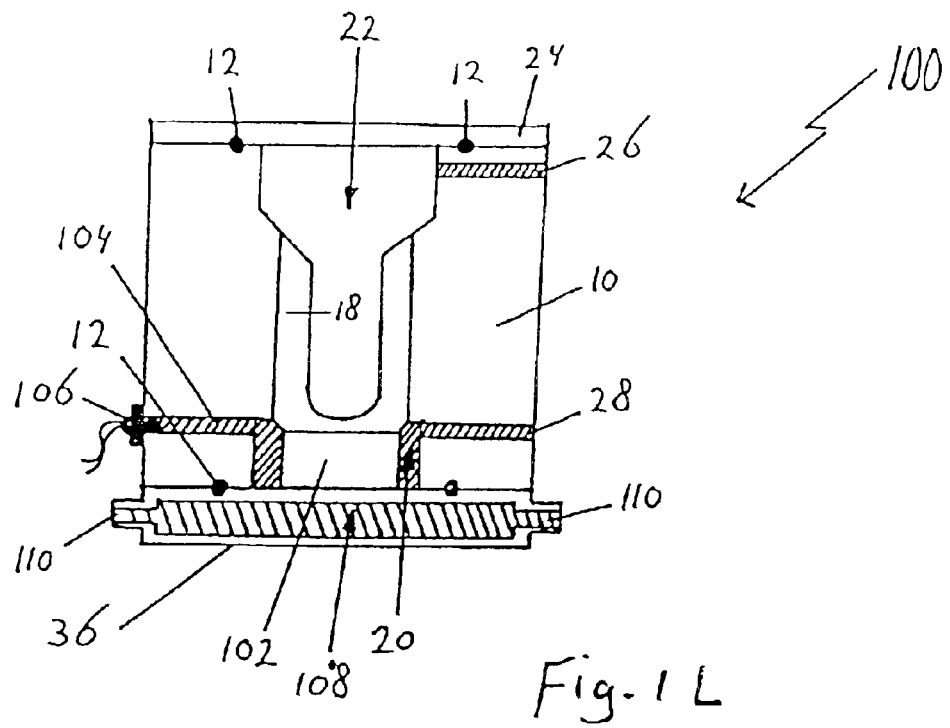
FIG. 1L is a side elevation view, in section, taken along the line of A—A of the apparatus illustrated in FIG. 1A.
Figure 1M:
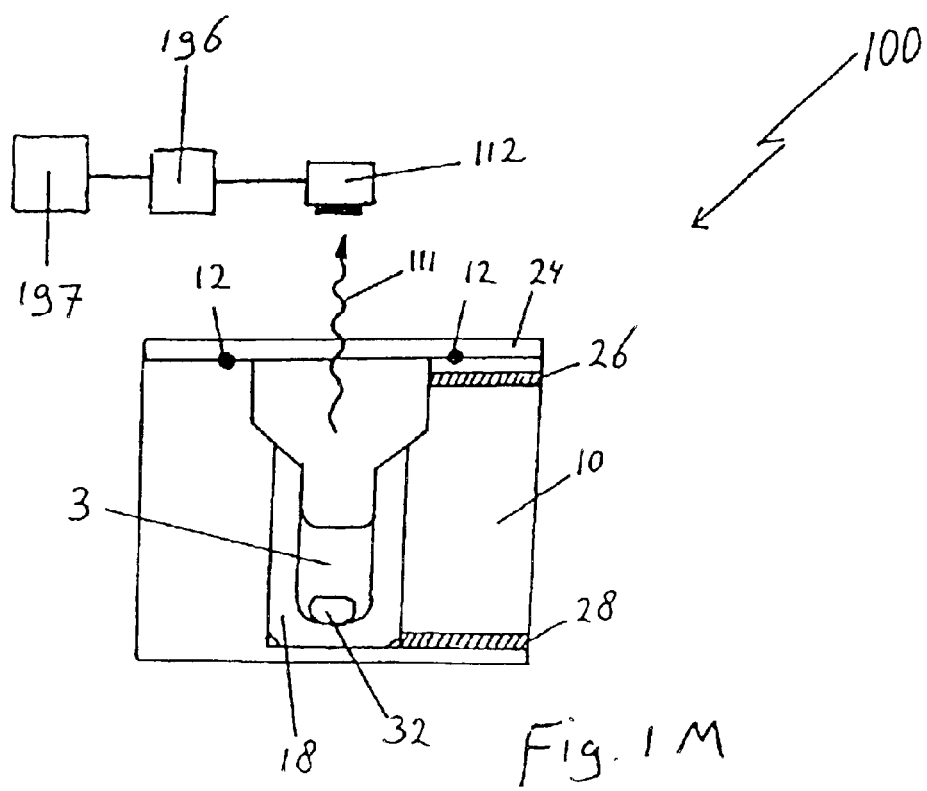
FIG. 1M is a side elevation view, in section, of the apparatus illustrated in FIG. 1A.
Figure 1N:
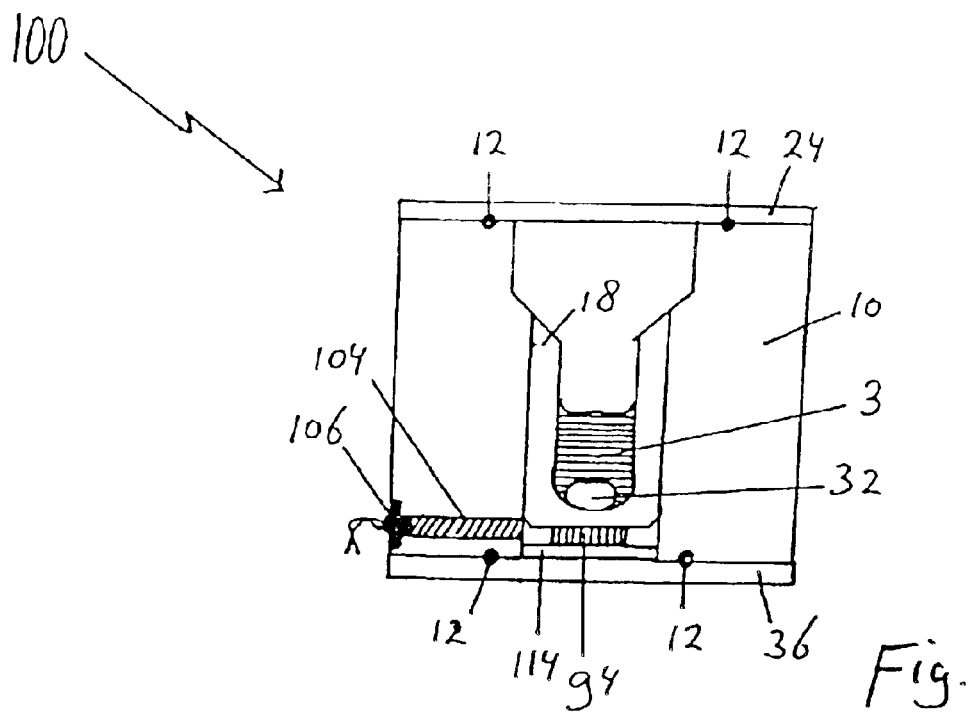
FIG. 1N is a side elevation view, in section, of the apparatus illustrated in FIG. 1A, along the line of C—C.
Figure 1O:
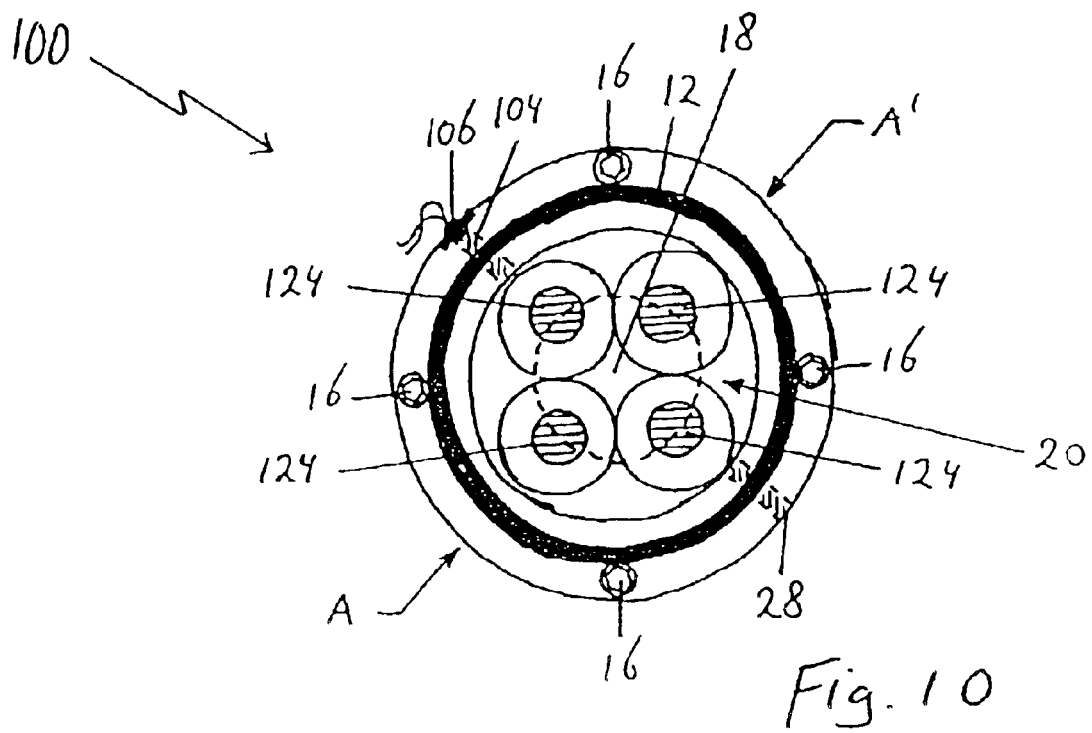
FIG. 1O is a top plan view, in section, taken along line A—A, of the apparatus illustrated in FIG. 1A.
Figure 1P:
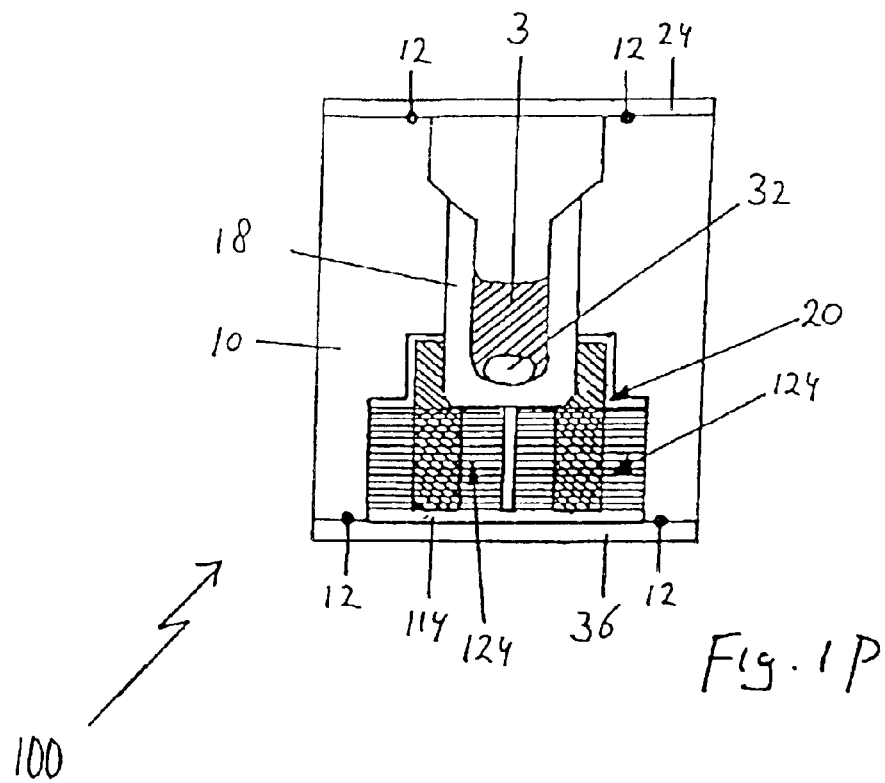
FIG. 1P is a side elevation view, in section, taken along line A—A, of the apparatus illustrated in FIG. 1A.
Figure 1Q:
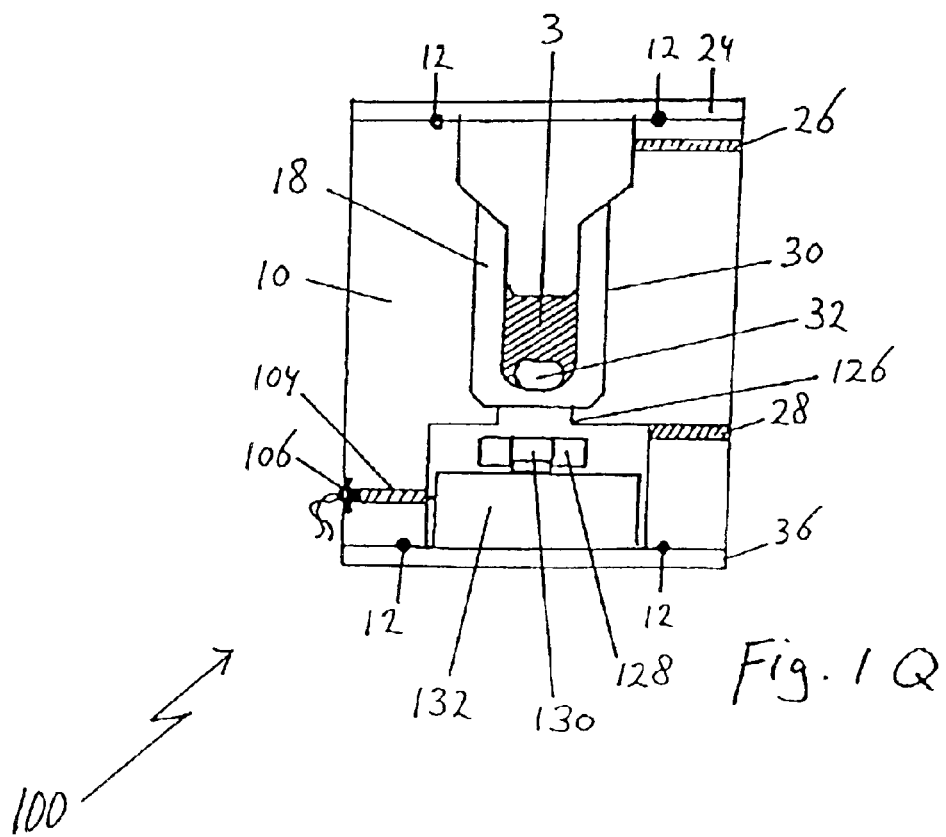
FIG. 1Q is a side elevation view, in section, taken along line A—A, of the apparatus illustrated in FIG. 1A.
Figure 1R:
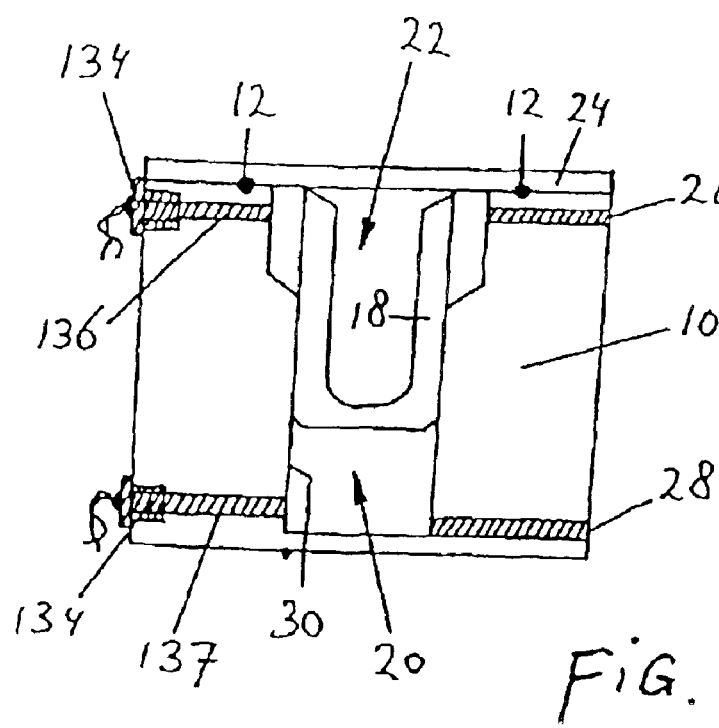
FIG. 1R is a side elevation view, in section, taken along the line A—A of the apparatus illustrated in FIG. 1A.
Figure 1R:
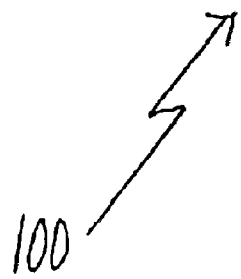
Figure 1S:
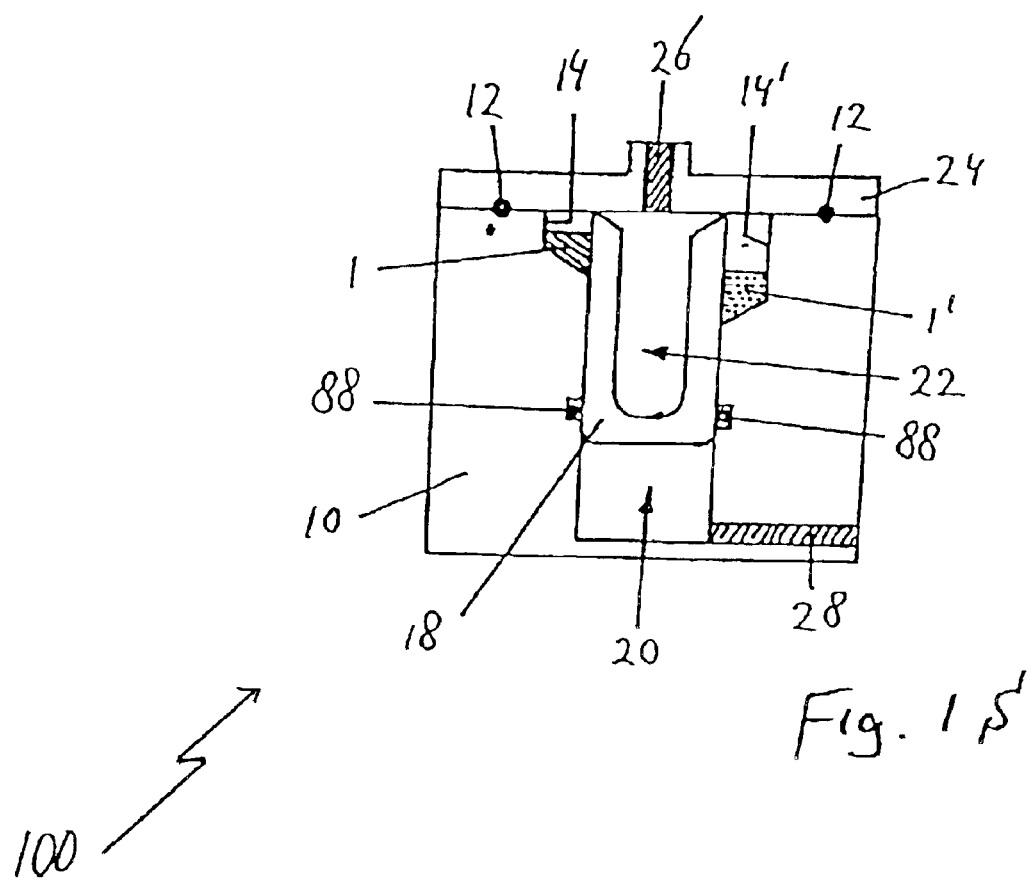
FIG. 1S is a side elevation view, in section, taken along line A—A of the apparatus illustrated in FIG. 1A.

Referring to FIGS. 1A through 1S, there is illustrated a first embodiment of the apparatus, generally identified by reference numeral 100. Referring to FIG. 1A, apparatus 100 included a cylindrical body 10 which serves as a primary vessel. In this body 10, a bore 30 is machined that connects to a wider recessed area 14. This area 14 is designated as the top of the apparatus 100. In bore 30, a piston 18 is mounted which serves as a secondary vessel. When this piston 18 is mounted, a lower chamber 20 is created. This chamber 20 consists of the bore 30 and the bottom of the piston 18. Lower chamber 20 communicates at all times with a lower channel 28. An upper chamber 22 is created by placing a leak-free cover or top plate 24 over the piston 18, recessed area 14 and body 10. As shown in FIGS. 1B and 1C, the top of the piston 18 communicates at all times with at least one channel, passage or opening 26. The recessed area 14 may communicate with at least one channel 26, as depicted in FIG. 1B. Channels 26 and 28 can be mounted in the body 10, as shown in FIG. 1B. Channel 26 can also be mounted in the top plate 24 as shown in FIG. 1C.

Channel 28 can also be mounted in a bottom plate 36 as shown in FIG. 1D. These channels can be used for the addition or circulation of liquids, mixtures of liquids and solids, and gases. FIGS. 1B and 1C also show piston 18 mounted in the top, start or initial position.

Figure 2A:
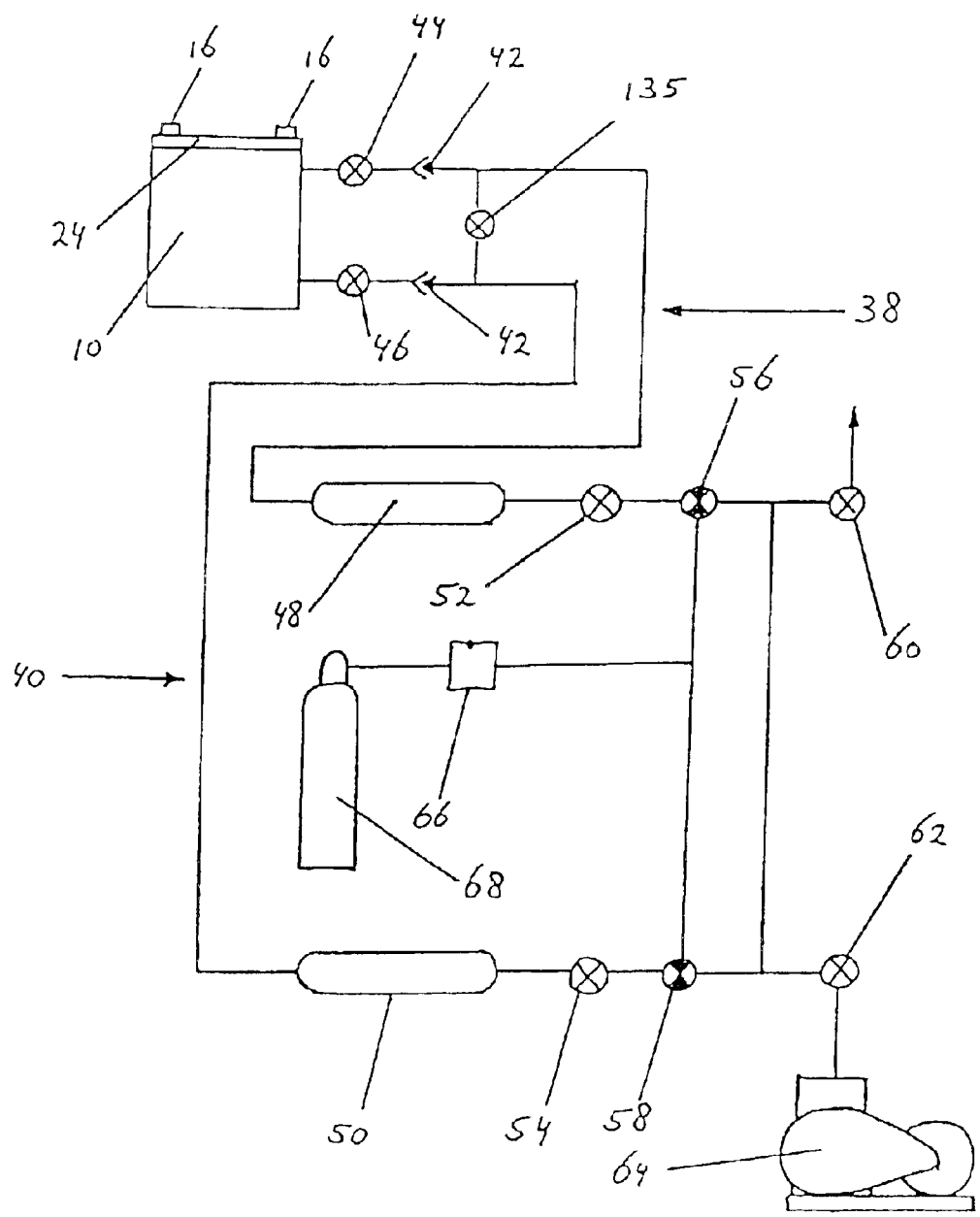
FIG. 2A is a schematic view illustrating an arrangement of valves for varying the pressure in the lower chamber.

Channels 26 and 28 are used to create a pressure difference over the piston 18. For pressurizing the upper chamber 22 a reactive or inert pressurized gas or mixture of gases is used. For pressurizing the lower chamber 20 the same gas, a different gas, a mixture of gases or an hydraulic fluid is used. Preferably the same gas is used for both chambers. Preferably the gas pressure is regulated and set at the required reaction pressure as is shown in FIG. 2A. Channels 26 and 28 are connected to the lines 38 and 40 of FIG. 2A. A system of valves is mounted in lines 38 and 40. The function of these valves is to independently vary the pressure in the lower chamber 20 connected to line 40, and the upper chamber 22 connected to line 38.

One example from a large set of possible variations for a system of valves suitable for such a function is given in FIG. 2A. FIG. 2A shows a set of two-way valves 44, 46, 52, 54, 60, 62 and 135. In addition two three-way valves 56 and 58 are present. The two three-way valves 56 and 58 allow line 38 and 40 to be connected to either valves 60 and 62 or a source of pressurized gas. Referring to FIG. 2A, gas pressure is supplied by a gas cylinder 68, and maintained at a specific pressure by a regulator 66. Another way of supplying gas pressure is by using a compressor. Valve 60 is connected to the atmosphere. Valve 62 is connected to a source of vacuum. Vacuum can, for instance, be created by a vacuum pump 64. Preferably a rotary vane pump is used. The valves can be manually, electronically or pneumatically opened and closed. Through a suitable opening and closing of the valves, bottom chamber 20, connected to line 40, can be put under vacuum, pressurized with gas or vented to the atmosphere. Through a suitable opening and closing of the valves the top chamber 22, connected to line 38, can be put under vacuum, pressurized with gas or vented to the atmosphere. Valve 135 allows independent or simultaneous pressurizing or venting of the upper and lower chambers 20. Both chambers can be isolated by closing valves 44 and 46. Valves 44 and 46 can be mounted before or after connectors 42. The chambers can be stepwise pressurized or depressurized by the valves 44, 46 and 52, 54. The step size is determined by the container or buffer-volume 48 and 50 captured between valves 44 and 52, and 46 and 54. This buffer-volume 48 and 50 can be from about 1 to about 50% of the chamber volume to which the buffer is connected. The buffer-volume can be formed by a suitable length of tubing or a cylinder. Valves and lines are made of materials suitable for the reaction conditions used, like metals or plastics. Preferably the lines are made of stainless steel. The lines 38 and 40 may contain connectors 42 allowing disconnection of the apparatus. These connectors may be self closing thereby preventing the exposure of the content of the apparatus to air. Valves and connectors suitable for use under the reaction conditions can be obtained from commercial vendors like Nupro, Swagelok or Parker Instrumentation.

Referring back to FIG. 1B, the top plate 24 preferably is made of a metal, like stainless steel, or glass. The top plate 24 can also be made of plastic, an elastomer, ceramic materials or materials transparent for, or reflecting infrared or other forms of electromagnetic radiation. A combination of the mentioned materials can also be used. In order to maintain a leak-free seal between the top plate 24 and the body 10 a ring seal 12 compatible with the screening conditions may be incorporated in the body 10 or top plate 24. Such ring seals are available through commercial vendors like Parker Seals, and have to be combined with suitable fasteners like for example bolts 16 shown in FIG. 1A.

When piston 18 is mounted in the start position, the top of the piston 18 is placed near the top plate 24 as shown in FIG. 1B. The piston 18 can also be placed against the top plate 24 as shown in FIG. 1C. The top of the piston 18 may be leak-free sealed when placed against the top plate 24 as shown in FIG. 1C. In this position the chamber formed by the piston 18 and the top plate 24 preferably is connected to channel 26 mounted in the top plate 24. To achieve a sufficient seal between the piston 18 and the top plate 24 a flexible washer 34 can be mounted in the top plate 24 as shown in FIG. 1C. Washers suitable for use under the reaction conditions can be obtained from commercial vendors.

Figure 3A:
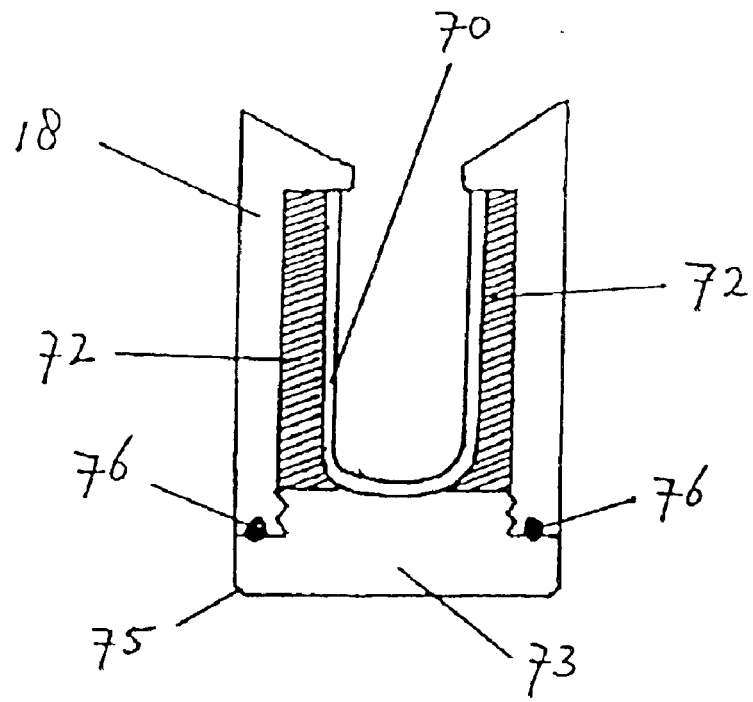
FIG. 3A is a detailed side elevation view, in section, of the piston of the apparatus illustrated in FIG. 1A.
Figure 3B:
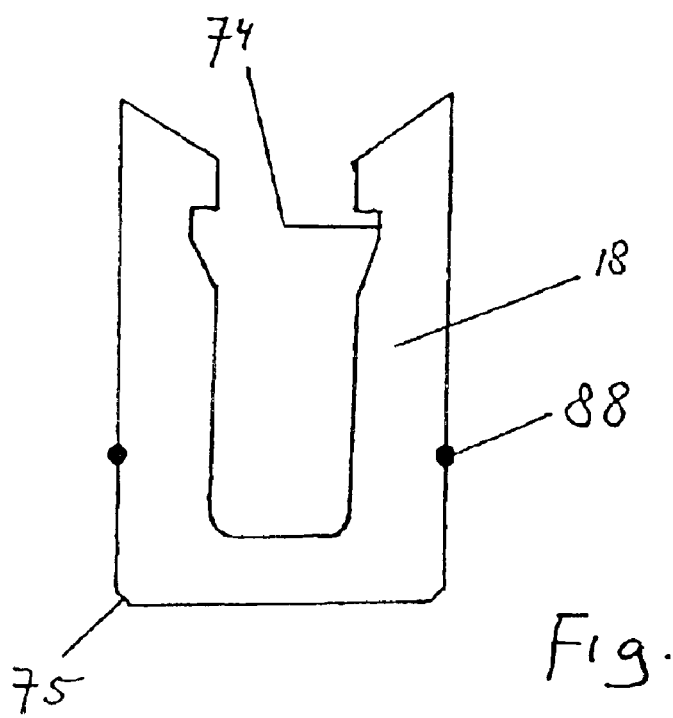
FIG. 3B is a detailed side elevation view, in section, of the piston of the apparatus illustrated in FIG. 1A.
Figure 3C:
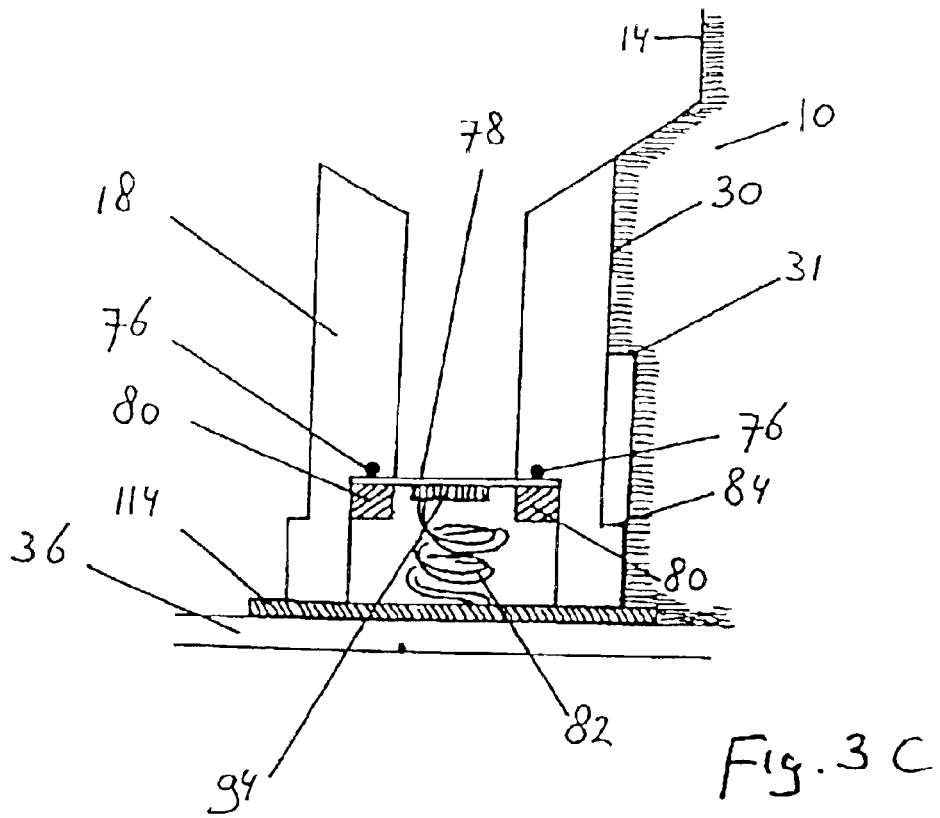
FIG. 3C is a detailed side elevation view, in section, of the piston of the apparatus illustrated in FIG. 1A.
Figure 3D:
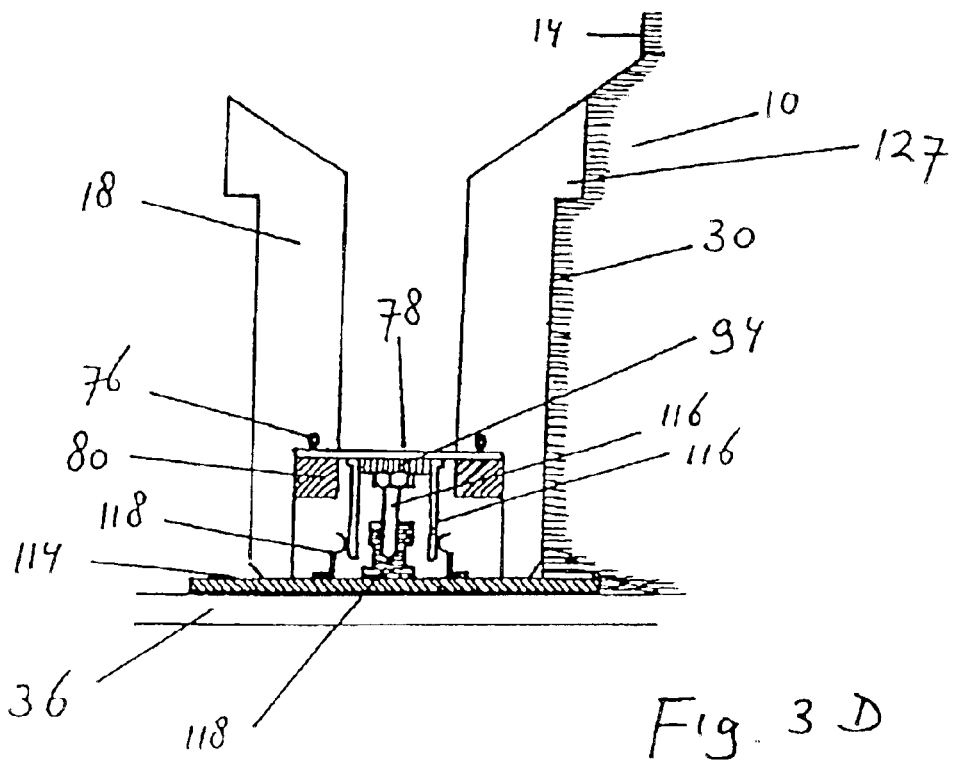
FIG. 3D is a detailed side elevation view, in section, of the piston of the apparatus illustrated in FIG. 1A.
Figure 3:
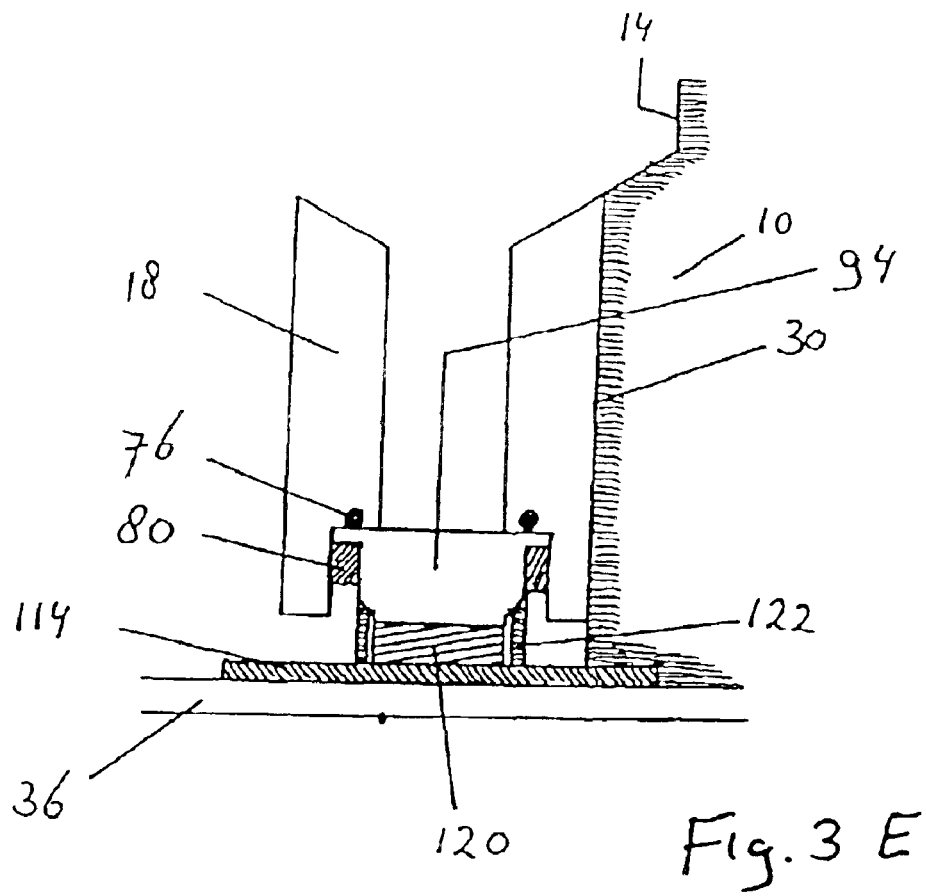
FIG. 3E is a detailed side elevation view, in section, of the piston of the apparatus illustrated in FIG. 1A.
FIG. 3F is a detailed side elevation view, in section, of the piston of the apparatus illustrated in FIG. 1A.
Figure 3:
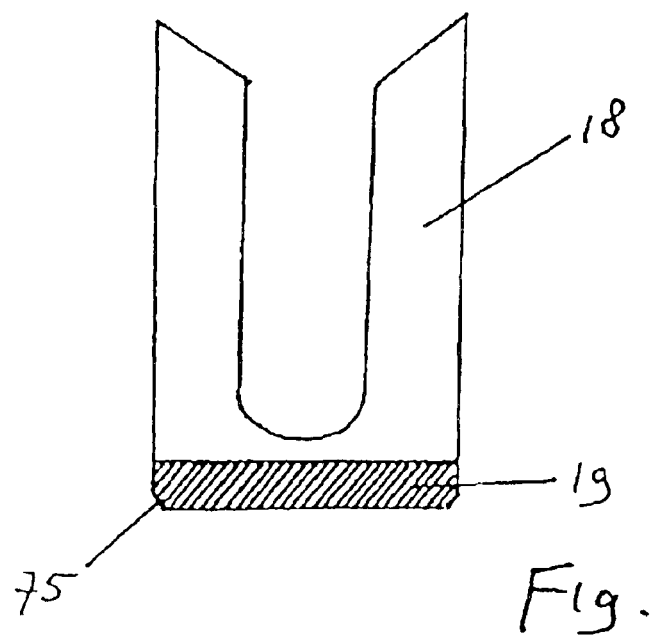
Figure 4A:
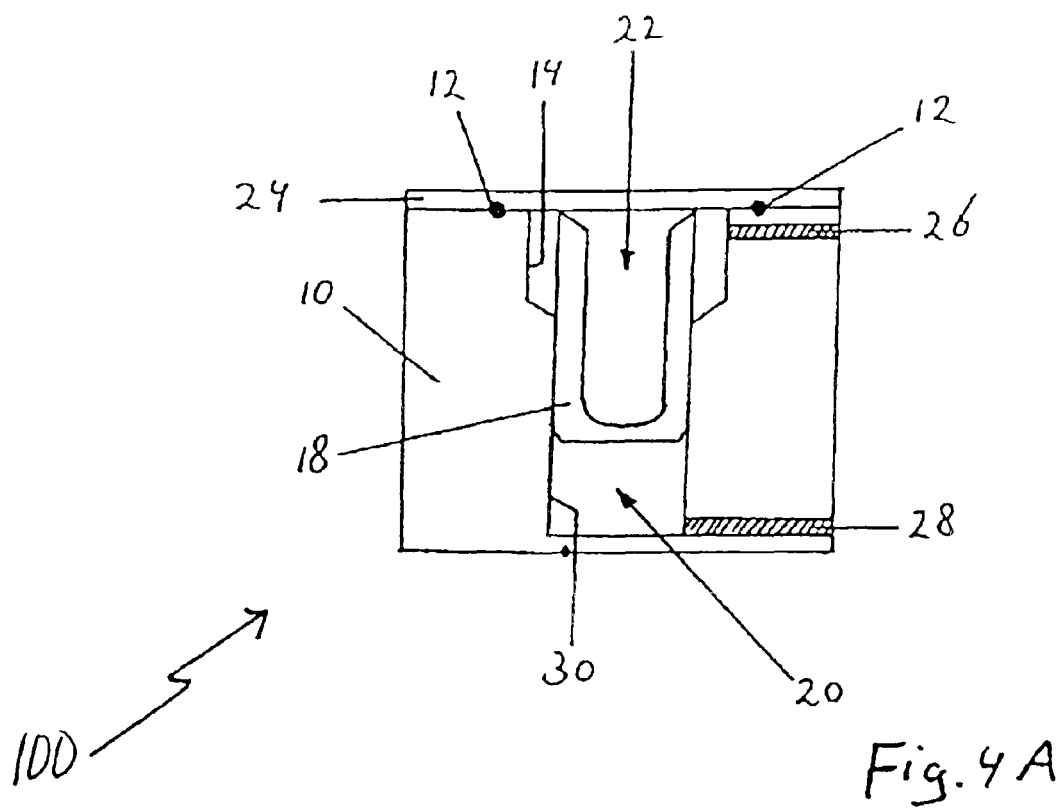
FIG. 4A is a side elevation view, in section, of the apparatus illustrated in FIG. 1A
Figure 4B:
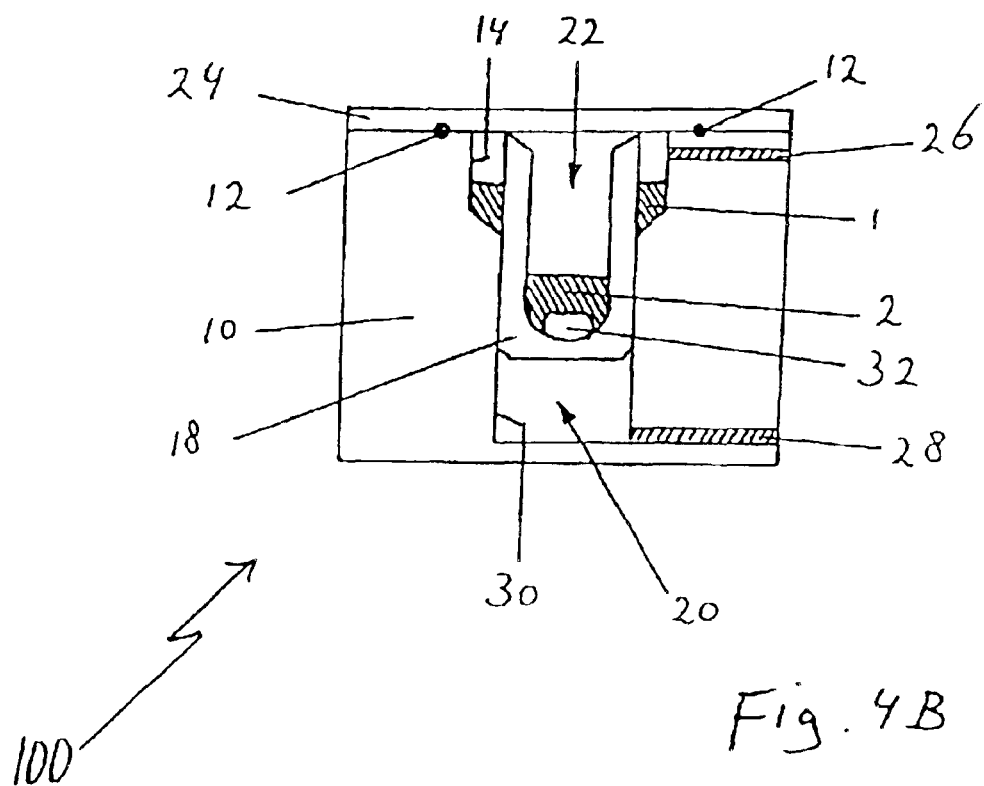
FIG. 4B is a side elevation view, in section, of the apparatus illustrated in FIG. 1A.

Referring to FIG. 1B, piston 18 is hollow and provides a container for one compound or mixtures of compounds. This container can also accept biochemical or biological samples. These liquids, solids or mixtures of these are hereafter called compound 2 and indicated in the FIGS. with the number 2. FIG. 4B shows the apparatus of FIG. 1B with a filled recessed area 14 (compound 1) and filled piston 18 (compound 2). In addition a magnetic stir bar 32 is present to stir the contents of the piston 18 magnetically. Such a stir bar 32 preferably is leak-free encapsulated by a material compatible with the reaction conditions, like for instance glass or plastic. Preferably the stir bar 32 is covered with PTFE. Stir bars 32 are commercially available. The piston 18 is made of metal, glass, ceramic materials or plastics such as polyethylene or PTFE. Materials transparent for infrared or other forms of electromagnetic radiation can also be used. Another possibility is a combination of the mentioned materials. The piston 18 preferably is made of a flexible plastic and can be a disposable item. As an alternative the piston 18 may hold a, possibly disposable, vessel surrounded by insulating material. Referring to FIG. 3A, piston 18 contains a vessel 70 surrounded by insulating material 72. Suitable insulating materials include glass wool, silicone rubber, and the like. Piston 18 is leak-free closed by a removable cover 73, a screw-cap for example, and O-ring 76 combination, that allows the placement and removal of vessel 70. The removable screwcap 73 and O-ring 76 are preferably dimensioned to maintain leak-free under the pressure difference between the upper chamber 22 and lower chamber 20 necessary to move the piston 18. The upper rim of piston 18 preferably is machined in such a way as to cover the vessel 70 completely as shown in FIG. 3A. Piston 18 preferably is formed to assist the addition of compound 1, stored in the recessed area 14 and compound 2, stored in the piston 18. The piston 18, for instance, can have a slope machined at the top as shown in FIG. 1B. In that way a funnel is formed pointing inwards towards the container of compound 2. The bottom of the container formed by piston 18, preferably should be of a form allowing efficient stirring. In addition the piston 18 may incorporate identification features like distinct colors or other suitable codes. The piston 18 may incorporate features to assist placement and removal of the piston 18. For instance the bottom of the piston 18 preferably has a chamfer 75, depicted in FIG. 3B, to assist the insertion of the piston 18 into bore 30. Referring to FIG. 3B, the piston 18 also contains a furrow or groove 74 in the container wall to assist removal of the piston 18. In addition the piston 18 may have electronic components mounted in the bottom of the piston 18, as shown in FIGS. 3C and 3D. The volume of the container formed by piston 18 may vary from about 0.5 milliliter (mL) to about 500 mL, more particularly from about 1 ml to about 40 ml.

Referring back to FIG. 1B, in the start position a leak-free seal is maintained between the bore 30 and the piston 18. In this position a storage area is formed by the recessed area 14 and the exposed outer wall of piston 18. The recessed area 14 machined in the body 10 can be of various shapes but preferably is cylindrical, as shown in FIG. 1B, or conical, as shown in FIG. 1D. The recessed area 14 accepts a compound or mixtures of compounds when the piston 18 is mounted in the top position of bore 30. The recessed area 14 can also accept biochemical or biological samples. These liquids, solids or mixtures of these are hereafter called compound 1, and indicated in the FIGS. by the number 1.

The container volume of the recessed area can be smaller, equal to or larger then the volume of the piston 18. The volume of the recessed area may be from about 0.1 milliliter (mL) to about 500 mL, more particularly from about 0.5 mL to about 20 mL. The storage area formed by the recessed area 14 and the exposed outer wall of piston 18 can be subdivided. To illustrate the principle the storage area is divided by two partitions, panels or walls 86 depicted in FIG. 1E. This allows the storage of two separate compounds 1 and 1 in the recessed areas 14 and 14 as long as the piston 18 is in the start position. 1F shows the two recessed and isolated areas 14 and 14 filled with compounds 1 and 1. FIG. 1G shows the walls 86 that touch the top plate 24. The walls 86 may form a leak-free seal with the top plate 24 and the exposed outer wall of piston 18. The interface, border or crossing between the two recessed areas 14 and 14 and the bore 30 can be at the same level, as depicted in a cross-section in FIG. 1F. The interface between the two recessed areas 14 and 14 can be at different levels, as depicted in FIG. 1S. Referring to FIG. 1S, the interface of the recessed area 14 with the bore 30 is located above the interface of the recessed area 14.

Referring back to FIG. 1B, the interface between the recessed area 14 and the bore 30 preferably is machined in a special way. The bottom of the recessed area 14 can have a slope to form a funnel pointing towards the piston 18. This is to assist the addition of compound 1, stored in the recessed area 14, when the piston 18 is in a position other than the start position. For the addition of solids preferably a steeper slope is used, as shown in FIG. 1D, to prevent the retention of solids.

The bottom of body 10 may be formed by a leak-free mounted bottom plate 36. This bottom plate 36 is for instance shown in FIGS. 1D and 1L. FIGS. The bottom plate 36 preferably is made of a metal, like stainless steel. Materials like glass, ceramic materials or plastics can be used. Materials transparent for, or reflecting infrared or other forms of electromagnetic radiation can also be used. In addition a combination of the mentioned materials can be used. In order to maintain a leak-free seal an O-ring seal 12 may be combined with suitable fasteners like for example bolts 16. Bolts 16 are shown in FIG. 1K. O-ring seals compatible with the screening conditions are available through commercial vendors like Parker seals. As shown in FIG. 1D, the bottom plate 36 may contain channels 28 that communicate with the lower chamber 20. These channels 28 can be used for the addition, removal or circulation of liquids or gases. The bottom plate 36 may also contain one or more channels 28 or chambers 108 communicating with channels 110 as shown in FIG. 1L. The channels 28 or chambers 108 can be used to circulate a thermal fluid through the bottom plate 36. The bottom plate 36 can also support a printed circuit board 114 as shown in FIG. 1N.

Referring back to FIG. 1B, a bore 30 is machined in the body 10. Bore 30 allows piston 18 to travel leak-free and smoothly. The maximum distance the piston 18 can travel down preferably is limited by the bottom of the bore 30 in FIG. 1B or the bottom plate 36 of the body 10 in FIG. 1D. The maximum distance the piston 18 can travel down can also be limited by electronic components like for example sensors 94 in FIG. 1N, contacts 122 and 120 in FIG. 3E or printed circuit board 114 in FIG. 3C mounted on the bottom plate 36. Referring to FIGS. 3C and 3E printed circuit board 114 are mounted on the bottom plate 36 and body 10. The distance the piston 18 can travel down can also be limited by a step 126 machined on the bore 30 as shown in FIG. 1Q. The distance the piston 18 can travel down can also be limited by a rim 127 machined on the piston 18 as shown in FIG. 3D. FIG. 3D shows piston 18 resting on a printed circuit board 114 as well as part of the bottom plate 36 and body 10. Preferably such a piston 18 is only used when the recessed area 14 contains a liquid. Referring to FIG. 1B, the distance the piston 18 can travel up preferably is limited in such a way as to prevent direct communication between the channels 26 and 28. The distance the piston 18 can travel up can be limited by the top plate 24, or by a rim 84 tooled on the piston 18 as shown in FIG. 3C. The diameter of the bore 30 for mounting the piston 18 depicted in FIG. 3C must contain a step 31 of a diameter larger then the diameter of bore 30 in order to allow piston 18 to travel to the required top position, as shown in FIG. 1D.

Referring to FIG. 1B, the piston 18 can be moved up and down in the bore 30 by applying force on the bore. Preferably a gas/gas or gas/liquid pressure difference over the piston 18 using channels 26 and 28 generates this force. The required pressure difference is a function of the tightness of the seal between the piston 18 and the bore 30 and can be from about atmospheric to about 10000 psi. Typically the pressure difference necessary to move is in the range of from about 5 psi to about 2000 psi and more particularly from about 10 psi to about 60 psi. To ensure a smooth movement of the piston 18 the width to height ratio should preferably be about 0.7 or smaller. Furthermore the depth of the bore 30 supporting the piston 18 preferably should be about 60% of the height of the piston 18 or more.

A preferred way of maintaining a leak-free seal between a flexible piston 18 and the bore 30 before, during and after movement of the piston 18 is the following. A tapered, flexible piston 18 is combined with a straight bore 30 machined in the body 10. The piston 18 is wide at the top and narrow at the bottom. The taper is such that the piston 18 can be inserted in the bore 30. In this start position a leak-free seal is maintained in the absence of a pressure difference over the piston 18. The machined taper combined with the flexible piston 18, allows the piston 18 to move. During movement, the seal between the bore 30 and the piston 18 is maintained or improved. Another way of maintaining a leak-free seal is to combine a straight, flexible piston 18 with a tapered bore 30. The tapered bore 30 is wide at the top and narrow at the bottom.

In order to maintain a leak-free seal between a rigid or flexible piston 18 and the bore 30 before, during and after movement of the piston 18, one or more ring seals 88 may be incorporated. Such ring seals can be placed in bore 30, as shown in FIG. 1F. A ring seal might be placed in piston 18, as shown in FIG. 3B. Seals should be placed on the piston 18 in such a way as to be in contact with the bore 30 at all times during use of the apparatus. Seals should be placed in the bore 30 in such a way as to be in contact with the piston 18 at all times during use of the apparatus. Seals compatible with the screening conditions are available through commercial vendors. Yet another way of maintaining a leak-free seal between a rigid or flexible piston 18 and the bore 30 before, during and after movement of the piston 18 is to combine a ring seal with a tapered piston 18 or bore 30.

Body 10 in the preferred embodiment preferably is made of a metal such as stainless steel. Plastic, glass, ceramic materials, or a combination of the materials mentioned can also be used. The body 10 may be cylindrical as shown in FIG. 1A. Any other form of the body 10 compatible with its function is also possible.

In order to impose various reaction conditions on the content of the piston 18 and recessed area, the body 10 may contain channels for heating, cooling and electromagnets. In addition the body 10 may also contain channels for the addition or circulation of liquids, mixtures of liquids and solids, and gases. The body 10 may also contain features like channels, feed-throughs or connectors to mount sensors or fibre-optic. Such sensors or fibre-optics can monitor the variation of reaction conditions like for example temperature or pressure. Such sensors or fibre-optics can also monitor other parameters that reflect the screening process or synthesis under consideration like for example the light absorption of the piston 18 content.

Typical operating temperatures for the apparatus for instance range from about minus 150 degrees Celsius to about 250 degrees Celsius, more particularly in the range of from about 25 degrees Celsius to about 200 degrees Celsius. Body 10 contains channels 90 in which cartridge heaters 92 are mounted. Other forms of filament resistance heaters can also be used. Yet another way of maintaining a specific temperature above ambient is by wrapping the body 10 with a rubber flexible heater, for instance a Kapton or Silicone flexible heater. Suitable cartridge and flexible heaters are available through commercial vendors like Omega Engineering.

Another way of maintaining a specific temperature of the body 10 and the piston 18 is by using liquid cooling and heating. Preferably a thermal fluid is passed through one or more channels in the body 10.

In FIG. 1K, hidden channels in the body 10 are indicated by dashed lines. As is shown in the FIGS. 1L to 1K, the body 10 contains a channel 90. This channel is connected to an inlet channel 98 and outlet channel 100. Channel 90, as shown in FIGS. 1L and 1J is covered by a bottom plate 36. Bottom plate 36 is leak-free mounted using an O-ring 12 and bolts 16. O-rings 12 are compatible with the temperature range and circulating fluid are available through commercial vendors. The bottom plate 36 and the channel 90 now define a chamber 96. By passing a thermal fluid at a suitable temperature and flow rate through the chamber 96, body 10 and piston 18 can be maintained at a specific temperature. As an alternative the body 10 and piston 18 may be suspended or immersed in a bath containing the thermal fluid.

FIGS. 1L illustrates the use of thermoelectric apparatus for heating and cooling the piston 18. Thermoelectric apparatus can function as both heaters and coolers by reversing the current flow through the apparatus. These thermoelectric apparatus or Peltier elements transfer heat from one face of the apparatus to the other. In order to achieve maximum efficiency, one side of the apparatus must be in thermal contact with a heat source or sink. In FIG. 1L the heat source or sink is provided by a thermal fluid circulating through a chamber 108 contained in bottom plate 36. The thermoelectric device 102 is mounted on the bottom plate 36. The other side of the thermoelectric device 102 is in thermal contact with the piston 18, when the piston 18 is in the lowest position possible. In order to electrically connect the Peltier element 102, a channel 104 is present. The Peltier element preferably is electrically isolated from the body 10. Channel 104 connects the Peltier element to a leak-free mounted connector 106 suitable for the reaction conditions. Peltier elements are available through commercial vendors like TE Distributing, while suitable connectors are available through commercial vendors like Pave Technology Company.

Sensors, for example temperature sensors, may be incorporated in the body 10 in order to register the reaction conditions. Sensors may also be incorporated in the piston 18. These sensors can be permanently or intermittently electrically or electromagnetically connected to a suitable interface. FIGS. 1H and 1L show illustrated apparatus 100 with a temperature sensor 94 embedded in the wall. Suitable temperature sensors include jacketed or non-jacketed thermocouples, resistance thermometric apparatus and thermistors. The temperature sensors as depicted in FIGS. 1H and 1L register the temperature of the body 10 of the apparatus 100.

For measuring the temperature of the content of the piston 18 an infrared monitoring system can be employed. Such a system is depicted in FIG. 1M and consists for instance of the apparatus depicted in FIG. 1B, a top plate 24 transparent to infrared radiation and an infrared sensitive camera 112. The camera 112 is connected to a computer 196 for registration or analysis of the infrared radiation. The computer can be connected to suitable media storage such as hard drives, not depicted in FIG. 1M and a printer 197, for example a laserprinter. The camera is positioned outside the apparatus and detects and records the intensity of the infrared radiation 111 passing through the top plate 24. With suitable calibration, infrared intensity can be converted to temperature. With stirring, the temperature is uniform within the piston 18, and therefore the surface temperature of the piston 18 measured will agree with the bulk temperature measured by a conventional temperature sensor immersed in the content of the piston 18. Infrared cameras are available through commercial vendors like Cincinnati Electronics.

Another way of measuring the temperature of the content of the piston 18 is to mount a temperature sensor in the piston 18. Such a temperature sensor should make thermal contact with the content of the piston 18. One of many possible ways of using sensors to measure the temperature of the piston 18 content is depicted in FIG. 1N. In addition to the lower channel 28 (not shown in FIG. 1N), the lower chamber 28 formed by the bottom of the piston 18 and the bore 30 is connected to a channel 104. Channel 104 is a conduit for wires connecting the temperature sensor 94, mounted on a printed circuit-board 114, to a connector 106 suitable for use under the reaction conditions. Printed circuitboard 114 is mounted on the bottom plate 36 using suitable fasteners under the reaction conditions like for example screws, not shown in FIG. 1N. The printed circuitboard 114 is electrically isolated from the bottom plate 36. When the piston 18 makes thermal contact with the temperature sensor, the sensor will measure the temperature of the piston 18. This measurement will be more accurate when the thermal conductivity between the piston content and the temperature sensor is good. Preferably a thermally conductive material, like for example a metal, is used for the construction of the bottom of piston 18. The metal should be in thermal contact with both the content of the piston 18 and the temperature sensor. In addition preferably a thermally conductive paste between the piston 18 and the sensor is used.

Yet another way to measure the temperature of the piston content is shown in FIGS. 3C to 3E. The figures depict piston 18 in the fully descended position along with the printed circuit-board 114 and part of the bottom plate 36. In the position shown in FIGS. 3C and 3D the piston 18 is resting on an electrically isolated printed circuit-board 114 mounted on the bottom plate 36. In FIG. 3E the piston 18 is resting on a electrical contact plate 120 and cylinder 122. Both the plate and the cylinder are placed on, and electrically connected to a printed circuit-board 114. The printed circuit-board is mounted on, and electrically isolated from the bottom plate 36. This printed circuit-board is electrically connected to a leak-free mounted connector 106 not shown in either FIG. The temperature sensor 94 can be permanently electrically connected to the printed circuit-board. In FIG. 3C, for example, this connection is formed by conducting wires 82. The length of the wires 82 should allow the piston 18 to move unhindered between the extreme positions. The temperature sensor 94 is mounted on a thermally conductive plate 78. This plate is mounted inside the piston 18 using a retaining ring 80 and an O-ring 76. Preferably both the plate and the O-ring are compatible with the reaction conditions used and leak-free under the pressure difference used to move the piston 18. The temperature sensor 94 can also be temporarily electrically connected to the printed circuit-board. For example, in FIG. 3D electrical contact between the temperature sensor 94 and the printed circuitboard 114 is only made when the piston 18 is fully descended. The contact is made using a coaxial connector mounted inside the piston 18. The male part of the coaxial connector 116 is electrically connected to the temperature sensor 94. The temperature sensor is mounted on a thermally conductive plate 78, which in turn is mounted inside the piston 18. To mount this plate use is made of an O-ring 76 and retaining ring 80. Preferably both the plate and the O-ring 76 are compatible with the reaction conditions used and leak-free under the pressure difference used to move the piston 18. The female part 118 of the coaxial connector is mounted on a printed circuit-board 114, and electrically connected to it. Yet another way of measuring the temperature of the content of the piston 18 is to mount an integrated circuit (IC) in thermal contact with the content of the piston 18. For example a DS1912 IC manufactured by Dallas Semiconductors, shown in FIG. 3E, can be mounted leak-free in bottom of the piston 18. The IC is leak-free mounted using a retaining ring 80 and O-ring 76 combination. This IC contains a temperature sensor and can record the temperature of the piston 18. This IC also contains a unique digital code identifying both the sensor as well as the piston 18 it is mounted in. The temperature and code can be electronically read by a computer, not shown in FIG. 3E, when the sensor 94 makes contact with a printed circuit-board 114 mounted on the bottom plate 36. The printed circuit-board contains a contact plate 120 and a cylindrical contact 122. Both make electrical contact with the sensor 94 when the piston 18 is fully descended. The printed circuit-board 114 is connected to a leak-free mounted connector 106, not shown in FIG. 3E.

Additional ways of measuring the temperature of the content of the piston 18 are given in the first additional embodiment. The temperature sensors 94 can be connected to a computer or read-out unit. The sensors can be combined with a temperature controller to regulate heating or cooling devices. Temperature sensors, controllers and read-out units are available through commercial vendors like Minco Products and Omega Engineering, while high pressure and high temperature connectors are available through commercial vendors. The DS1912 IC is available through Dallas Semiconductors or other commercial vendors.

Figure 10A:
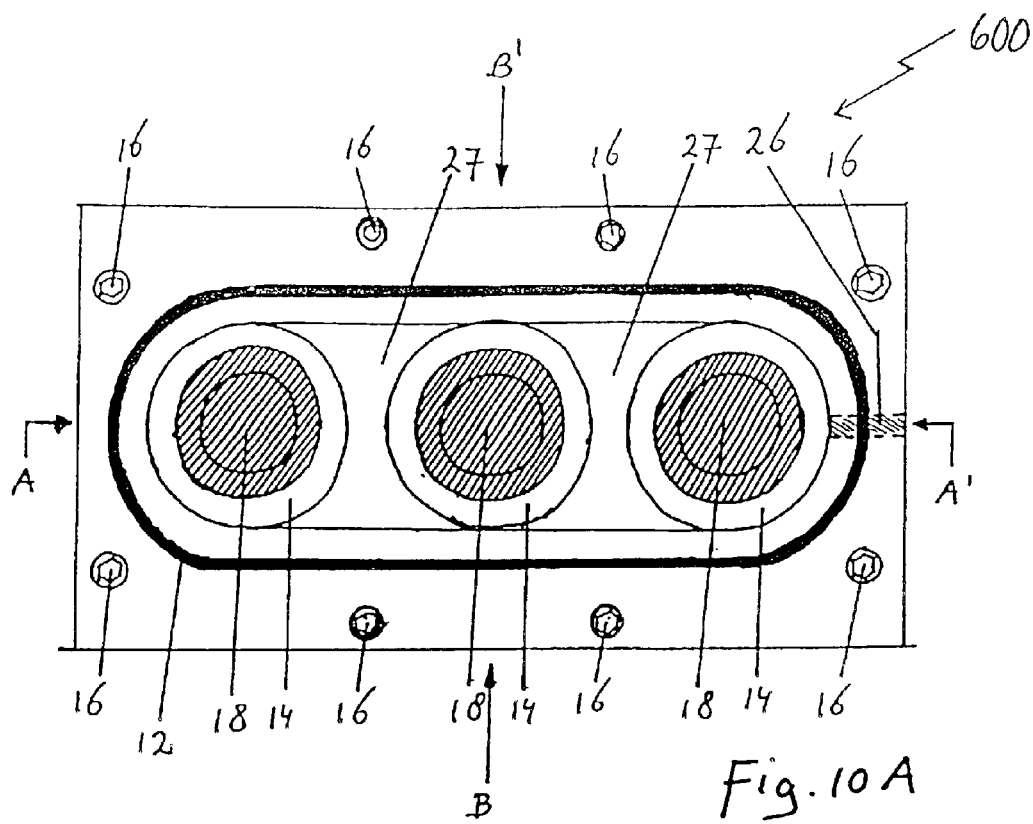
FIG. 10A is a top plan view, in section, of a sixth embodiment of the apparatus constructed in accordance with the teachings of the present invention.

Another reaction condition is the presence or absence of stirring of the vessel content. Referring to FIG. 1B, body 10 or top plate 24 may contain channels for mounting an array of electromagnets that can rotate freestanding magnets contained in the chamber 22. Examples of freestanding magnets contained in chamber 22 are magnetic stir bars 32 shown in FIG. 4B or magnetic followers 145 shown in FIG. 5A. The body 10 or top plate 24 may contain an even number of electromagnets larger then or equal to 4, but the principle will be illustrated for four electromagnets mounted in the body 10. FIG. 10A illustrates the apparatus equipped with four electromagnets 124 mounted inside the body 10. In body 10, electromagnets or coils 124 are mounted parallel to the bore 30 in a lower chamber 20. Hidden channels 104 and 28 are depicted in FIG. 10 using dashed lines. The printed circuit-board 114 on which the magnets are mounted is not shown in FIG. 10. The electromagnets can also be mounted perpendicular to the bore 30. In FIG. 1P the piston 18 is resting on the electromagnets 124. Chamber 20 which encloses the magnets, is leak-free closed by the bottom plate 36, as shown in FIG. 1P. To achieve a leak-free closure a combination of an O-ring 12, suitable for use under the reaction conditions, and a set of bolts 16 is used as shown in FIG. 10. The lower chamber 20 communicates at all times with lower channel 28. In FIG. 10, a channel 104 forms a conduit for the electrical connections to a printed circuit-board 114. The electromagnets 124 are mounted on and electrically connected to the printed circuit-board 114. The four electromagnets are mounted in a square array, as shown in FIG. 10. In channel 104 a connector 106 is leak-free mounted. Suitable connectors for use under the reaction conditions are available through commercial vendors.

For most effective stirring the poles of the electromagnets preferably are positioned in the body 10 in such a way that the stir bar 18 is in between the poles. Depending on the final position of the stir bar 32 and piston 18 inside the bore 30, the electromagnets may be positioned in a place along the bore 30 other than depicted in FIG. 1P. Furthermore the electromagnets may be placed perpendicular or parallel to the bore 30 outside the body 10, surrounding the body 10. Diagonally located pairs of electromagnets are connected in series to form two electrically separate circuits. Each circuit contains two electromagnets. Electromagnets are electrical conductors that produce a magnetic field when an electrical current passes through them. Typically, the electrical conductor consists of one or more wire coils wrapped around a solid core made of material having relatively high permeability, such as soft iron or mild steel. The wire wrapped around the core is encapsulated by an electrically isolating layer compatible with the reaction conditions used. An electrical current, pulsed or sinusoidal, through the circuits will create a momentary magnetic field. A magnetic stir bar 32 placed in this field will attempt to align itself with the direction of the magnetic field. The current through one circuit can gradually or instantaneously be switched to the other circuit. As a result a new magnetic field perpendicular on the previous field is generated. The magnetic stir bar will attempt to realign itself with the direction of the new field, resulting in a 90 degree rotation. The combination of a magnetic stir bar and four electromagnets is equal to a stepper motor with a resolution of 90 degrees. By repeated switching of the magnetic fields by a stepper motor driver and controller, the stir bar can be rotated through 360 degrees at speeds up to 2000 rpm. The preferred maximum speed is about 1200 rpm. Suitable stepper motor drivers and controllers are available through commercial vendors like Axiomatic Technologies or The Motion Group Another way of rotating the stir bar is by rotating a suitable magnet under the stir bar inside or outside the apparatus. Devices that rotate the stir bar by rotating a suitable magnet outside the apparatus are available through commercial vendors like Inter-Sciences, and IKA. An example of a way of rotating a suitable magnet inside the apparatus under the piston 18 is shown in FIG. 1Q. A motor 132 is leak-free and securely mounted on the bottom plate 36, by for example welding, soldering or glueing the motor to the bottom plate 36. Preferably the mounting method is compatible with the reaction conditions used. The bottom plate 36 is leak-free mounted on the body 10 using an O-ring 12 and suitable fasteners, not shown in FIG. 1Q. On the spindle 130 of the motor a magnet 128 is mounted of a strength sufficient to rotate the stir bar 32 in any position of the piston 18. The motor, suitable for the reaction conditions employed preferably has a maximum speed of 1200 rpm. The motor can be DC stepper motor, a constant speed AC motor, a variable speed AC motor or an air-propelled or hydraulic motor. The motor depicted in FIG. 1Q is a DC stepper motor, a constant speed AC motor or a variable speed AC motor. The motor is electrically connected to connector 106. Connector 106 is leak-free mounted in a wire conduit 104 machined in body 10. The motors and connectors are available through commercial vendors. Suitable magnets are available through commercial vendors like Magnet Sales & Manufacturing. An additional way of stirring the content of the piston 18 is given in the first additional embodiment.

Another reaction condition is the presence or absence of gas pressure on the vessel content. Referring to FIG. 1A to FIG. 1S, the body 10, top plate 24, bottom plate 36, O-rings and fasteners 16 should be dimensioned so as to allow safe operating procedures under the required addition and reaction pressures. Such pressures can be in a range of from about atmospheric to about 10000 psi, more particularly in the range of from about atmospheric to about 300 psi. In order to register the pressure inside the apparatus, pressure sensors may be incorporated in the body 10 or in the lines connected to the body 10. In the body 10 pressure sensors 134 are leakfree mounted. Pressure sensor 134 is connected to the upper chamber 22 by a channel 136. Through a channel 137, another pressure sensor 134 is connected to the lower chamber 20. Referring to FIG. 2A pressure sensor 134 may also be mounted in the lines 38 or 40. In order to reflect changes in pressure due to release or consumption of gas accurately the pressure in the upper chamber 22 and lower chamber 20, shown in FIG. 1R should be connected during measurement. Referring to FIG. 2A this can be achieved by opening valves 44, 46 and 135 while valves 52 and 54 are closed. Pressure sensors, pressure read-out units and controllers are available through commercial vendors like Omega.

Detailed Description of the Operation of the First Embodiment

Referring to FIGS. 1A through 4G, there is illustrated the use and operation of apparatus 100. Referring to FIG. 4A, the cover plate 24 removed and the piston 18 is filled with compound 2. A stir bar 32 can be added. Next the recessed area 14 is filled with compound 1. For air-sensitive, toxic or radioactive compounds these steps could be performed inside a glove box filled with a suitable gas. Depending on the number of screened reactions, manual or robotic dispensing could be used for filling. Another way of filling the apparatus with compounds 1 and 2 is to reverse the described sequence. When the piston 18 can be removed from the body 10, by for instance pulling the piston 18 out of the bore 30, another way is to separately fill the piston 18 with compound 2. After this the piston 18 is placed in the start position in the bore 30. Finally the recessed area 14 is filled with compound 1. Next the top plate 24 is mounted. As a result a top chamber 22 is created, consisting of the recessed area 14, the top of piston 18, and the top plate 24. A cross-section of a cylindrical body 10 after filling the recessed area and the piston 18 and mounting the top plate 24 is shown in FIG. 4B.

Channel 26 is connected to line 38 shown in FIG. 2A. Channel 28 is connected to line 40. Referring to FIG. 4B the lower chamber 20 can be pressurized while releasing gas from the upper chamber 22. As a result the filled piston 18 will move upward and will be pressed firmly against the top plate 24. In the presence of a flexible gasket 34, depicted in FIG. 1C, or a flexible piston 18 a leak-free seal is obtained, allowing transport of the filled apparatus without accidental addition or mixing of the content. Preferably pistons 18 are used that do not have a rim 84 machined on the piston 18 as depicted in FIG. 3C. Preferably a pressure from about 10 psi to about 30 psi is used to press the piston 18 against the top plate 24. Furthermore the chambers should be isolated by valves 44 and 46 mounted before the self-closing connectors 42, as shown in FIG. 2A.

Pressurizing the lower chamber 20 can be achieved by connecting the chamber to a source of pressurized gas, for instance a gas cylinder 68 in FIG. 2A. One possible sequence out of many for closing and opening the valves depicted in FIG. 2A in order to pressurize the lower chamber 20 is the following. With valves 135, 44 and 46 closed, the apparatus is connected to the lines 38 and 40 using the self-closing connectors 42. Valves 44, 52 and 60 are opened. When three-way valve 56 selects the line connected to the atmosphere, top chamber 22 is open to the atmosphere. Preferably the lower chamber 20 is pressurized step-wise by repeatedly filling the buffer volume 50 and emptying its contents into the lower chamber 20. Starting with a closed valve 46 a repeated sequence of opening valve 54 when the three-way valve 58 is connected to the pressurized gas cylinder 68, closing valve 54, opening valve 46 followed by closing valve 46 would result in pressurizing chamber 20. Such a sequence of repeatedly opening and closing of valves 44 and 52 or 46 and 54 in order to transfer pressure to and from the chambers 20 and 22 hereafter is called step-wise pressurizing or depressurizing. Another possibility for pressurizing the lower chamber 20 is by opening the valves 46 and 54 while the three-way valve 58 is connected to the pressurized gas cylinder 68. After closing the valves 44 and 46, the apparatus can be disconnected for transport.

Before the addition the lines and chambers can be purged free of contaminating gases by a series of simultaneous venting and pressurizing cycles. This procedure is also used for saturating compounds 1 and 2 with gas. One such a procedure out of many is the following. Assuming a situation after transportation of a pressurized apparatus with a pressurized lower chamber and the upper chamber at atmospheric pressure, the apparatus is connected to the lines 38 and 40. Valve 135 is opened, together with valves 52, 54 and 62. Three-way valves 56 and 58 are connected to the vacuum pump 64, by selecting the line that contains valve 62 in an open state. Next valve 62 is closed, and three-way valves 56 and 58 are connected to the pressurized gas cylinder. After repeated cycling between vacuum and pressurized gas, valves 135, 52, 54 and 62 are closed. Three-way valves 56 and 58 are connected to the line containing the valves 60 and 62. Next excess gas pressure is released stepwise from the lower chamber 20 by, for example, repeating the following cycle. With valve 54 closed, valve 46 is opened and closed. With valve 60 open, and three-way valve 58 selecting the line connected to the atmosphere, valve 54 is opened. After closing valve 54, the sequence is repeated until the pressure in the lower chamber 20 is about atmospheric. Another possibility for releasing the pressure present in the lower chamber 20 is by opening the valves 46, 54 and 60. At the same time the three-way valve 58 selects the line connected to the atmosphere.

Next, the upper chamber 22 is step-wise pressurized without lowering the piston 18 to the point where the addition takes place. This is necessary in order to break a possible seal between the top plate 24 and the piston 18. Such a seal possibly prevents gas saturation of the compound contained in the piston 18. Preferably a single pressure step is used. One example for obtaining a single pressure step is to close both valves 44 and 46, and open valve 52 while three-way valve 56 is selecting the pressurized gas cylinder 68. After closing valve 52, valve 44 is opened.

The content of the recessed area and piston 18 can now purged and saturated with gas. For example, valve 135 is opened, and is followed by simultaneous step-wise pressurizing of the upper and lower chamber 20. After pressurizing the chambers, a step-wise release of gas into the atmosphere is executed. The sequence of opening and closing valves for step-wise pressurizing and release of gas is performed as described.

After the last step-wise pressurizing of the combined chambers valve 135 is closed. Next a pressure difference is created over the piston 18 in such a way so as to create a higher pressure in the upper channel 22 compared to the pressure in the lower chamber 20.

A preferred sequence out of many valve switching sequences to achieve a gas pressure difference over the piston 18 is the following. With valves 44 and 52 open, and the three-way valve 56 selecting the pressurized gas cylinder 68, chamber 20 is step-wise depressurized using a sequence of opening and closing valves 46 and 54 as described previously. The three-way valve 58 is selecting the line open to the atmosphere during the opening and closing of valves 46 and 54.

Figure 4C:
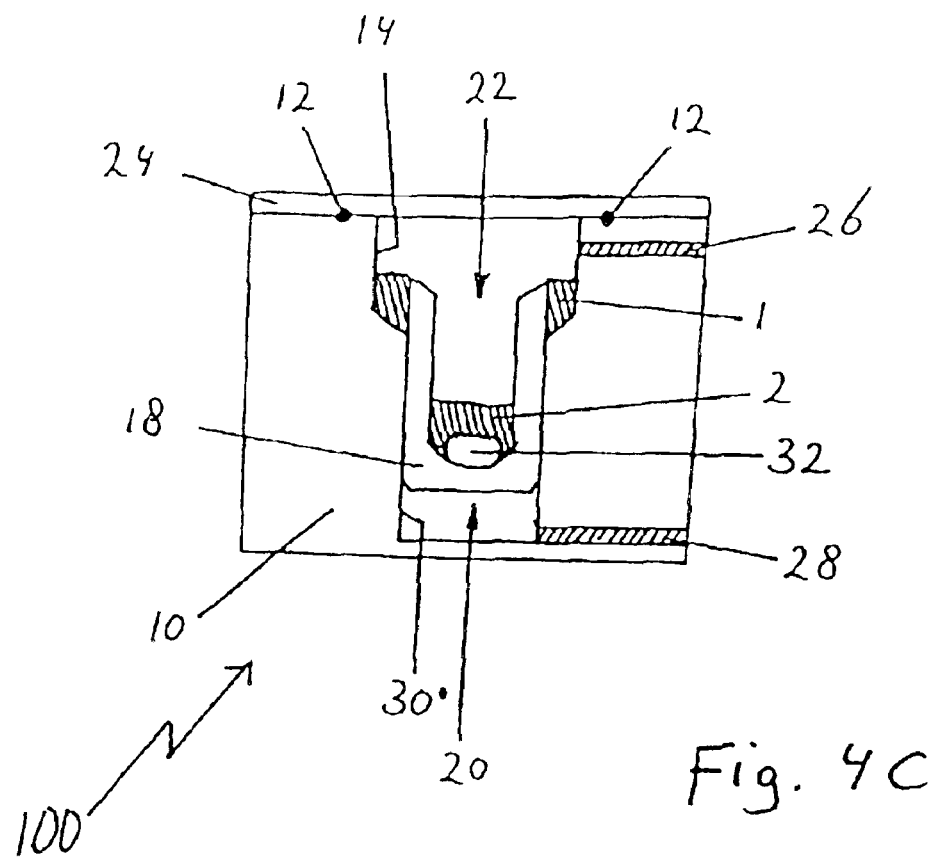
FIG. 4C is a side elevation view, in section, of the apparatus illustrated in FIG. 1A.
Figure 4D:
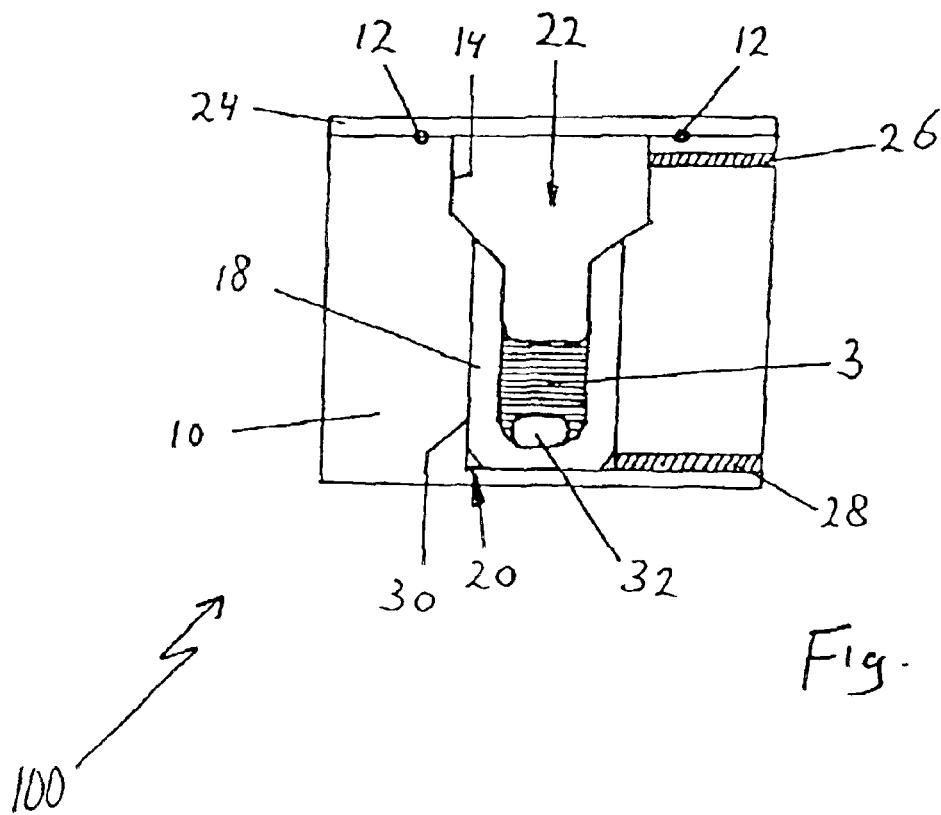
FIG. 4D is a side elevation view, in section, of the apparatus illustrated in FIG. 1A.

As a result of a suitable higher pressure at the top of the piston 18, the piston 18 will move down. As the piston 18 moves down, the distance between the top of the piston 18 and the top of compound 1 contained in the recessed area 14 will decrease. A point will be reached where the top of the piston 18 is at the same level as the top of the compound 1 stored in the recessed area. FIG. 4C depicts this situation. Any further downward movement of the piston 18 beyond this point will result in addition of compound 1 to compound 2 stored in piston 18. Under the influence of gravity compound 1 will start to fall into the container of compound 2. The addition process can be regulated by decreasing the speed with which the piston 18 moves down. This can be achieved by, for instance, increasing the time interval between the depressurizing steps of the lower chamber 20. When the top of the piston 18 reaches the interface between the bore 30 and recessed area 14 the addition is complete, see FIG. 4D. The mixture of compound 1 and compound 2 is given the number 3 in FIG. 4D.

Figure 4E:
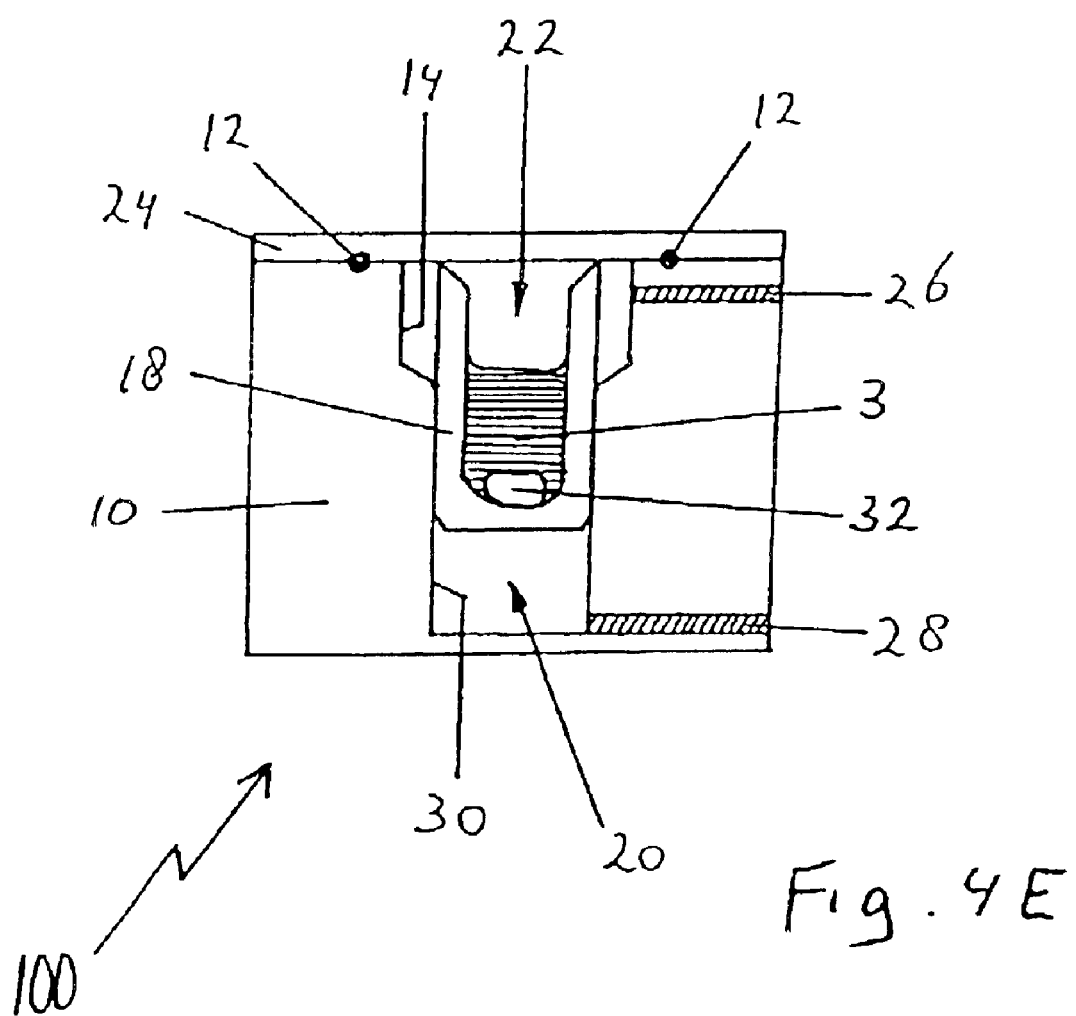
FIG. 4E is a side elevation view, in section, of the apparatus illustrated in FIG. 1A.
Figure 4F:
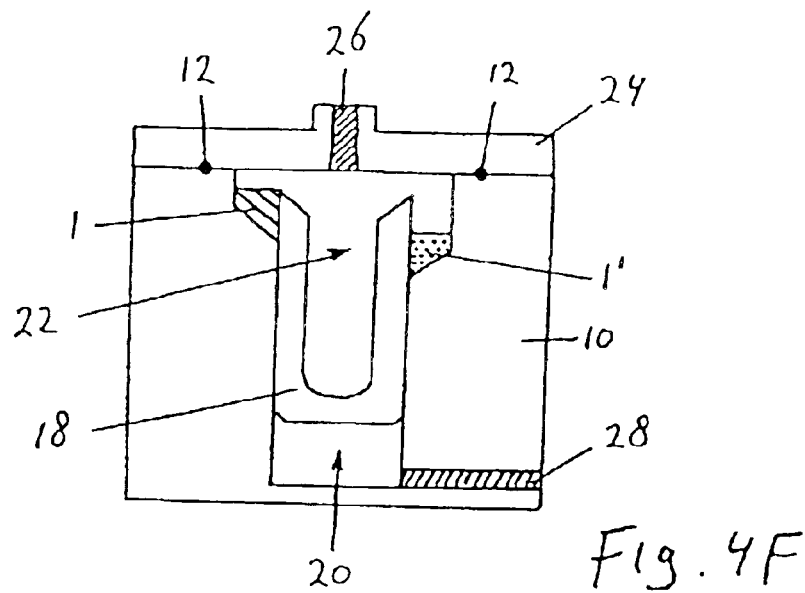
FIG. 4F is a side elevation view, in section, of the apparatus illustrated in FIG. 1A.
Figure 4G:
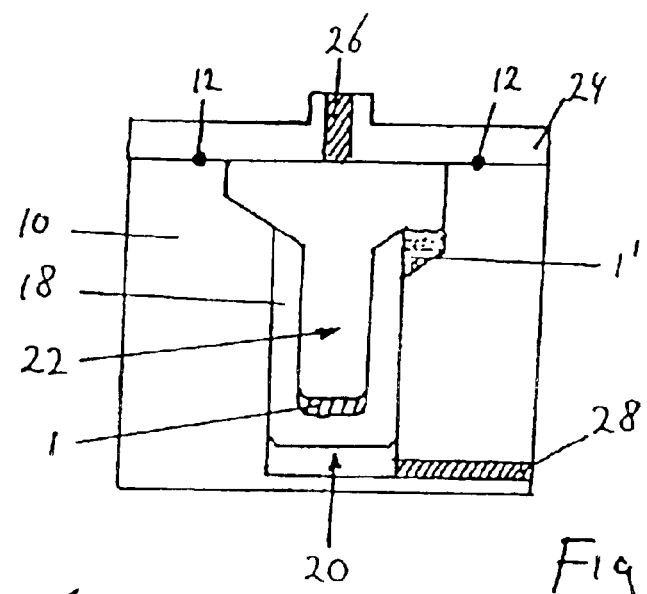
FIG. 4G is a side elevation view, in section, of the apparatus illustrated in FIG. 1A.
Figure 4H:
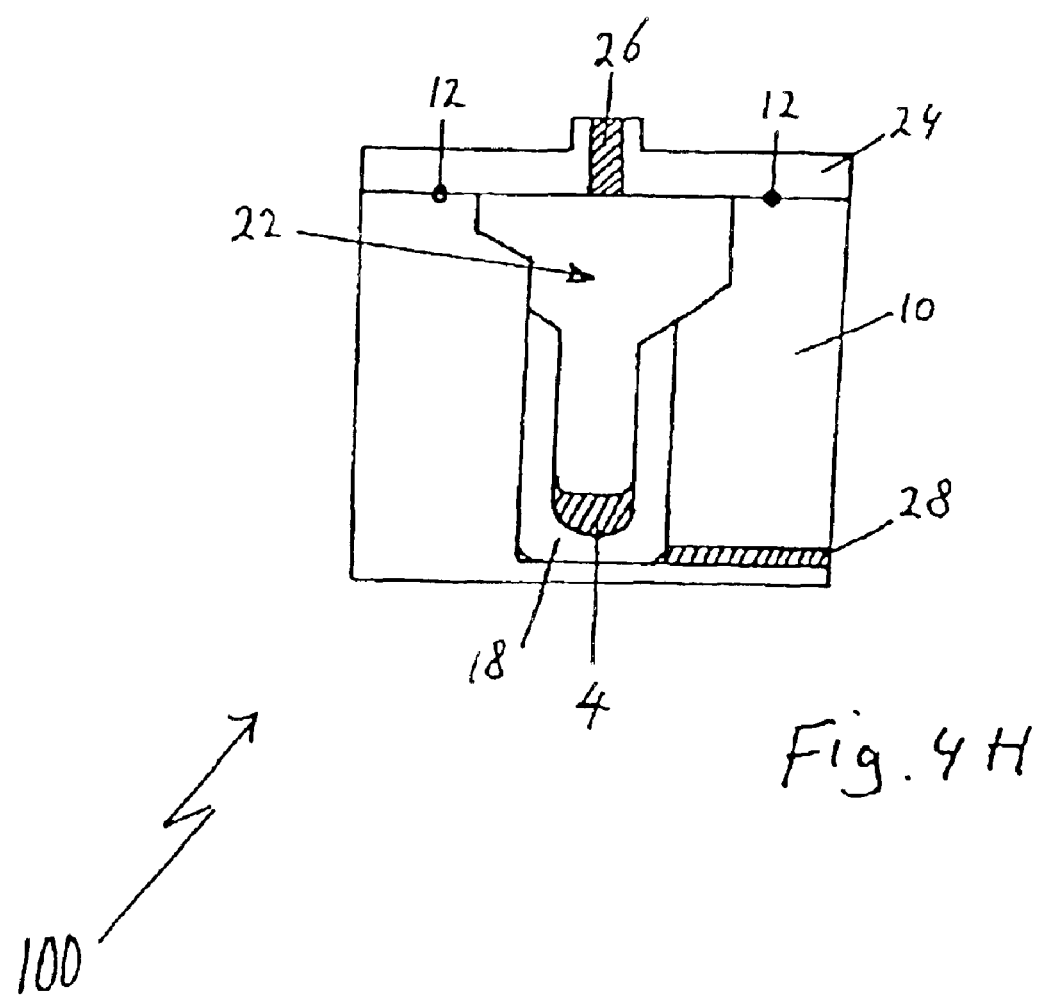
FIG. 4H is a side elevation view, in section, of the apparatus illustrated in FIG. 4A.

Referring to FIG. 1F, when more compounds are stored in the recessed area, the moment when the compounds 1 and 1 are added to the content of the piston 18 will be determined by the initial level of the compounds in the recessed areas 14 and 14. In FIG. 1F for example compound 1 will fall into the piston 18 earlier then compound 1. By changing the initial level of the stored compounds, and the point along the bore 30 where the recessed area changes into the bore 30, a serial or simultaneous addition of the compounds stored in the recessed areas can be achieved. When the recessed areas 14 and 14 merge with the bore 30 at the same height, a simultaneous or near simultaneous addition of the compounds 1 and 1 to the piston content occurs. When the recessed areas 14 and 14 merge with the bore 30 at different heights a serial or near serial addition occurs. This is depicted in FIGS. 4F to 4H. FIGS. 4F and 4H depict the apparatus as shown in FIG. 1S without the O-ring 88. As described, under the influence of a suitable pressure difference the piston 18 will move down. Because the level of compound 1 stored in the recessed area is higher then that of compound 1 as shown in FIG. 4F, compound 1 will be added to the piston 18 first. This is shown in FIG. 4G. FIG. 4G also shows that compound 1 has not been added to the content of the piston 18 at this point. Compound 1 will be added to the content of the piston 18 when the piston 18 moves further down. This is depicted in FIG. 4H.

The volume of the compounds added together should preferably fill the container of piston 18 so as to allow adequate stirring. This corresponds to a volume, including the stirring apparatus, of about 15 to about 65% of the volume of the container formed by piston 18.

In addition to controlling the movement of the piston 18, the extension depicted in FIG. 2A can also be used to add or remove specific amounts of gaseous reactants or products. When the piston 18 is in the lowest position, and isolated by closing valves 44 and 46, pressure changes in the upper chamber can be monitored by a pressure sensor 134 illustrated in FIG. 1R. Consumption of gas will decrease the gas pressure, while generation of gas will increase the gas pressure as monitored by the pressure sensor 134. The consumed gas can be added and the generated gas can be removed using the buffer volume, vessel or tank 48, in order to maintain a constant gas pressure in the upper chamber. The amount of gas removed or added at a given temperature and pressure is determined by the volume of the buffer tank 48. When gas is consumed in the upper chamber, buffer tank 48 is pressurized by opening valve 52, and selecting the pressurized cylinder 68 with three-way valve 56. During this procedure valve 135 is closed. Next valve 52 is closed, and valve 44 is opened, resulting in the addition of a volume of gas contained in tank 48 when the pressure in the buffer tank is higher than the pressure in the upper chamber. If necessary the gas addition procedure can be repeated. When gas is generated in the upper chamber valve 52 is closed and the valve 44 opened. While valve 135 is closed. The generated gas will flow into the buffer tank 48 when the pressure in the upper chamber is higher than the pressure in the buffer tank. Next valve 44 is closed, and valve 52 opened. In order to maintain a pressure difference between the upper chamber and the buffer tank 48, the buffer tank can be vented by opening valve 60 and selecting that line using the three-way valve 56. Another way of maintaining a pressure difference is by putting buffer tank 48 under vacuum by selecting the vacuum pump 64 by opening valve 62 and selecting that line using three-way valve 56. If necessary the gas release procedure can be repeated.

After passing of a certain time interval, the screening process can be terminated in a way suitable for the process under consideration. In order to allow the isolation of possible formed materials the filled piston 18 could be moved to its original start position. This is shown in FIG. 4E. This also allows cleaning of the apparatus. To achieve this a pressure difference is created over the piston 18 in such a way so as to create a higher pressure in the lower chamber 20 compared to the pressure in the upper chamber 22. Referring to FIG. 2A the pressure of the upper chamber 22 is first released into the atmosphere by stepwise decreasing the pressure using a sequence of opening and closing valves 44 and 52, while three-way valve 56 is selecting the line open to the atmosphere. Next the lower chamber 20 is pressurized by stepwise increasing the pressure using a sequence of opening and closing of valves 54 and 46, while three-way valve 58 is selecting the pressurized gas cylinder 68. The upper chamber 22 is connected to the atmosphere during the pressurizing of the lower chamber 20. When the piston 18 has moved sufficiently upward to allow cleaning or removal, valve 44 is closed and valves 46 and 54 are opened. The three-way valve 58 is selecting the line open to the atmosphere, resulting in venting of the gas pressure into the atmosphere. The apparatus can now be disconnected and opened to recover the content of the piston 18 and to clean the apparatus.

Advantages

Accordingly, several objects and advantages of my invention are:

a) Unlike the currently used glass bombs, the apparatus is safer to use. The invention allows the addition of solids. The apparatus eliminates components that can poison screened compounds. As a result a decrease in the concentration of the screened compounds can be achieved. Furthermore the present invention allows higher pressures to be used in the screening process. Compounds in the, parallel or otherwise, screening or synthesis process can be saturated with a gas before the addition.

b) Compared to the currently used metal reactors, the apparatus simplifies the addition of solids under reaction conditions. Compounds in the, parallel or otherwise, screening or synthesis process can be saturated with a gas before the addition.

In addition the present invention is simpler to use and cheaper to manufacture. The invention is also more compatible with existing robotic techniques. Furthermore a large number of parallel reactions can be started simultaneously by applying the same gas pressure over a large set of devices.

Detailed Description of A Second Embodiment

Referring to FIGS. 5A through 5G, a second embodiment, generally referenced by numeral 200 is illustrated. Referring to FIGS. 5A to 5G, a mechanical stirrer, heater or cooler, inlet or sampling tube or a probe are attached to the top plate 24. Any combination of these can also be attached to the top plate 24 depending on the size of the piston 18 and the size of the additional embodiments. In addition the additional embodiments can be combined with the features described in the main embodiment. The attachments are similar in form and function compared to the attachments commonly found in commercially available metal reactors. However in the present invention, these attachments can be partially or completely disengaged after the addition. An additional step unique for the present invention is necessary to engage the attachments.

Figure 5A:
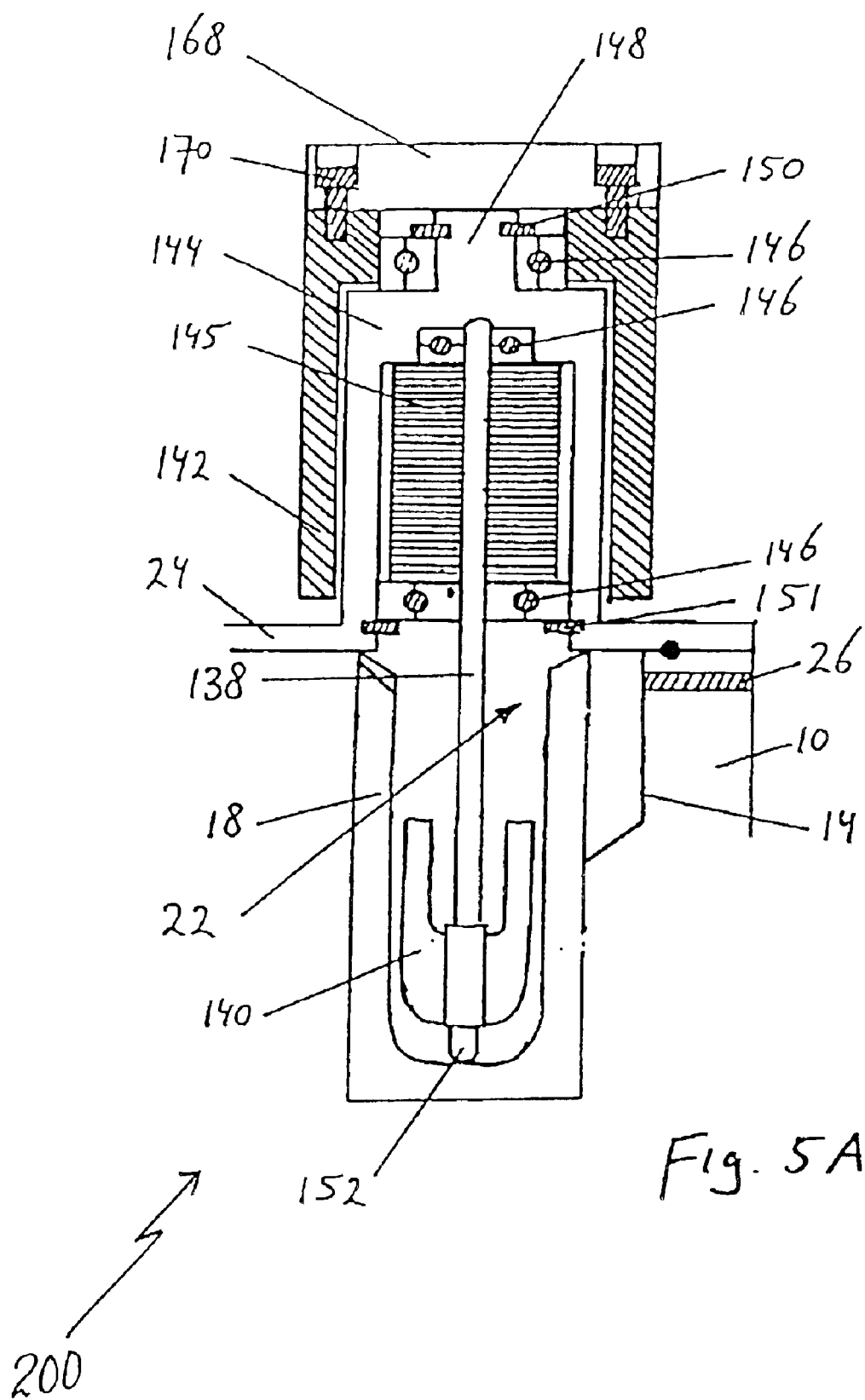
FIG. 5A is a side elevation view, in section, of a second embodiment of the apparatus constructed in accordance with the teachings of the present invention.

Referring to FIG. 5A, a mechanical stirrer is mounted on the top plate 24. The mechanical stirrer consists of a spindle 138 that rotates a blade or paddle 140. Preferably the spindle 138 and paddle 140 are mounted aligned with or coaxial to the piston 18. The pressure barrier 144, top plate 24, body 10, and piston 18 define a top chamber 22 connected to one or more channels 26. To isolate chamber 22 from the atmosphere a magnetic feed-through is used. One possible form of a magnetic feed-through is shown in FIG. 5A. As shown in FIG. 5A a magnetic feed-through consists of a cylindrical magnetic driver 142 rotatably mounted on a rigid cylindrical pressure barrier 144 using one or more bearings 146. The magnetic driver consists of a permanent magnet. The bearings are mounted for example on a narrow axial extension 148 of the pressure barrier 144. The bearings are preferably prevented from moving along the extension 148 by a retaining ring 150. The outer surface of the bearings support the magnetic driver 142. The base part of the pressure barrier 144 is leak-free mounted on the top plate 24, and is open only along the base of the pressure barrier. Inside the pressure barrier a magnetic follower 145 is rotatably mounted using two bearings 146. A spindle 138 is rigidly attached to the magnetic follower. The movement of the spindle 138 along the rotation axis is limited by the top of the pressure barrier, and a retaining ring 151. The magnetic follower consists of permanent magnets. These magnets and the magnets of the magnetic driver 142 have aligned force vectors about perpendicular to the axis of rotation. Because of the magnetic coupling, rotation of the driver assembly induces rotation of the follower and the attached paddle 140. The operating pressure of a magnetic feed-through is from about atmospheric to about 10000 psi. The operating temperature can be from about minus 150 degrees Celsius to about 300 degrees Celsius. The speed can be from about 0 rpm to about 2000 rpm.

Figure 5B:
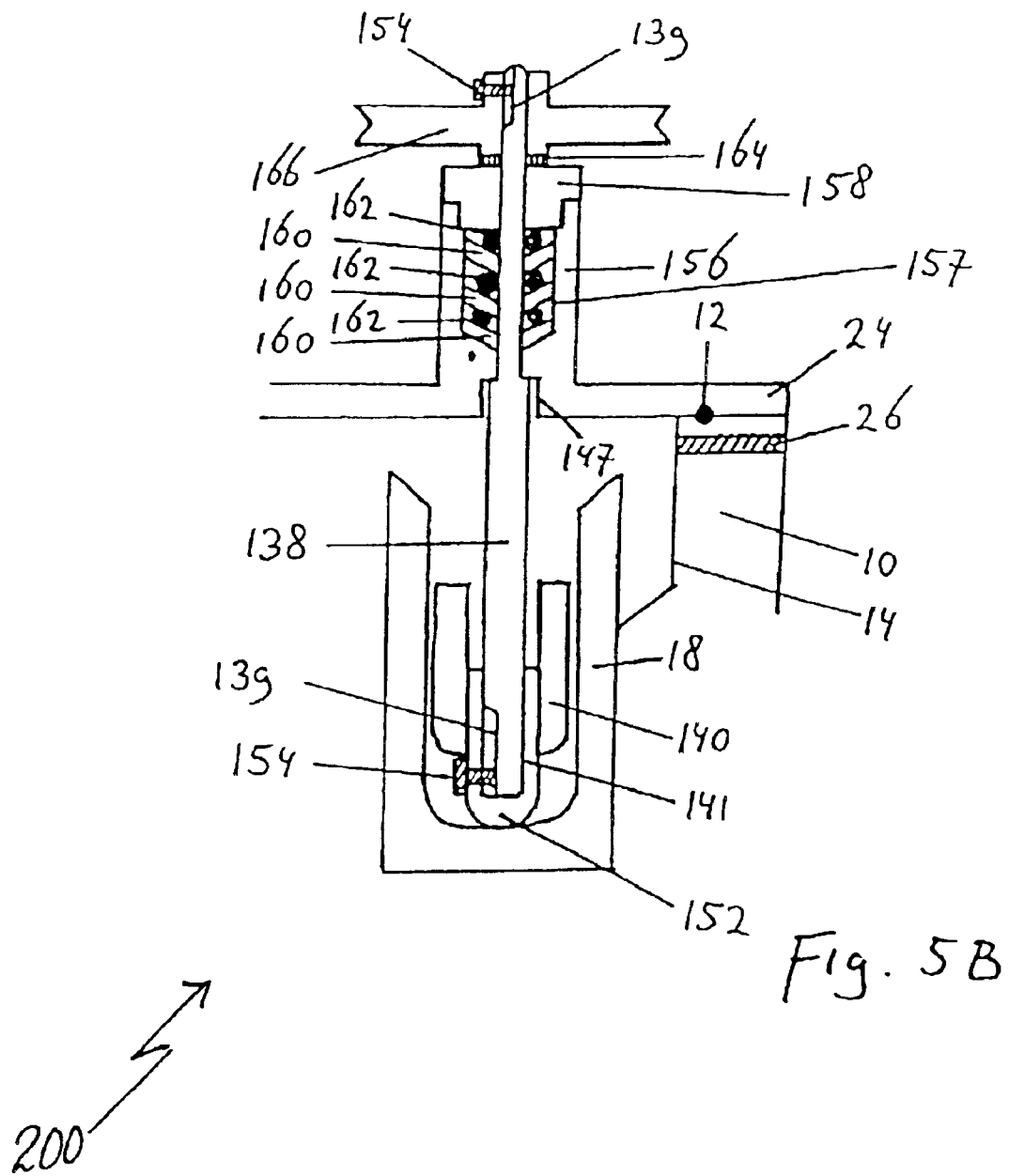
FIG. 5B is a side elevation view, in section, of the apparatus illustrated in FIG. 5A.

Another example of a mechanical stirrer assembly is shown in FIG. 5B. In this assembly, the spindle 138 is leak-free rotatably mounted using for example a set of O-ring seals 162 and cone-shaped elastomeric seals 160. Preferably the O-rings 162 and cone-seals 160 are compatible with the reaction conditions used. The O-rings 162 and cone-seals 160 are mounted in a receptacle or cavity 157 inside a housing 156 integral part of the top plate 24. The O-rings 162 and cone-seals 160 are compressed and prevented from moving by a threaded holder 158 mounted in the receptacle. The operating pressure of this dynamic ring-seal can be from about atmospheric to about 250 psi. The operating temperature can be from about ambient to about 200 degrees Celsius preferably from about ambient to about 70 degrees Celsius. Magnetic feed-throughs and dynamic ring-seal feed-throughs are commercially available from vendors like Parr Instruments or Autoclave Engineers.

The paddles 140 can be permanently attached to the spindle 138 as shown in FIG. 5A. The paddles 140 can also be replaceable or disposable. For instance in FIG. 5B the paddles 140 are mounted on a sleeve, mount or holder 141. The holder 141 has a screw 154 mounted perpendicular to the spindle 138. The spindle 138 preferably is flattened on both ends, as shown in FIG. 5B. Spindle 138 is inserted in the holder 141 in such a way that the flat portion of the spindle 138 is facing the screw 154 mounted in the holder 141. The holder 141 is attached to the spindle 138 in the described position by tightening the screw 154. The paddles 140 can be made of metal, plastic or a combination of these materials. The paddles 140 are mounted in such a way so as to achieve sufficient mixing of the piston content without hitting the piston wall when the piston 18 is in the start position. A tip, support or knob 152 is machined at the bottom of the spindle 138 or holder 141 mounted on the spindle 138. Preferably the knob 152 is machined on the holder 141. This knob 152 rests on the bottom of the piston 18, when the piston 18 is in the start position. The knob 152 can be spherical or pointed. The start position of the piston 18 is determined by the distance between the top plate 24 and the knob 152. Preferably this distance is such so as to allow the piston 18 to come near to the top plate 24 as shown in FIG. 5B or touch the top plate 24 as shown in FIG. 5A.

The magnetic driver 142 in FIG. 5A or the spindle 138 in FIG. 5B can be rotated by coupling the driver or spindle to a motor. The motor can be a DC stepper motor, a constant speed AC motor, a variable speed AC motor or an air-propelled or hydraulic motor. The coupling between the motor and the driver or spindle can be by a pulley mounted on the motor, spindle or driver combined with a belt. The motor can also be mounted directly on the stirring assembly. In FIG. 5B, the spindle 138 is fitted with a pulley 166. The pulley 166 is mounted on the spindle 138 resting on a washer 164. The pulley together with a step 139 tooled on the spindle 138 and resting in a cavity 147 in the top plate 24 prevents axial movement of the spindle 138. The coupling can also be made using a gear train. In FIG. 5A, a gear 168 is mounted on the magnetic driver 142 using a set of screws 170.

Figure 5C:
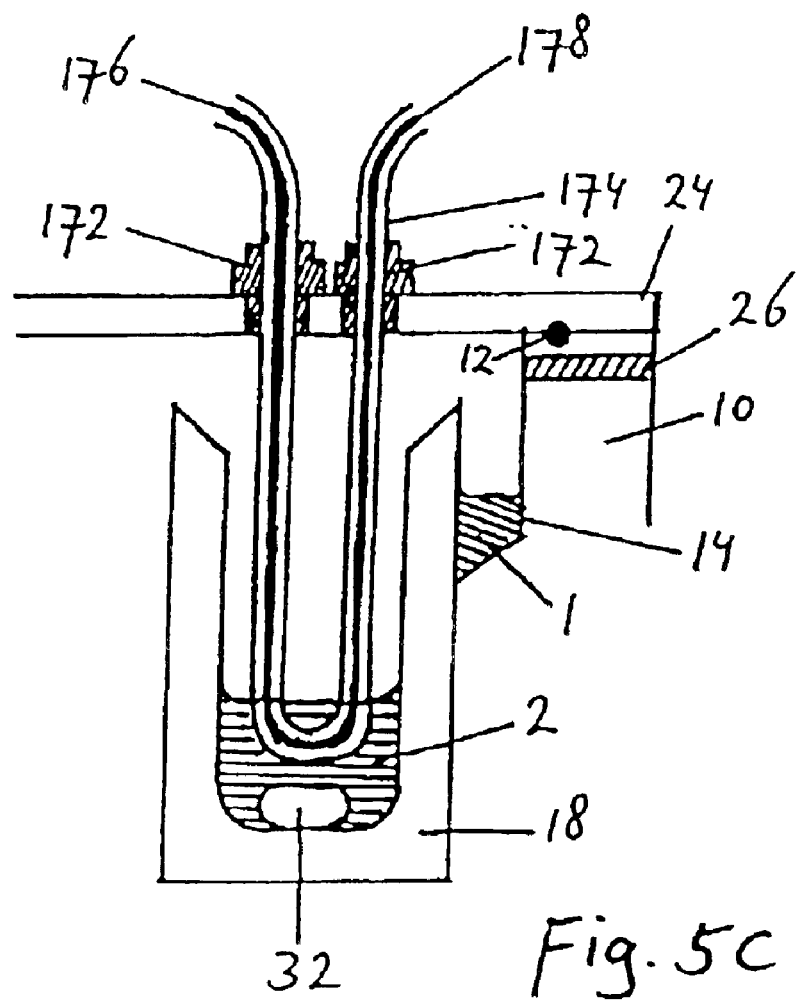
FIG. 5C is a side elevation view, in section, of the apparatus illustrated in FIG. 5A.

In FIG. 5C a tube 174 is mounted on the top plate 24. The part of the tube mounted inside the container of piston 18 can be U-shaped as shown in FIG. 5C or can be coil shaped. In addition FIG. 5C shows piston 18, O-ring 12, compounds 1 and 2 and a stir bar 32. Only parts of the body 10 and top plate 24 are shown. The tube 174 is leak-free connected to the top plate 24. Preferably feed-through adapters 172 are used for the connection. The inside of the tube 174 is isolated from the chamber 22 formed by the body 10, piston 18, the outside wall of tube 174 and the top plate 24. Tube 174 can be made of glass, plastics or metals or a combination of these materials compatible with the reaction conditions. Preferably the tube 174 is made of stainless steel. By passing a thermal fluid at a suitable temperature and flowrate through the conduit formed by tube 174 and the inlet and outlet channels 176 and 178, the content of the piston 18 can be maintained at a specific temperature. Heating of the content of the piston 18 can also be achieved by mounting an electrically isolated resistance wire inside the conduit formed by the tube 174. By passing a suitable current through the wire, the tube 174 and the content of the piston 18 are heated. Resistance wire and feed-through adapters are available through commercially vendors.

The tube 174 preferably is immersed in the content of the piston 18. The distance between the top plate 24 and the bottom of the tube 174 preferably should allow the top of the piston 18 to touch or come near to the top plate 24. Under this condition the tube 174 should not hinder or touch a stir bar 32 placed in the container of piston 18. This is depicted in FIG. 5C.

Figure 5D:
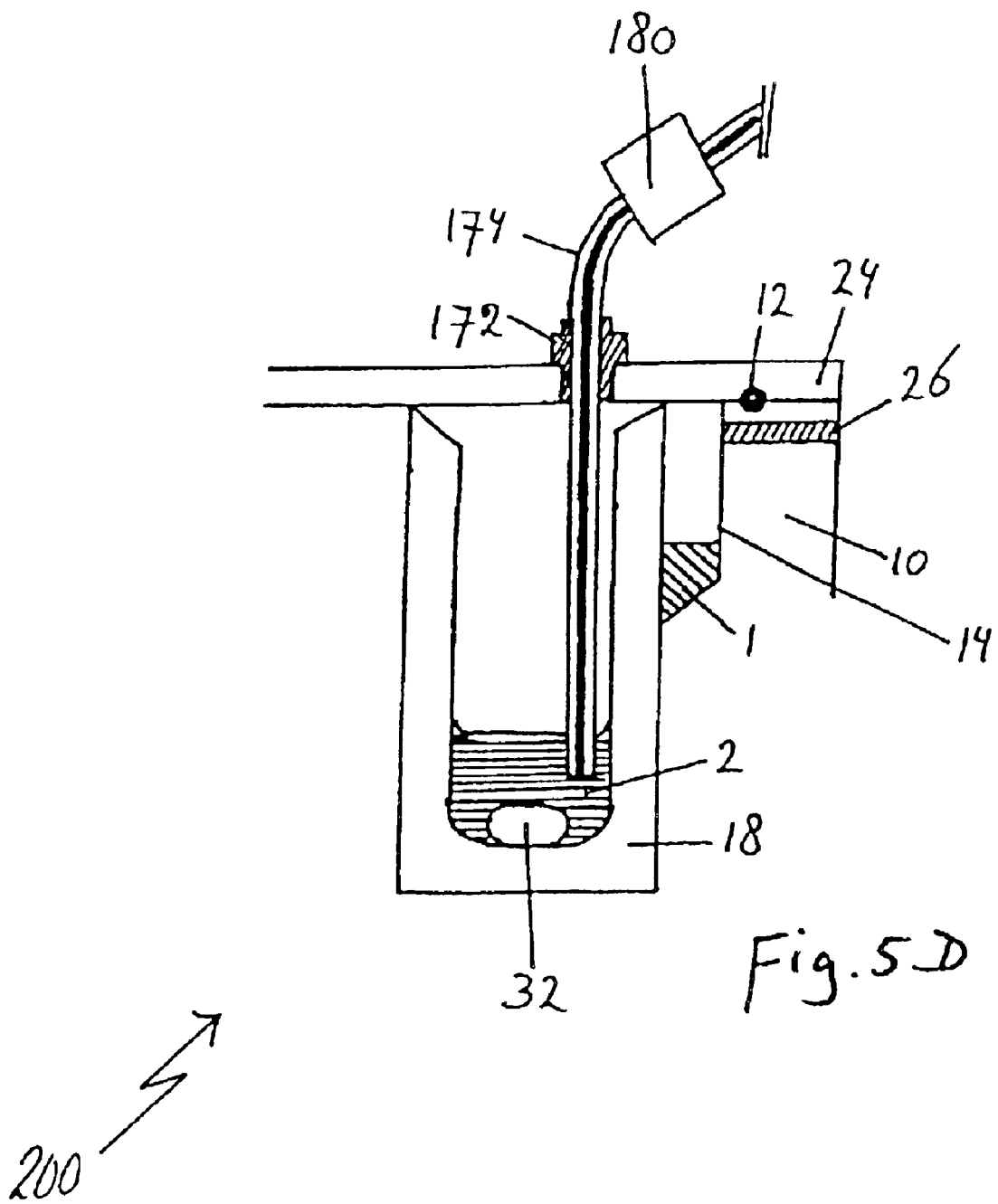
FIG. 5D is a side elevation view, in section, of the apparatus illustrated in FIG. 5A.

Referring to FIG. 5D, piston 18 depicted contains compound 2 as well as a stir bar 32. Tube 174 is leak-free mounted on the top plate 24 using a feed-through adapter 172. When the piston 18 is in the top position, the bottom of the tube 174 is immersed in the content of the piston 18. The tube 174 is isolated from the outside atmosphere by a valve 180. The valve can be manual, electronic or pneumatically driven. The bottom of the tube 174 may contain a fitted plate to disperse gas being introduced, or filter the content of the piston 18 that is passed through the tube 174. The length of the tube 174 should be such so as to allow the piston 18 to touch or come near to the top plate 24. The tube 174 preferably should not hinder the stirring action of the stir bar 32. The tube 174 is made of materials compatible with the reaction conditions like for instance steel, glass or plastics. Preferably the tube 174 is made of stainless steel. Adapters and suitable valves are available through commercial vendors.

Figure 5E:
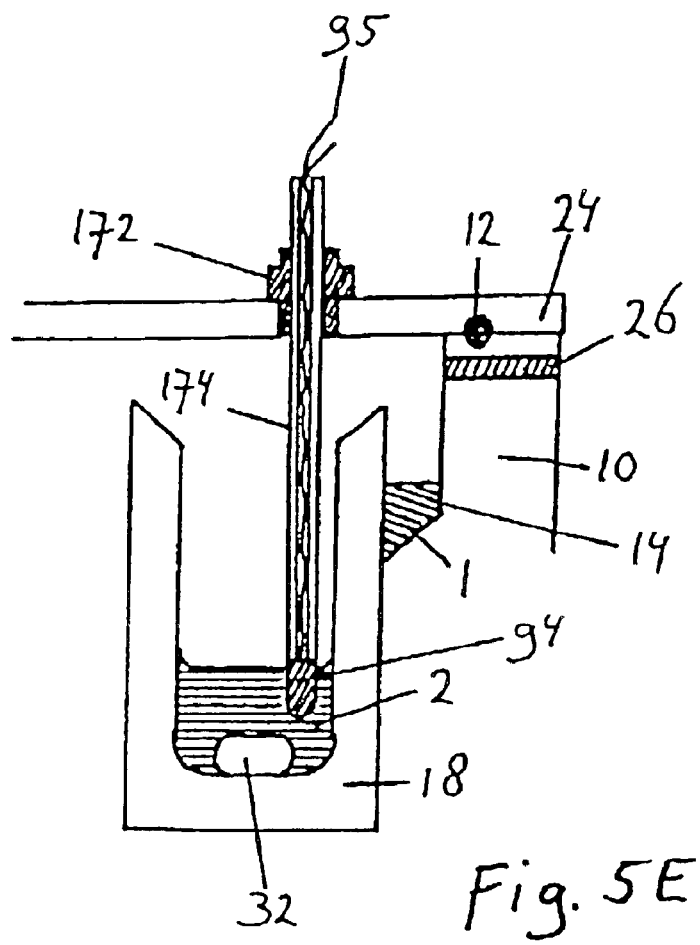
FIG. 5E is a side elevation view, in section, of the apparatus illustrated in FIG. 5A.

Referring to FIG. 5E, piston 18 depicted contains compound 2 as well as a stir bar 32. Tube 174 is leak-free mounted on the top plate 24 using a feed-through adapter 172. The tube 174 is immersed in the content of the piston 18 when the piston 18 is in the start position. The length of the tube 174 preferably is such that the piston 18 can touch or come near to the top plate 24. The bottom of the tube 174 forms a gas and liquid barrier but can be transparent for infrared or other forms of electromagnetic radiation or thermally conductive. The inside of the tube 174 is connected to the outside atmosphere, while the outside of the tube 174 forms a leak-free barrier. Inside the tube 174, sensors or fibre-optics can be mounted. Referring to FIG. 5E, for instance a temperature sensor 94 is mounted in the bottom of the tube 174. The tube 174, in addition, acts as a conduit for the electrical wires 95 connected to the sensor 94. The temperature sensor 94 can be a jacketed or non-jacketed thermocouple, resistance thermometric apparatus or a thermistor. Temperature sensors 94 leak-free mounted in a tube 174 are commercially available through vendors like Omega or Minco Products, while feed-through adapters are commercially available.

Figure 5F:
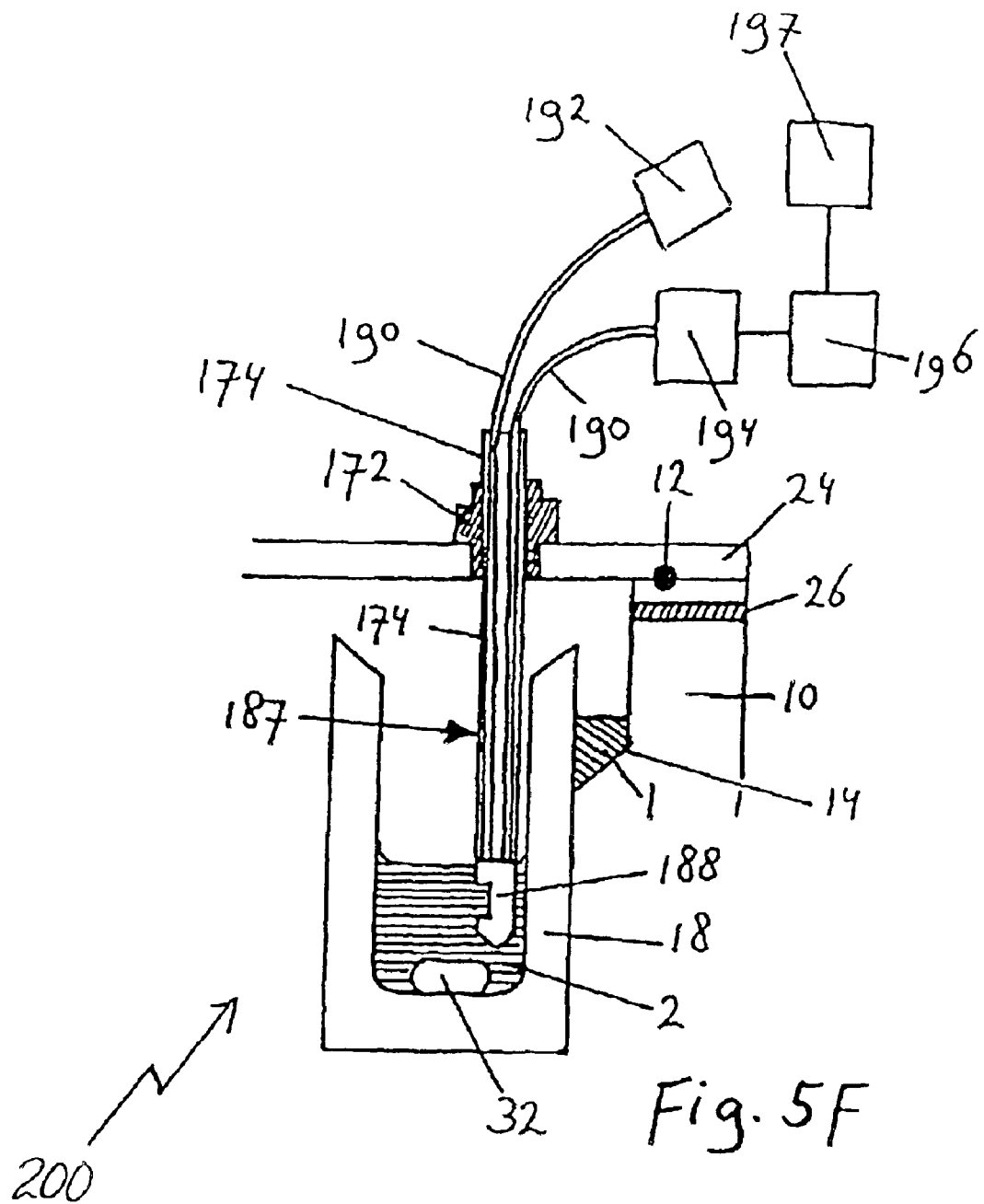
FIG. 5F is a side elevation view, in section, of the apparatus illustrated in FIG. 5A.
Figure 6A:
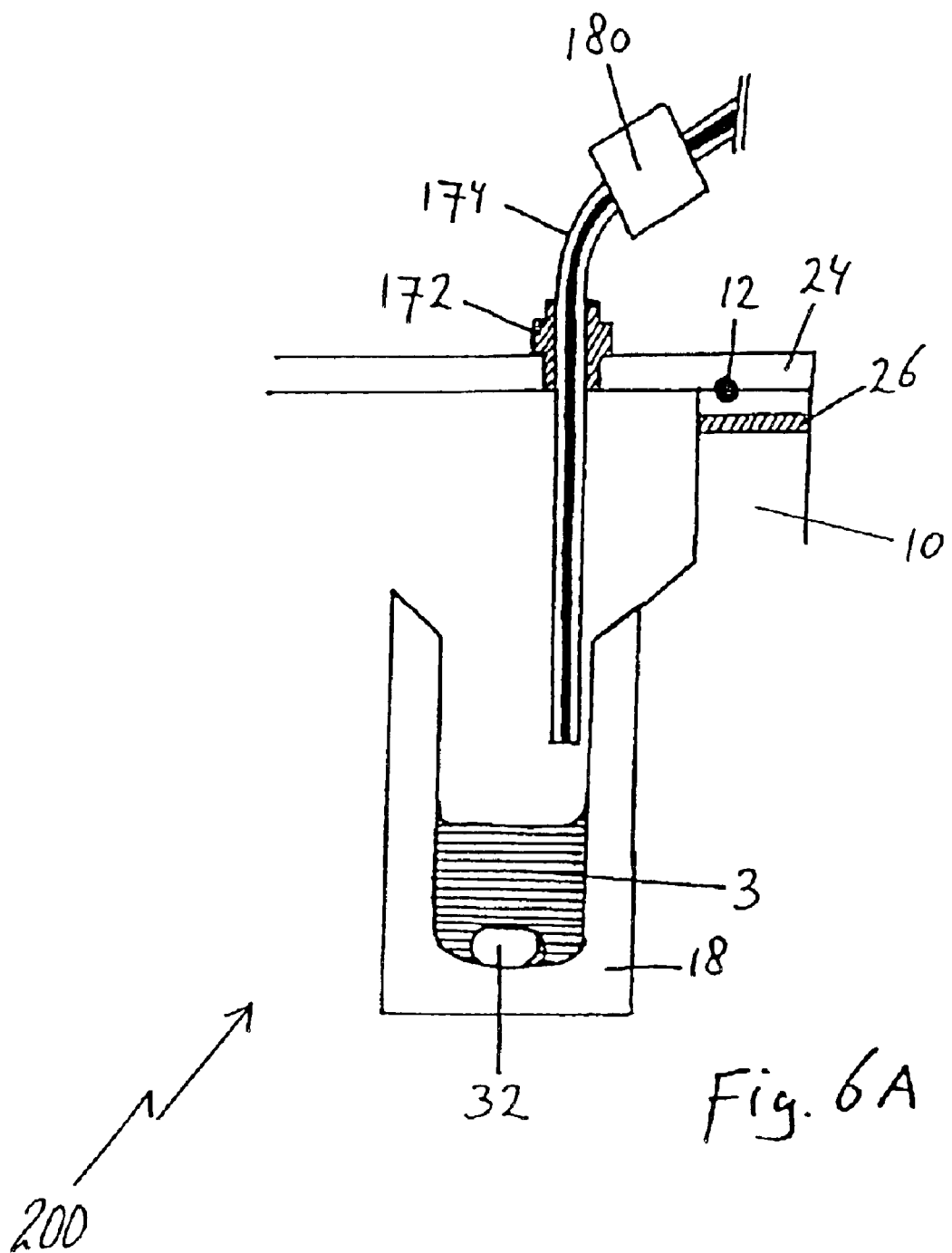
FIG. 6A is a side elevation view, in section, of the apparatus illustrated in FIG. 5A.

In another example, in FIG. 5F an optical immersion probe 187 is mounted on the top plate 24. An optical immersion probe 187 in general consists of an incoming light path connected to a light source 192, a reflective element like a mirror or a prism, and a gap containing the solution that is investigated. Often the reflective element and the gap are combined in the probe head 188. In addition a returning light path is present and connected to a wavelength selecting and intensity measuring apparatus or spectrometer 194. The light paths are formed by for instance fibre-optic cables 190. Fibre-optic cables 190 transport light from one side of the cable to the other side with negligible loss in the intensity of the light. After passing though the piston content, the light beam may contain information reflecting the screening process or synthesis under consideration. As is well known, compounds can absorb or emit light of specific wavelengths. The intensity of the absorbed or emitted light varies with the wavelength and represents a "fingerprint" of a compound or class of compounds. In addition, the intensity of the absorbed or emitted light varies with the concentration of the compound or compounds absorbing or emitting light.

The measurement of the variation of the intensity of the absorbed or emitted light as a function of the wavelength is depicted, but not limited by the setup in FIG. 5F. In addition the setup depicted in FIG. 5F can be used to monitor the variation of the intensity of emitted or absorbed light of a single wavelength of light. Referring to FIG. 5F, the incoming fibre-optic cable 190 is connected to a light source 192. Suitable light sources 192 for this application are for instance tungsten-filament lamps, tungsten-halogen lamps and deuterium or hydrogen arc-lamps. The light source can be intensity modulated. The other end of the fibre-optic cable is mounted in a tube 174. The tube 174 passes through a feed-through 170 leak-free mounted in the top plate 24 of the apparatus, and is connected to the probe head 188. The probe head 188 is leak-free connected to the tube 174. The inside of tube 174 and probe head 188 are connected to the atmosphere. The outside of the tube 174 and the probe head 188 are leak-free in contact with the content of the apparatus. The outgoing fibre-optic cable 190 is connected to the probe head and to a wavelength selecting and intensity measuring spectrometer 194. Referring to FIG. 5F, a spectrometer 194 is connected to a computer 196 for registration or analysis of the light beam. The computer 196 can be connected to suitable storage device such as a hard drive, not depicted in FIG. 5F and a printer 197, for example a laserprinter. Leak-free immersion probes similar to the one described are commercially available from vendors like for instance Helima, Ocean Optics and Axiom. Spectrometers, light sources, fibre-optic cables and feed-throughs are commercially available.

Detailed Description of the Operation of the Second Embodiment

Referring to FIGS. 5A through 6B, the operation of second embodiment 200, will now be described. The manner of operation of the attachments is the same when compared to the attachments commonly found in commercially available metal reactors and will therefore not be described. As described in the first embodiment 100, directly after the addition the piston 18 is in the lowest position. Unlike metal reactors the described attachments at this point are partly or wholly disengaged as shown in FIG. 6A. In order to make full use of the attachments in the present invention the piston 18 has to be brought to the initial or start position.

Referring to FIG. 2A, after the addition the upper chamber 22 is step-wise depressurized, while simultaneously the bottom chamber is step-wise pressurized following the procedure previously described. As a result of the increasing pressure in the bottom chamber, the piston 18 will move upward engaging the described attachments. This situation is shown in FIG. 6B for a liquid sampling tube 174. When the piston 18 is at the required position, valve 135 is opened. This arrests the movement of the piston 18 by placing both chambers under the same pressure. After which the sequence of events as described for the main embodiment can continue.

Detailed Description of a Third Embodiment

Figure 7A:
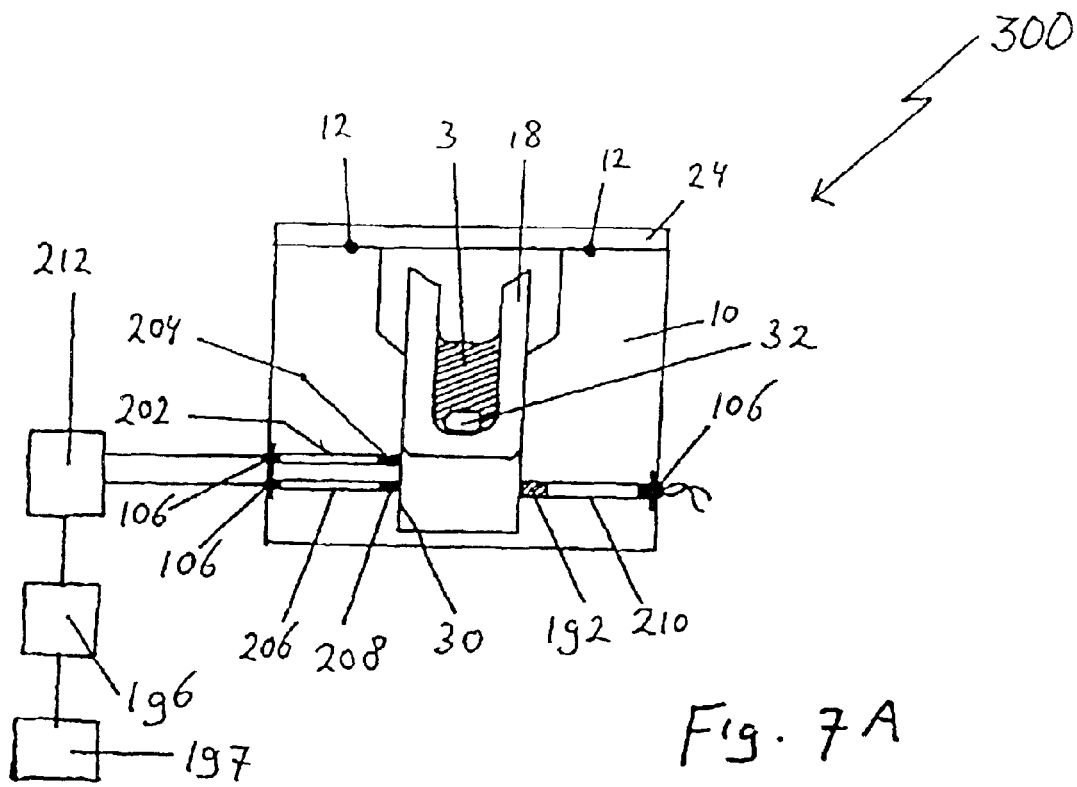
FIG. 7A is a side elevation view, in section, of a third embodiment of the apparatus constructed in accordance with the teachings of the present invention.
Figure 7B:
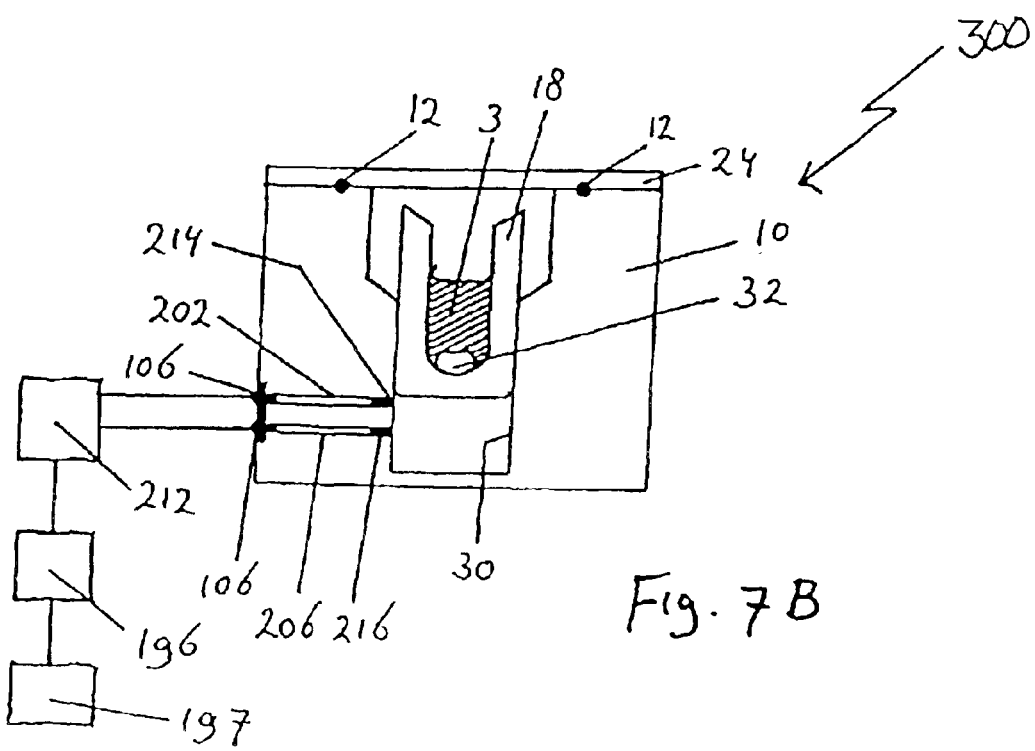
FIG. 7B is a side elevation view, in section, of the apparatus illustrated in FIG. 7A.
Figure 7C:
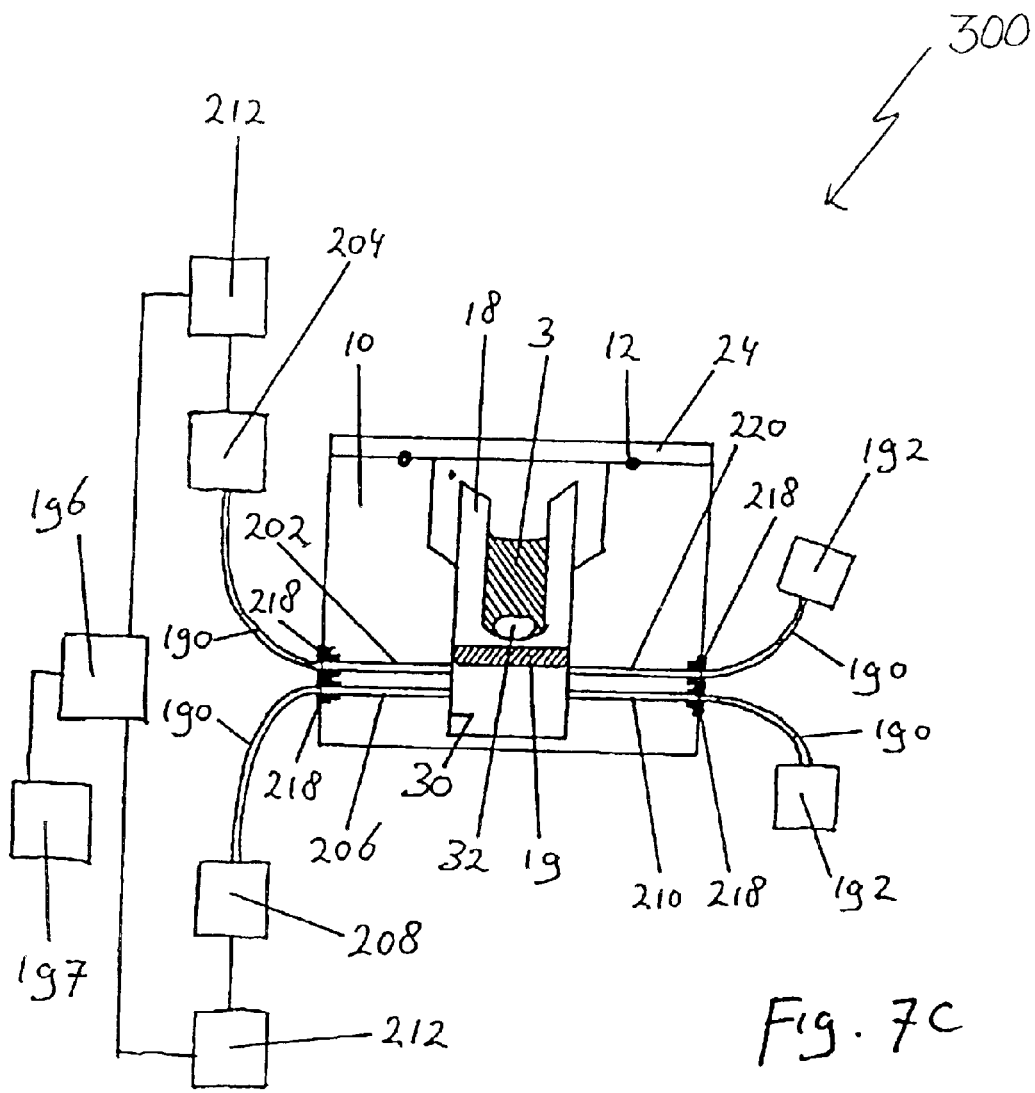
FIG. 7C is a side elevation view, in section, of the apparatus illustrated in FIG. 7A.

Referring to FIGS. 7A through 7C, a third embodiment of the apparatus, generally referenced by numeral 300, will now be described. Another way to register the release or consumption of gas in the top chamber is described in this additional embodiment. The method is based on a change in position of the piston 18 as a function of the gas pressure in the upper and lower chamber 20. To measure a change in position the piston 18 is placed in the middle of the apparatus. By measuring the position of a piston 18 so positioned during the screening or synthesis, the variation of the gas pressure due to gas consumption or production can be followed. The required position measuring device can be optical, magnetic, inductive or ultra-sonic. The measurement principle will be illustrated for, but is not limited to an optical position sensor. An optical position sensor consist for example of a light source mounted opposite at least one photosensor. This position sensor is combined with a piston 18 containing features that can block the light falling on the photosensor. The position sensors preferably are placed in such a way as to assist in the initial positioning of the piston 18.

An example of a system for measuring the position of the piston 18 is depicted in FIG. 7A. In FIG. 7A, in body 10 three additional channels 202, 206 and 210 are machined. These channels are connected to the bore 30 and to the to leak-free mounted electrical connectors 106. The channels are machined perpendicular on the bore 30. Channels 202 and 206 are placed parallel and above each other. A light source 192 is mounted in channel 210. Two photosensors 204 and 208 are mounted in the channels 202, and 206. The light source 192 is positioned opposite and below or in line with sensor 208. The sensors 204 and 208, and light source 192 are electrically connected to leak-free mounted connectors 106. Both light source 192 and photosensors 204 and 208, preferably are compatible with the reaction conditions used. Suitable light sources can be mono- or polychromatic. The light sources 192 may contain a filter, not shown in FIG. 7A. Preferably infrared emitting diodes or light emitting diodes are used. Suitable photosensors 204 and 208 are for example photodiodes. The light source 192 is connected to a conventional power supply not shown in FIG. 7A. The photo-sensors are connected to an electronic interface 212, which in turn is connected to a read-out unit or computer 196. The computer 196 can be connected to suitable storage device such as a hard drive, not depicted in FIG. 7A and printers 197, for example a laserprinter.

An example of a piston 18 for use with the sensors is given in FIG. 7A. Piston 18 depicted in FIG. 7A is opaque. Another example of a piston 18 for use with the sensors 202 and 206 is depicted in FIG. 7C. Referring to FIG. 7C, the piston 18 consists of two sections; a bottom section 19 is opaque for the light emitted by a light source, while the upper section 21 is transparent for the light emitted by a light source. The upper section 21 can be transparent for infrared or other forms of electromagnetic radiation. The thickness of the bottom section 19 should be such that at least one sensor can monitor the passing of the section. Preferably bottom section 19 has a thickness corresponding from about the diameter of the sensors 204 and 208 or channels 202 and 206 to about the distance necessary to simultaneously cover both sensors or channels.

Instead of separate photosensors and light source or light sources, reflective photosensors 214 and 216 can be mounted in the channels 202 and 206 as shown in FIG. 7B. FIG. 7B is equivalent to FIG. 7A except that the light source 192, connector 106 and channel 210 have been removed. Instead of the photosensors 204 and 208, reflective photosensors 214 and 216 are mounted in the channels 202 and 206. Such reflective photosensors combine both light source and sensor in a suitable way in one housing and reduces the number of holes in the body 10. Suitable light sources, photosensors and reflective photosensors are available through commercial vendors.

Another possibility is to mount the source of light or the photosensors outside the body 10. Yet another possibility is to mount both a suitable source of light and the photosensors outside the body 10. Referring to FIG. 7C, in body 10 a set of channels 202, 206, 210 and 220 are machined. The channels 202, 206, 210 and 220 are machined perpendicular on and connected to the bore 30. The channels 202, 206, 210 and 220 act as a conduit for fibre-optic cables 190. Fibre-optic cables 190 transport light from one side of the cable to the other side of the cable with negligible loss of light intensity. The fibre-optic cables 190 contained in the body 10 are connected to a fibre-optic connector or feed-through 218 suitable for the reaction conditions used. The channels 202 and 220 as well as 206 and 210 are placed on opposite sides of the bore 30 facing each other. The fibre-optic cables 190 contained in the channel 202 and 206 are connected to photosensors 204 and 208. The fibre-optic cables 190 contained in channels 210 and 220 are connected to a source of light 192. Suitable light sources 192 can mono- or polychromatic and can be intensity modulated. The light source 192 may contain a filter, not depicted in FIG. 7C. Preferably infrared emitting diodes or light emitting diodes are used. The light sources 192 are connected to a conventional-power supply, not shown in FIG. 7C. The photosensors 204 and 208 are connected to an electronic interface 212 which is connected to a read-out unit or computer 196. The computer 196 can be connected to suitable storage devices such as a hard drive, not depicted in FIG. 7A, and printers 197, for example a laserprinter. Suitable fibre-optic cables, feedthroughs and connectors are available through commercial vendors.

Detailed Description of the Operation of Third Embodiment

Referring to FIGS. 7A through 7C, the use and operation of third embodiment 300 will now be described. After the addition as described in the main embodiment the lower chamber 20 is pressurized in such a way so as to position the filled piston 18 halfway in the bore 30. This is the situation depicted in FIGS. 7A to 7C. Referring to FIGS. 1B and 2A, next both upper and lower chamber 20 are isolated by closing valve 44, connected to channel 26, and closing valve 46, connected to lower channel 28. Any change in the pressure difference between chambers 20 and 22 will now be translated in a change of the position of piston 18. A gas producing reaction for instance will increase the pressure in the upper chamber 22, forcing the piston 18 down. A gas consuming reaction would instead lower the pressure in the upper chamber 22, causing the piston 18 to move upward under influence of the higher pressure in the lower chamber 20. In order to place the piston 18 in the initial position, and to measure a displacement of the filled piston 18, a position sensor is required.

Referring back to FIG. 7A to 7C, when the piston 18 moves down, the light registered by sensors 204 or 214 will be blocked when the piston 18 covers the sensor. As the piston 18 moves further down due to an increase in gas pressure in the upper chamber 22, the sensor 208 or 216 will be covered. For gas consuming reactions, the piston 18 would be positioned so as to cover both sensors. As gas is being consumed in the upper chamber 22, the piston 18 will move upward uncovering sensor 208 or 216. Further upward movement of the piston 18 would result in uncovering of sensor 204 or 214. By measuring the variation of the light intensity as registered by a sensor, the piston 18 can be placed at a specific sensor position by coupling the sensor output to the pressurizing or depressurizing of a suitable chamber. For example, the upper chamber 22 as depicted in FIG. 7A, can be step-wise pressurized as described for the operation of the main embodiment. The procedure is repeated depending on the signal recorded by sensor 208. As long as sensor 208 observes light, the procedure is repeated. When sensor 208 no longer observes light, the procedure is stopped resulting in placement of the piston 18 at the same height as the sensor 208.

By measuring the time interval between the variation of the light intensity as registered by both sensors an indication of the rate of the pressure change can be obtained. The piston 18 subsequently can be brought back to the original position by a suitable opening and closing of the valves depicted in FIG. 2A.

Detailed Description of a Fourth Embodiment

Figure 8A:
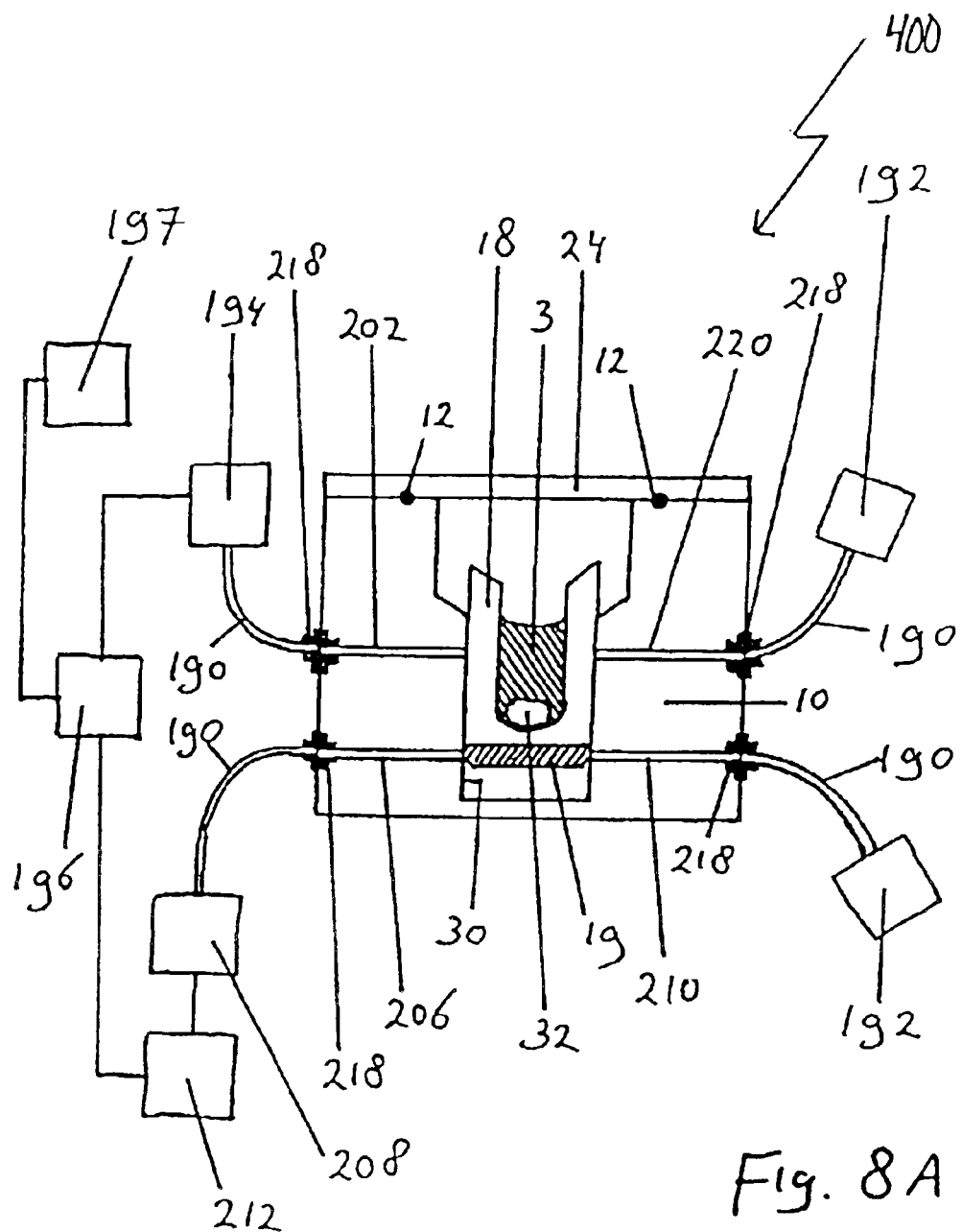
FIG. 8A is a side elevation view, in section, of a fourth embodiment of the apparatus constructed in accordance with the teachings of the present invention.

Referring to FIGS. 8A through 8E, there will now be described a fourth embodiment of the apparatus, generally referred to by reference numeral 400. In addition to measuring the position of the piston 18, the apparatus depicted in FIG. 7C can be used to measure the absorbance of the content of the piston 18. This is described in the following additional embodiment 400. FIG. 8A shows the apparatus of FIG. 7C, except that one fibre-optic cable is connected to a wavelength selecting and intensity measuring spectrometer 194. As is shown in FIG. 8A, the upper light beam passes through the piston 18 that is transparent for electromagnetic radiation.

The measurement of the variation of the intensity of the absorbed light as a function of the wavelength is depicted, but not limited by the setup in FIG. 8A. In addition the setup depicted in FIG. 8A can be used to monitor the variation of the intensity of emitted or absorbed light of a single wavelength of light. Furthermore instead of directing the light beam sideways through the piston 18, as shown in FIG. 8A, the light source or the fibre-optic cable connected to a light source 192 might be placed above or below the piston 18.

Figure 8B:
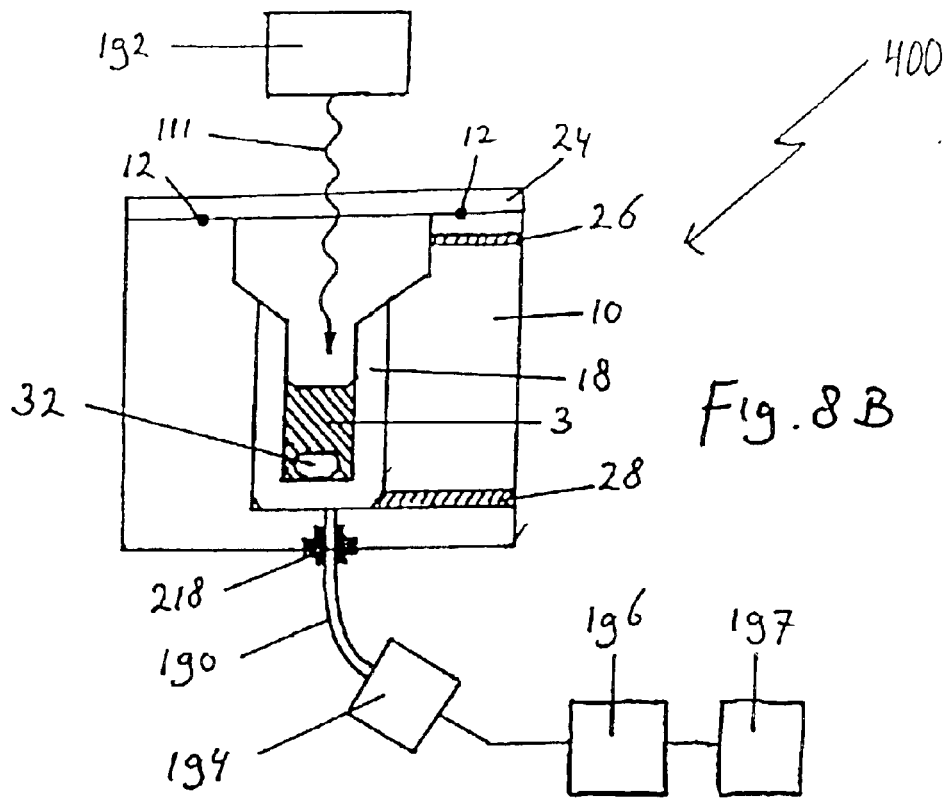
FIG. 8B is a side elevation view, in section, of the apparatus illustrated in FIG. 8A.
Figure 8C:
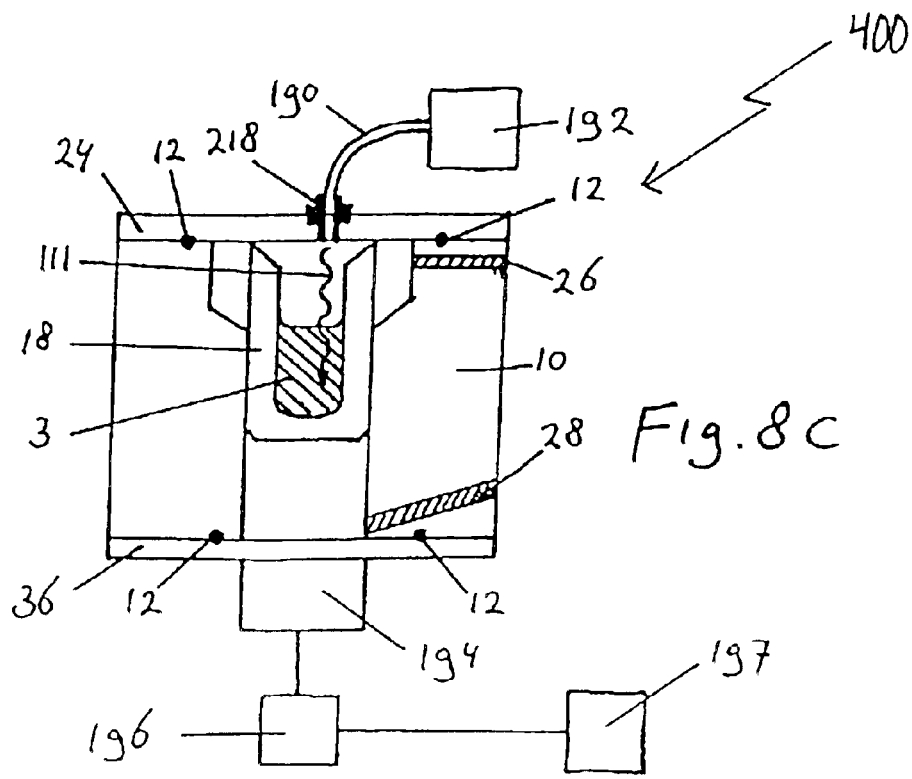
FIG. 8C is a side elevation view, in section, of the apparatus illustrated in FIG. 8A.
Figure 8D:
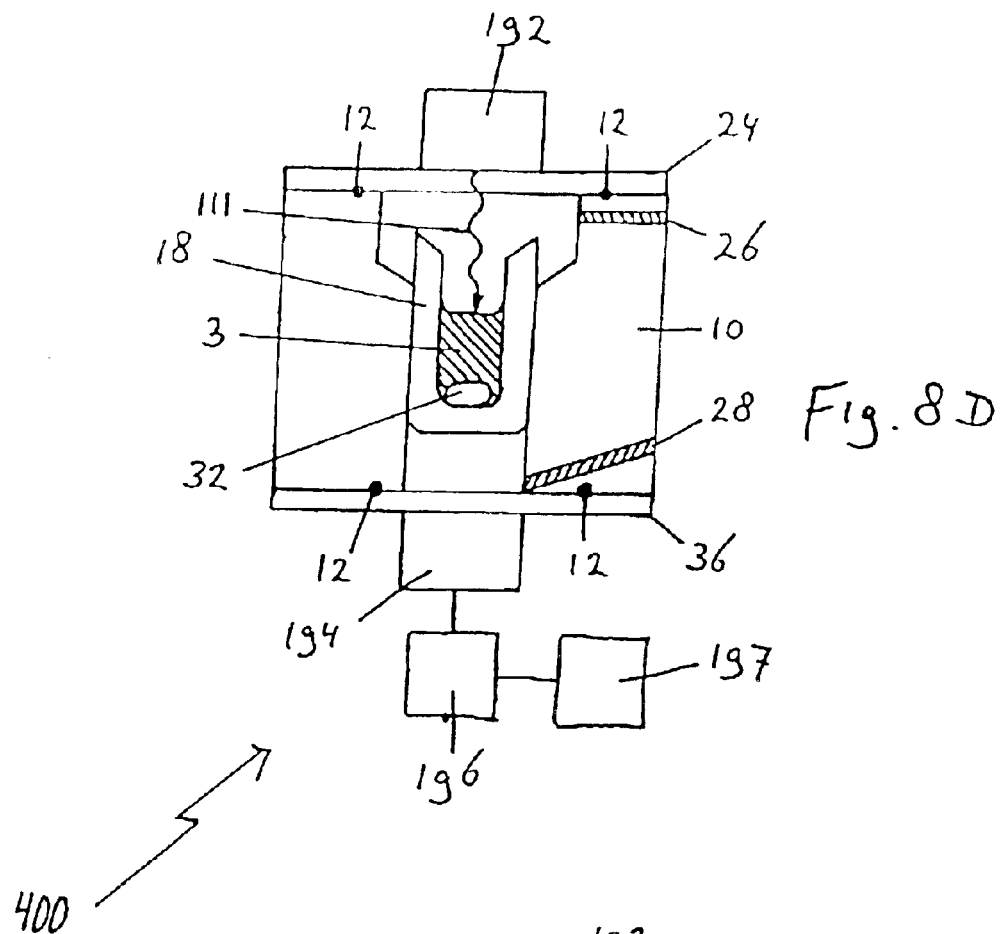
FIG. 8D is a side elevation view, in section, of the apparatus illustrated in FIG. 8A.
Figure 8E:
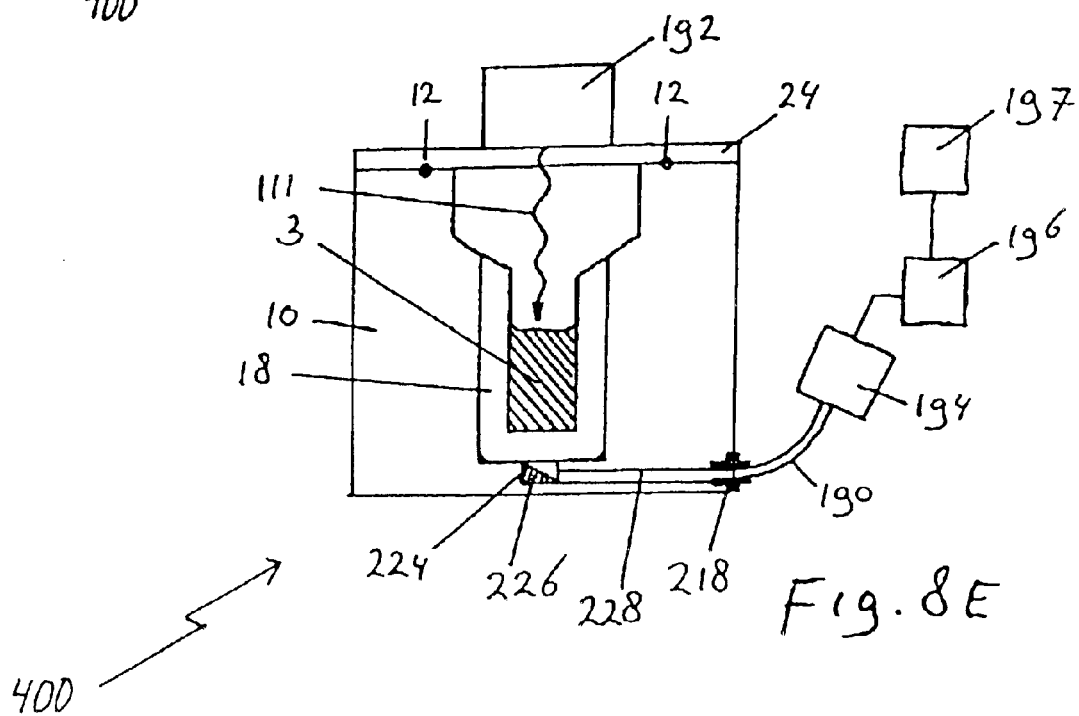
FIG. 8E is a side elevation view, in section, of the apparatus illustrated in FIG. 8A.

These possibilities are depicted in FIGS. 8B to 8E, assuming the light source is placed above the piston 18. The other possibility, placement of the light source below the piston 18 is not shown in FIGS. 8B to 8E. In FIG. 8B a source of light 192 is placed above the piston 18 filled with a mixture of compounds 3. Light beam 111 passes through the transparent top plate 24 and through the content of the piston 18. A wavelength selecting and intensity measuring spectrometer 194 is connected to a fibre-optic cable 190. The fibre-optic cable is mounted near to the piston 18 by a leak-free mounted feed-through or connector 218. After the light has passed through the content of the piston 18, the light is registered by the spectrometer 194. FIG. 8C shows the spectrometer 194 directly mounted on a bottom plate 36, transparent for electromagnetic radiation. In addition FIG. 8C depicts the source of light being brought over the piston 18 by a fibre-optic cable 190. Fibre-optic cable 190 is connected to a leak-free mounted connector or feed through 218. In yet another form both the source of light 192 and the spectrometer 196 are mounted on the top plate 24 and bottom plate 36. Another possibility is depicted in FIG. 8E. In FIG. 8E a light source 192 is mounted on a transparent top plate 24. After the lightbeam 111 has passed through the content of the piston 18, the light is collected by a reflective element 226, like for instance a prism or a mirror, mounted in a cavity 224. Cavity 224 is connected to a channel 228 that forms a conduit for a fibre-optic cable 190. The reflective element directs the collected light to the fibre-optic cable 190. The fibre-optic cable 190 transfers the light to a spectrometer 194. The fibre-optic cable 190 is connected to the body 10 of the apparatus by a leak-free mounted connector or feed-through 218.

As is well known for emission measurements the spectrometer 194 would not be placed in the path of the lightbeam. This possibility is not depicted. All materials in the path of the light beam, excluding the content of the piston 18 are required to be transparent over the range of light used. Because a stir bar could block the light path, both spectrometer and light source preferably are placed off center. A rotating stir bar would block the light source only intermittently.

The spectrometer 194 is connected to a computer 196 for registration or analysis of the light beam. The photosensor 204 is connected to an electronic interface 212, which in turn is connected to a computer 196. The computer can be connected to a suitable storage device such as a hard drives, not depicted in the FIGS. and printers 197, for example a laserprinter. Suitable light sources 192 for this application are for instance tungsten-filament lamps, tungsten-halogen lamps and deuterium or hydrogen arclamps, and can be intensity modulated. The light sources may contain filters, not shown in the FIGS., and are connected to a conventional power supply. The power supply is not shown in the FIGS. Light sources, fiberoptics, photodiodes and spectrometers are available through commercial vendors like Ocean Optics and Digi-Key. Fibre-optic connectors and feed-throughs are available through commercial vendors like Pave Technology Detailed Description of the Operation of the Fourth Embodiment Referring to FIGS. 8A through 8E, the operation of the fourth embodiment 400 is exactly the same as described for the second additional embodiment 200, except that for absorbance measurements the piston 18 must be positioned in such a way that the light source for the spectrometer is not permanently covered by layer 19 of the piston 18. The positioning of the piston 18 can be aided by registering the light intensity measured by photosensor 204 depicted in FIG. 8A. As depicted in FIG. 8A, when the sensor 204 is covered by the opaque layer 19 of the piston 18, the light source for the spectrometer is available. When the light source and spectrometer are placed above and below the piston 18, the position of the piston 18 can be from about the top position to about the bottom position.

Detailed Description of a Fifth Embodiment

Figure 2B:
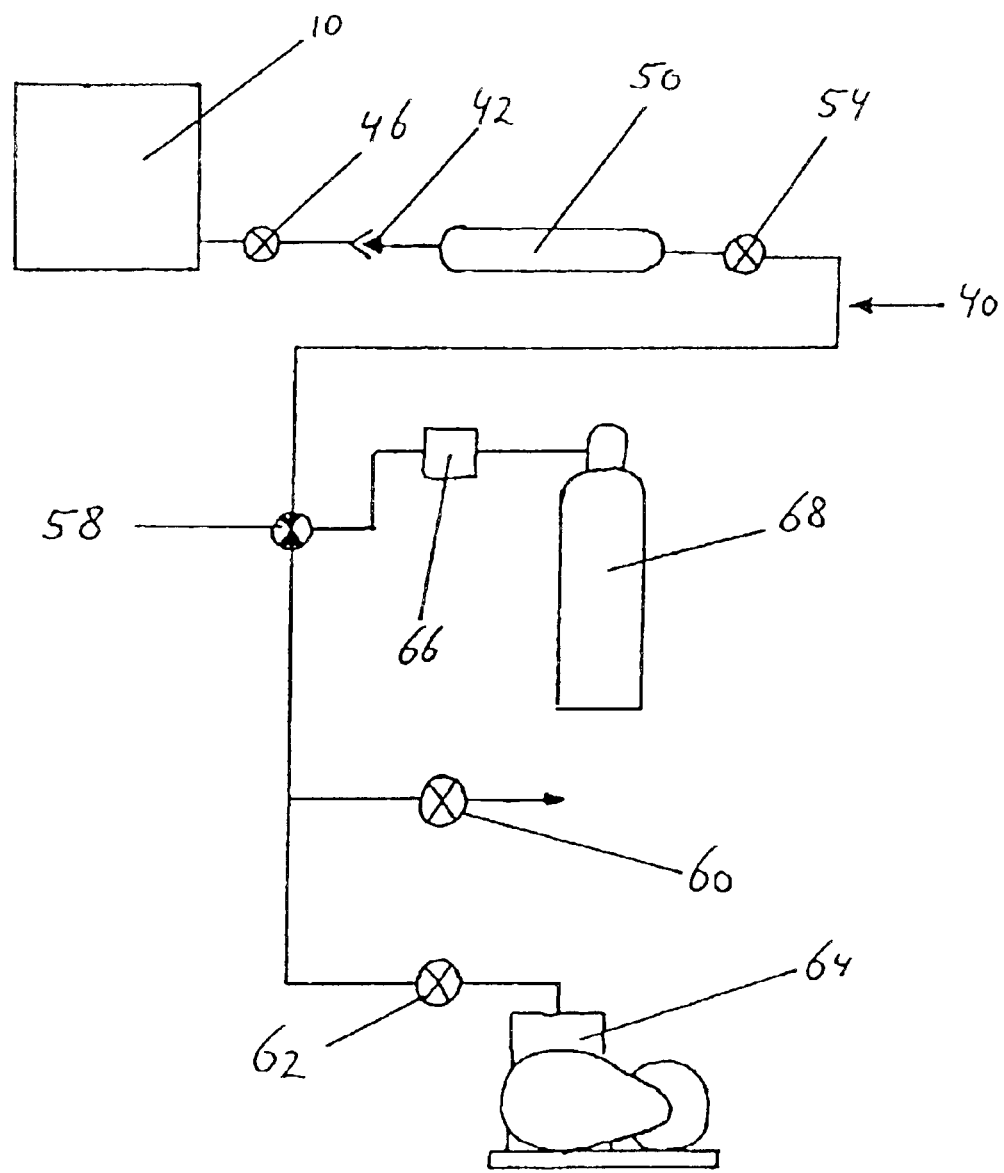
FIG. 2B is a schematic view illustrating another arrangement of valves for varying the pressure in the lower chamber.
Figure 9:
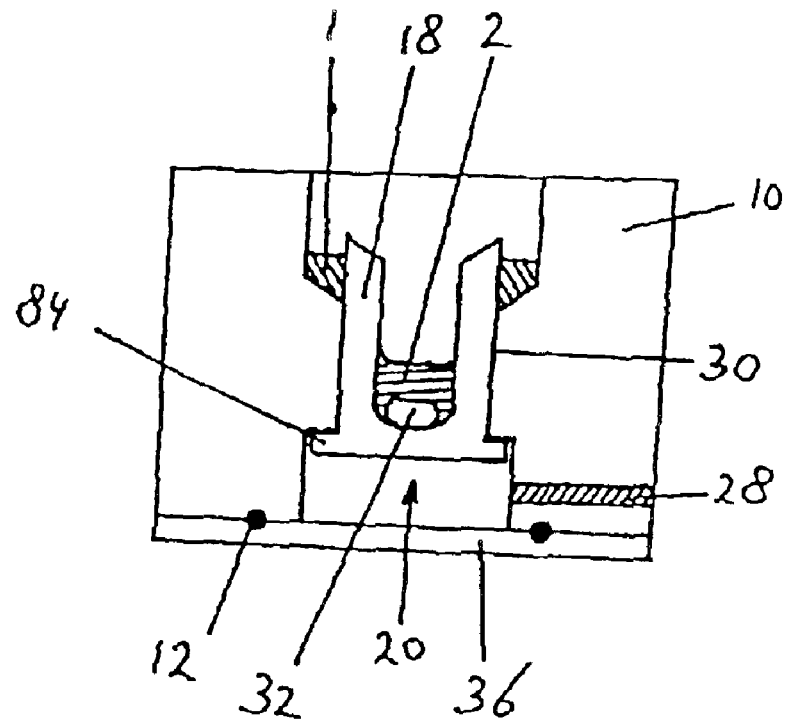
FIG. 9 is a side elevation view, in section, of a fifth embodiment of the apparatus constructed in accordance with the teachings of the present invention.

Referring to FIG. 9 there is illustrated a fifth embodiment of the apparatus generally referenced by numeral 500. Referring to FIG. 9 and 2B, there is the apparatus as depicted in FIG. 1A and in FIGS. 1B and 1D and described in the main embodiment can also be operated without a top plate 24 in case the screening or synthesis of compounds is not air-sensitive. Such a apparatus shown in FIG. 9 consists of the body 10 as depicted in FIG. 1B and described in its various other forms in the main embodiment, and a piston 18 as described in the main embodiment, preferably containing a ridge 84 as for instance depicted in FIG. 3C. Piston 18, body 10 and bottom plate 36 form a chamber 20 that is at all times connected to lower channel 28.

Lower channel 28 depicted in FIG. 9 is connected to line 40 depicted in FIG. 2B. A system of valves is mounted in line 40. The function of these valves is to vary the pressure in the lower chamber 20 connected to line 40. For pressurizing the chamber 20 preferably an inert pressurized gas is used. One example from a large set of possible variations for a system of valves suitable for such a function is given in FIG. 2B. FIG. 2B shows a set of two-way valves 46, 54, 60 and 62. In addition a three-way valve 58 is present. The three-way valve 58 allows line 40 to be connected to vacuum or to a source of pressurized gas. Referring to FIG. 2B gas pressure is supplied by a gas cylinder 68, and maintained at a specific pressure by a regulator 66. Another way of supplying gas pressure is by using a compressor. Vacuum can be created by a vacuum pump. Preferably a rotary vane pump 64 is used. The valves can be manual, electronic or pneumatically driven. Through a suitable opening and closing of the valves, bottom chamber 20 connected to line 40, can be put under vacuum, pressurized with gas or vented to the atmosphere. The chamber 20 can be isolated or stepwise pressurized or depressurized by the valves 46 and 54. Valve 46 can be placed before or after a connector 42. Connector 42 can be self closing. The step size is determined by the container or buffer volume 50 captured between valves 46 and 54. This buffer-volume 50 can be between 1 to about 50% of the chamber volume. The buffer-volume can be formed by a suitable length of tubing or a cylinder. Valves and tubing are made of materials suitable for the reaction conditions used. The tubing may contain connectors 42 allowing disconnection of the apparatus. Valves and connectors suitable for use under the reaction conditions can be obtained from commercial vendors.

Detailed Description of the Operation of the Fifth Embodiment

Referring to FIG. 9, the operation of the fifth embodiment of the apparatus 500, without the top plate 24 is not different from the operation of the first embodiment 100, except that the pressure on the top of the piston 18 is atmospheric and therefore cannot be varied.

After filling of the piston 18 with compound 2 and the recessed area with compound 1 as depicted in FIG. 9, the bottom chamber 20 is stepwise evacuated. Referring to FIG. 2B this can be done by opening valve 54 and selecting the vacuum line with valve 58. Next valve 54 is closed and valve 46 is opened. Valve 46 is closed, and the sequence is repeated, resulting in the removal of gas from the bottom chamber 20. As a result of the step-wise increasing pressure difference created by the atmospheric pressure at the top of the piston 18 and increasing vacuum in chamber 20, the piston 18 will move down. The compound stored in the recessed area will be added to the compound stored in the piston 18 as described in the main embodiment. After passing of a certain time interval, the screening process can be terminated in a way suitable for the process under consideration. In order to isolate formed materials the piston 18 can be moved to its original start position. This also allows cleaning of the apparatus. For this a pressure difference is generated over the piston 18, by increasing the gas pressure in chamber 20 beyond atmospheric pressure. Referring to FIG. 2B this can be done by selecting a source of gas pressure using valve 58. By repeatedly opening valve 54, closing valve 54 and opening valve 46 followed by closing valve 46, the lower chamber 20 is step-wise pressurized. By pressurizing the lower chamber 20 the piston 18 will move upward, until the ridge 84 tooled on piston 18 depicted in FIG. 9 prevents any further movement. The apparatus can now be disconnected after venting excess pressure in chamber 20 by opening valves 46, 54 and 60, and selecting the line open to the air with three-way valve 58.

Detailed Description of a Sixth Embodiment

Figure 10B:
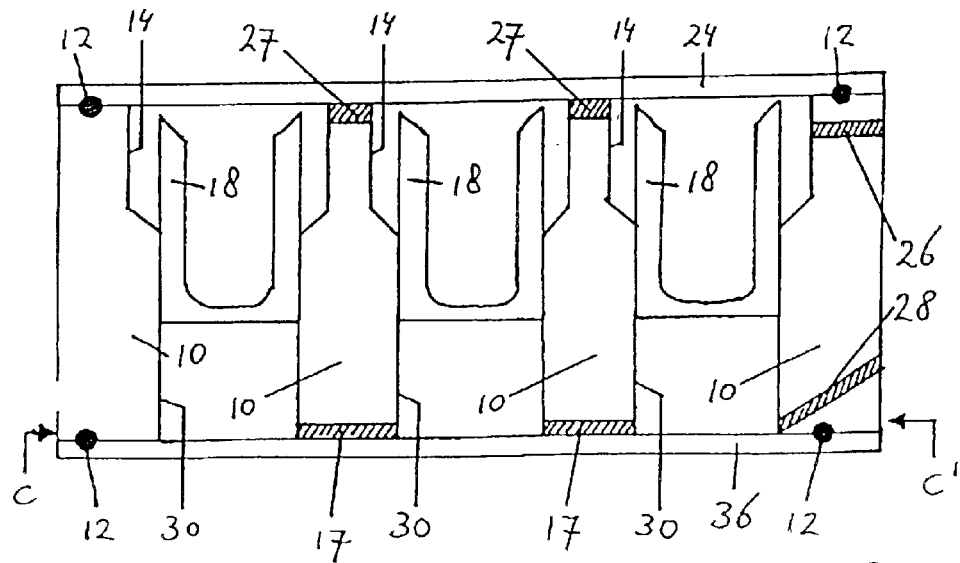
FIG. 10B is a side elevation view, in section, taken along line A—A, of the apparatus illustrated in FIG. 10A.
Figure 10:
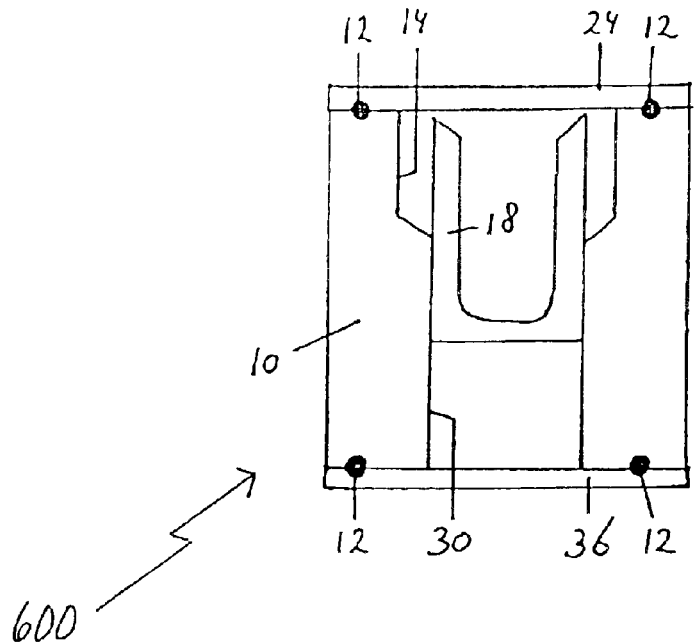
FIG. 10C is a side elevation view, in section, taken along line B—B, of the apparatus illustrated in FIG. 10A.
FIG. 10D is a top plan view, in section, of the apparatus illustrated in FIG. 10A.
FIG. 10E is a side elevation view, in section, taken along line A—A, of the apparatus illustrated in FIG. 10A.
FIG. 10F is a top plan view, in section, of the apparatus illustrated in FIG. 10A.
Figure 10:
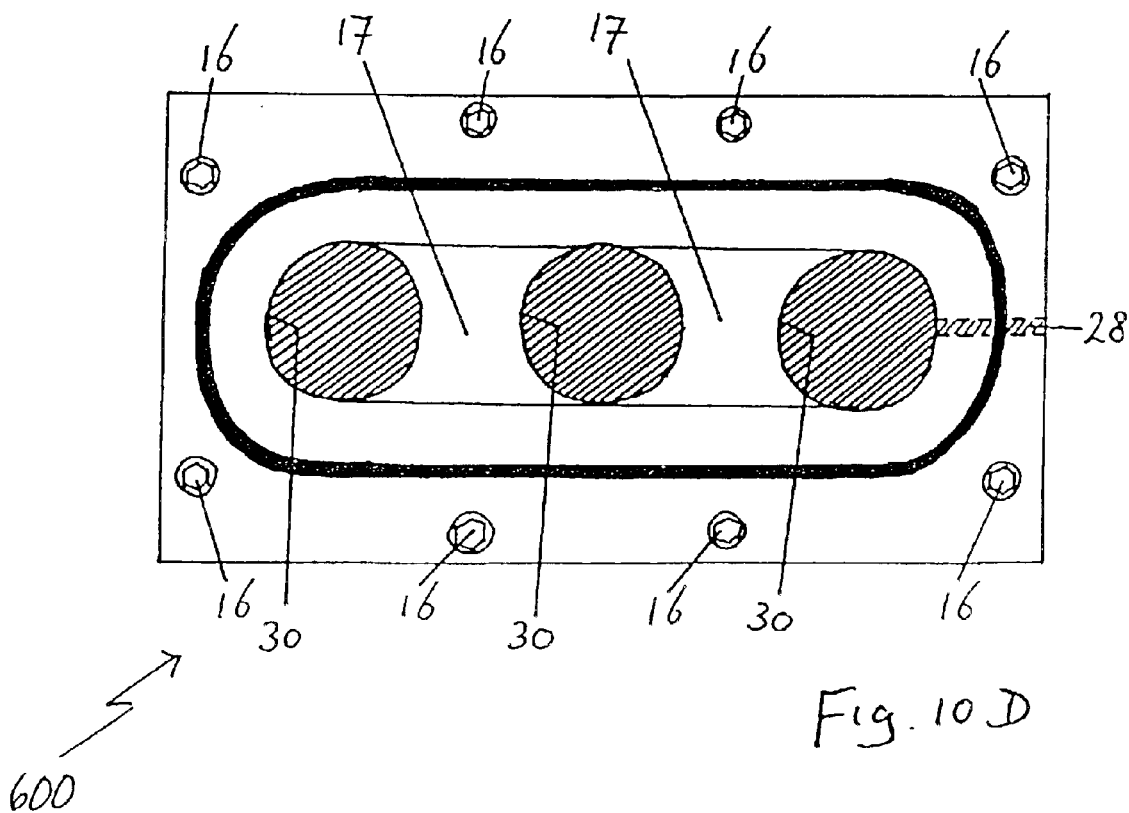
Figure 10E:
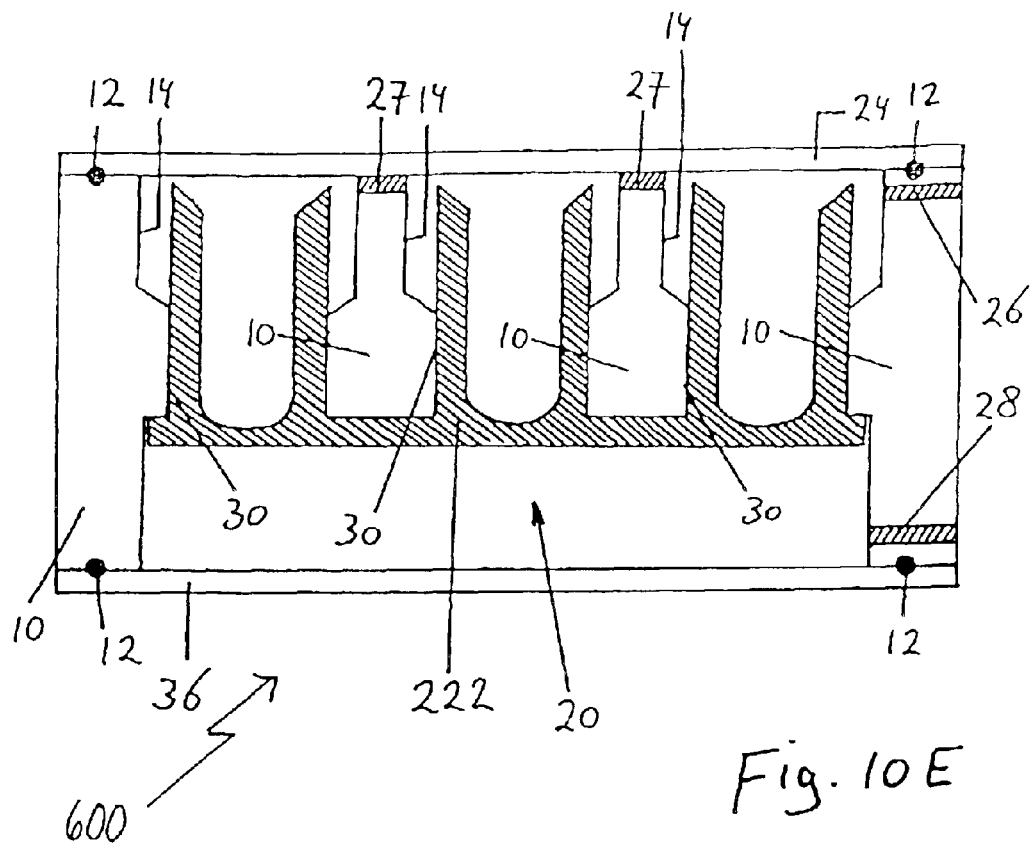
Figure 10F:
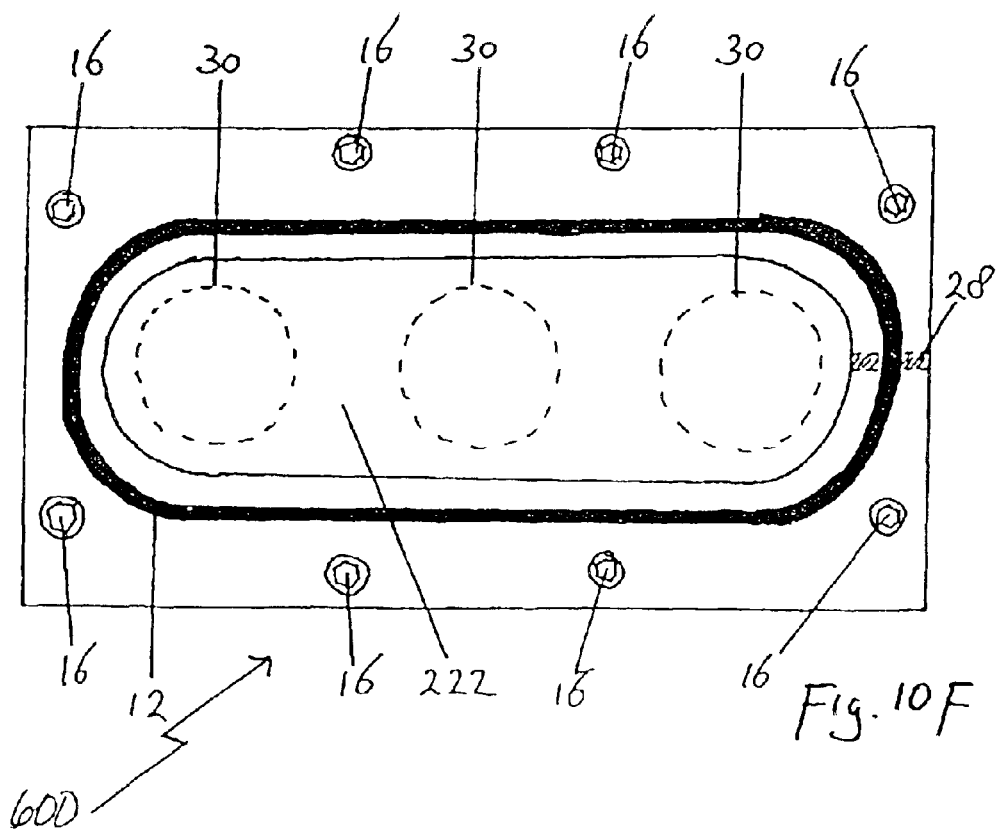

Referring to FIGS. 10A through 10F, there is illustrated a sixth embodiment of the apparatus generally referenced by numeral 600. Referring to FIG. 10A, body 10 contains multiple pistons 18 for use in parallel screening and synthesis. These pistons 18 may be contained in a single monolithic reactor body or an assembly of reactor body modules. To illustrate the principle a body 10 containing three bores 30, three recessed areas 14 and three pistons 18 is depicted in FIG. 10A. The hidden channel 26 is shown using dashed lines. The pistons 18 and body 10 as described represent the multi-piston form of the simplest form of the apparatus as described in the main embodiment. Pistons 18, body 10, top plate 24 and bottom plate 36 can incorporate other features previously described. Referring to FIG. 10A, unlike a single piston apparatus, at least one channel 26 communicates at all times with all pistons 18 through a recessed area or conduit 27. Referring to FIG. 10C, a single piston 18 is mounted in a bore 30 in the body 10. The top and bottom of the apparatus is closed leak-free by a top plate 24 and bottom plate 36 combined with a O-rings 12 and suitable fasteners 16. In FIGS. 10A and 10D the fasteners 16 are bolts. Referring to FIG. 10B unlike a single piston apparatus, lower channel 28 communicates at all times with all bores 30 through a recessed area or conduit 17. Referring to FIG. 10D, conduits 17 connect the bores 30 to each other and to the channel 28. Hidden channel 28 is shown using dashed lines. Unlike a single piston apparatus, in a multi-piston apparatus the pistons 18 can mechanically be coupled to each other. Such a setup can speed-up the placement of large sets of pistons 18. Referring to FIG. 10E, instead of separate pistons 18, the pistons 18 are mounted or incorporated in a plate keeping the pistons 18 in place before, during and after the addition. This multi-well plate 222 is inserted in the chamber 20 and bores 30 by removing a bottom plate 36. Chamber 20 is at all times communicating with lower channel 28. Referring to FIG. 10E, apparatus 600 is equipped with a multi-piston plate 222 is shown in FIG. 10F. In FIG. 10F, the hidden channel 28 is represented by dashed lines. Except for these structural changes the multiple piston apparatus is not different from a single piston apparatus.

Detailed Description of the Operation of the Sixth Embodiment

Referring to FIGS. 10A through 10F, the operation of the multi-well version of the main embodiment as described in the sixth embodiment is not different from a single piston apparatus. Both are connected to the gas lines as depicted in FIG. 2A. The operation of the multi well apparatus is therefore not depicted or discussed. The alternative, coupling a series of single piston apparatus to a single set of gas lines as depicted in FIG. 2A, is not different from the operation of a single piston apparatus and therefore not depicted or discussed.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

The embodiments of the invention in which an exclusive property or privilege is claimed are defined as follows:

1. An apparatus for the addition of a compound or compound mixture to another comprising;
   a primary vessel adapted having at least one receptacle adapted to contain at least one primary substance;
   at least one secondary vessel each of which is adapted to contain at least one secondary substance, each secondary vessel being movably mounted within the primary vessel for movement vertically up and down within the primary vessel between a stored position and at least one mixing position, in the stored position a peripheral edge of each secondary vessel is above a level of the at least one primary substance, in each mixing position the peripheral edge of the secondary vessel is moved below the level of the receptacle containing the at least one primary substance, thereby permitting the at least one primary substance to overflow the peripheral edge into the secondary vessel with the at least one secondary substance; and
   at least one fluid conduit being provided through the primary vessel, the fluid conduit being adapted to accommodate an insertion or withdrawal of fluid from the primary vessel, thereby creating a pressure imbalance where the pressure above the at least one secondary vessel is greater than the pressure below the at least one secondary vessel and resulting in the at least one secondary vessel descending from the stored position to the at least one mixing position.

2. The apparatus as defined in claim 1, wherein a top closure is provided on the primary vessel.

3. The apparatus as defined in claim 2, wherein the top closure has at least one conduit in fluid communication with the primary vessel.

4. The apparatus as defined in claim 3, wherein the at least one conduit provides means to sample from or add substances to the secondary vessel.

5. The apparatus as defined in claim 1, wherein the at least one fluid conduit includes a lower fluid conduit through the primary vessel below the at least one secondary vessel to permit a release of fluid as the secondary vessel descends.

6. The apparatus as defined in claim 1, wherein the at least one secondary vessel is removable from the primary vessel.

7. The apparatus as defined in claim 1, wherein there are several secondary vessels.

8. The apparatus as defined in claim 1, wherein there are at least two receptacles in the primary vessel at different heights, at a first mixing position a first primary substance overflows from a first of the at least two receptacles over the peripheral edge into the secondary vessel with the at least one secondary substances and at a second mixing position a second primary substance overflows from a second of the at least two receptacles over the peripheral edge into the secondary vessel with the first primary substance and the at least one secondary substance.

9. The apparatus as defined in claim 1, wherein means are provided for stirring the contents of the at least one secondary vessel.

10. The apparatus as defined in claim 9, wherein the means for stirring is a rotatably mounted spindle with radially extending paddles and means for rotating the spindle.

11. The apparatus as defined in claim 1, wherein means are provided for heating the contents of the primary vessel, the at least one secondary vessel or both.

12. The apparatus as defined in claim 11, wherein the means for heating is a resistive heating element.

13. The apparatus as defined in claim 1, wherein means are provided for cooling the contents of the primary vessel, the at least one secondary vessel or both.

14. The apparatus as defined in claim 13, wherein the means for cooling is a circulating coolant.

15. The apparatus as defined in claim 1, wherein means are provided for measuring the temperature of the contents of the primary vessel, the at least one secondary vessel or both.

16. The apparatus as defined in claim 15, wherein the means for measuring temperature is a temperature sensor positioned in each of the primary vessel and the at least one secondary vessel.

17. The apparatus as defined in claim 15, wherein the primary vessel has a top closure which permits temperature readings to be taken by an external infrared camera.

18. The apparatus as defined in claim 1, wherein means are provided for spectroscopically investigating the contents of the at least one secondary vessel.

19. The apparatus as defined in claim 18, wherein the means for spectroscopically investigating includes a light source, a light path through the at least one secondary vessel and a spectrometer.

20. The apparatus as defined in claim 1, wherein means is provided to determine the relative position of the at least one secondary vessel within the primary vessel.

21. The apparatus as defined in claim 1, wherein means is provided for monitoring pressure within the primary vessel.

\* \* \* \* \*

UNITED STATES PATENT AND TRADEMARK OFFICE
CERTIFICATE OF CORRECTION

PATENT NO. : 6,916,114 B2
DATED : July 12, 2005
INVENTOR(S) : U.H. Verkerk

It is certified that error appears in the above-identified patent and that said Letters Patent is hereby corrected as shown below:

Title page,
Item [56], References Cited, U.S. PATENT DOCUMENTS, "2002/0023864" should read -- 2002/0023884 --.

Column 29,
Line 25, "substances" should read -- substance, --.

Signed and Sealed this

Twenty-second Day of November, 2005

JON W. DUDAS
*Director of the United States Patent and Trademark Office*